(12) United States Patent
Shino et al.

(10) Patent No.: US 6,603,922 B1
(45) Date of Patent: Aug. 5, 2003

(54) EDITING SYSTEM AND EDITING METHOD

(75) Inventors: Masaaki Shino, Kanagawa (JP); Tanio Nagasaki, Kanagawa (JP); Yasunobu Kato, Kanagawa (JP); Masaki Nishikawa, Kanagawa (JP); Noboru Ooya, Kanagawa (JP); Masatoshi Imai, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/194,935

(22) PCT Filed: Apr. 7, 1998

(86) PCT No.: PCT/JP98/01596

§ 371 (c)(1),
(2), (4) Date: Apr. 15, 1999

(87) PCT Pub. No.: WO98/45845

PCT Pub. Date: Oct. 15, 1998

(30) Foreign Application Priority Data

Apr. 7, 1997 (JP) ............................................... 9-103950

(51) Int. Cl.[7] .............................. H04N 5/85; H04N 5/93
(52) U.S. Cl. ........................................ 386/125; 386/52
(58) Field of Search ............................. 386/52, 55, 46, 386/125, 126, 45, 109, 111, 112, 27, 33, 1, 4, 70, 82, 105, 106; 360/13; H04N 5/85, 5/93

(56) References Cited

U.S. PATENT DOCUMENTS

| | | | |
|---|---|---|---|
| 5,422,762 A | | 6/1995 | Jerbic |
| 5,596,709 A | | 1/1997 | Bond et al. |
| 5,914,916 A | * | 6/1999 | Totsuka et al. |
| 6,115,536 A | * | 9/2000 | Iwasaki et al. |

FOREIGN PATENT DOCUMENTS

| | | | | |
|---|---|---|---|---|
| EP | 0 490 485 A2 | 6/1992 | | |
| JP | 5-128810 | 5/1993 | ......... | G11B/27/034 |
| JP | 8-340508 | 12/1996 | ............ | H04N/5/78 |

* cited by examiner

*Primary Examiner*—Robert Chevalier
(74) *Attorney, Agent, or Firm*—Bell, Boyd & Lloyd, LLC

(57) ABSTRACT

An editing system includes an editing device 1 for editing a plurality of channels of video data, a disk recorder 2 constituted by a disk array having a plurality of disks, and a computer 3. The disk recorder 2 prepares a block map for managing recording areas on the disks so that respective subblock data are recorded at such position that a rotational delay time of a head becomes minimum in accessing the subblock data recorded on the respective disks. The disk recorder 2 then divides pixel data of source video frames into a plurality of subblocks for each frame on the basis of the block map, and records the subblocks so that the subblocks are dispersed on a plurality of different disks.

57 Claims, 49 Drawing Sheets

ZBR TABLE ( NTSC )

| ZONE | CYLINDER ADDRESS | NUMBER OF SECTORS |
|---|---|---|
| 1 | 0001 – 0500 | 567 |
| 2 | 0501 – 1000 | 544 |
| 3 | 1001 – 1500 | 536 |
| 4 | 1501 – 2000 | 518 |
| 5 | 2001 – 2500 | 498 |
| 6 | 2501 – 3000 | 480 |
| 7 | 3001 – 3500 | 480 |
| 8 | 3501 – 4000 | 462 |
| 9 | 4001 – 4500 | 442 |
| 10 | 4501 – 5000 | 424 |
| 11 | 5001 – 5500 | 416 |
| 12 | 5501 – 6000 | 393 |

( OUTER CIRCUMFERENCE )

( INNER CIRCUMFERENCE )

FIG.9

ZBR TABLE ( PAL )

| ZONE | CYLINDER ADDRESS | NUMBER OF SECTORS |
|---|---|---|
| 1 | 0001 – 0500 | 561 |
| 2 | 0501 – 1000 | 534 |
| 3 | 1001 – 1500 | 525 |
| 4 | 1501 – 2000 | 501 |
| 5 | 2001 – 2500 | 480 |
| 6 | 2501 – 3000 | 459 |
| 7 | 3001 – 3500 | 459 |
| 8 | 3501 – 4000 | 445 |
| 9 | 4001 – 4500 | 431 |
| 10 | 4501 – 5000 | 415 |
| 11 | 5001 – 5500 | 409 |
| 12 | 5501 – 6000 | 391 |

( OUTER CIRCUMFERENCE )

( INNER CIRCUMFERENCE )

FIG.10

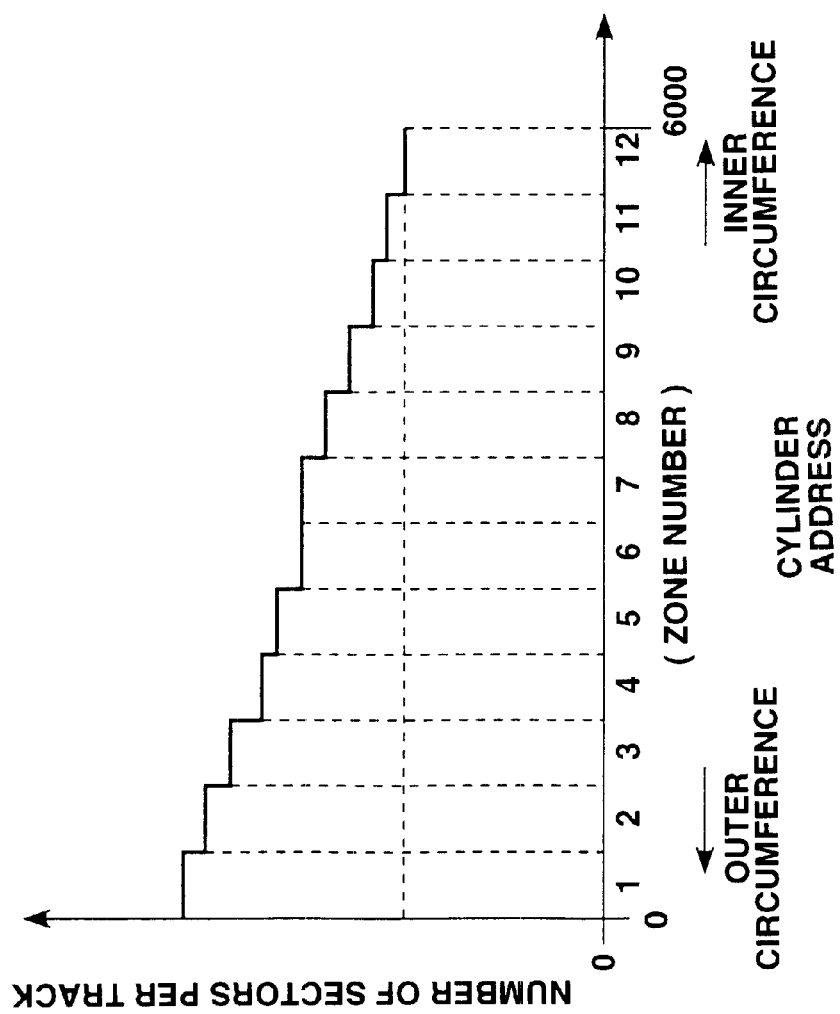

| LOGICAL SECTOR | CYLINDER | MEDIA | SECTOR |
|---|---|---|---|
| 0 | 0 | 0 | 0 |
| 1 | 0 | 0 | 1 |
| 2 | 0 | 0 | 2 |
| 3 | 0 | 0 | 3 |
| 4 | 0 | 0 | 4 |
| 5 | 0 | 0 | 5 |
| 6 | 0 | 0 | 6 |
| 7 | 0 | 0 | 7 |
| ...... | ...... | ...... | ...... |

| LOGICAL SECTOR | CYLINDER | MEDIA | SECTOR |
|---|---|---|---|
| $L_{ki}$ | $CYL_{ki}$ | $MED_{ki}$ | $SEC_{ki}$ |

| DATA NO. | | DISK ID | LOGICAL SECTOR | SIZE |
|---|---|---|---|---|
| | p | $D_{kp}$ | $L_{kp}$ | $S_{kp}$ |
| k | | $D_{k1}$ | $L_{k1}$ | $S_{k1}$ |
| | | $D_{k2}$ | $L_{k2}$ | $S_{k2}$ |
| | | : | : | : |
| | | $D_{kn}$ | $L_{kn}$ | $S_{kn}$ |

| FRAME NO. | DISK ID | START LOGIC SECTOR | SECTOR SIZE | |
|---|---|---|---|---|
| 1 | 1<br>2<br>3<br>4<br>5 | 0<br>599600<br>0<br>599600<br>0 | 567<br>393<br>567<br>393<br>567 | ← PARITY DATA ( P1 )<br>← FIRST SUBBLOCK DATA ( S1-1 )<br>← SECOND SUBBLOCK DATA ( S1-2 )<br>← THIRD SUBBLOCK DATA ( S1-3 )<br>← FOURTH SUBBLOCK DATA ( S1-4 ) |
| 2 | 2<br>3<br>4<br>5<br>6 | 0<br>599600<br>0<br>599600<br>0 | 567<br>393<br>567<br>393<br>567 | ← PARITY DATA ( P2 )<br>← FIRST SUBBLOCK DATA ( S2-1 )<br>← SECOND SUBBLOCK DATA ( S2-2 )<br>← THIRD SUBBLOCK DATA ( S2-3 )<br>← FOURTH SUBBLOCK DATA ( S2-4 ) |
| 3 | 3<br>4<br>5<br>6<br>1 | 600<br>599200<br>600<br>599600<br>600 | 567<br>393<br>567<br>393<br>567 | ← PARITY DATA ( P3 )<br>← FIRST SUBBLOCK DATA ( S3-1 )<br>← SECOND SUBBLOCK DATA ( S3-2 )<br>← THIRD SUBBLOCK DATA ( S3-3 )<br>← FOURTH SUBBLOCK DATA ( S3-4 ) |
| 4 | 4<br>5<br>6<br>1<br>2 | 600<br>599200<br>600<br>599600<br>600 | 567<br>393<br>567<br>393<br>567 | ← PARITY DATA ( P4 )<br>← FIRST SUBBLOCK DATA ( S4-1 )<br>← SECOND SUBBLOCK DATA ( S4-2 )<br>← THIRD SUBBLOCK DATA ( S4-3 )<br>← FOURTH SUBBLOCK DATA ( S4-4 ) |
| ..... | ..... | ..... | ..... | |

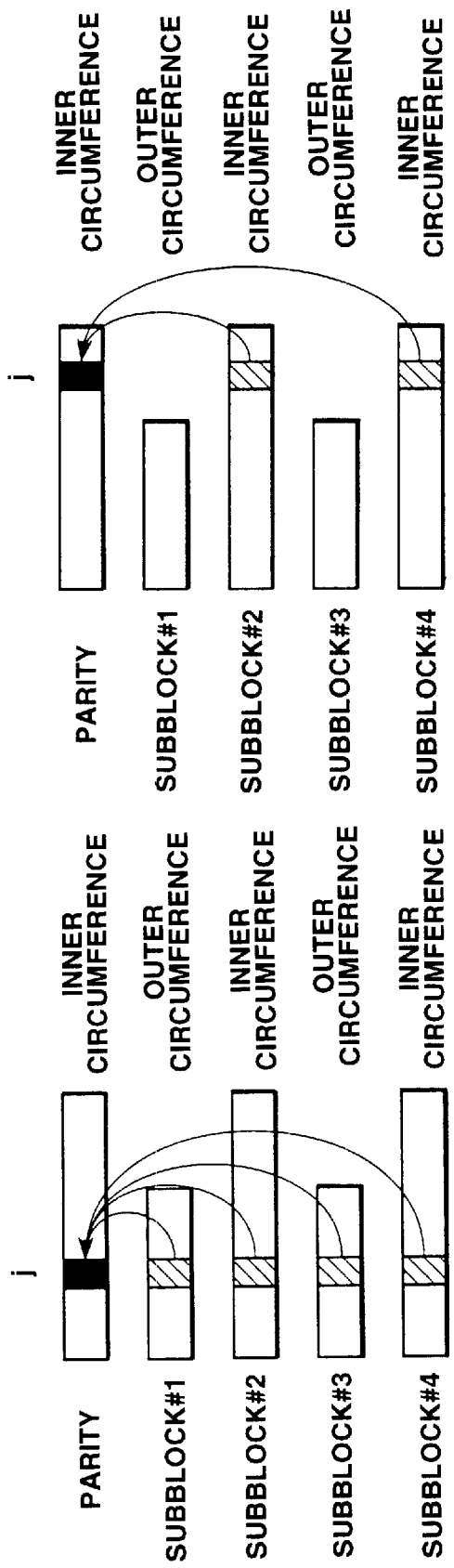

| DATA NUMBER (PACKET TRANSFER BLOCK) | 0 | 1 | 2 | 3 | 4 | 5 | 6 | ... |
|---|---|---|---|---|---|---|---|---|
| SELECTOR 451 | A | A | A | A | A | A | A | |
| SELECTOR 455 | A | A^B | A^B | A^B | A | A^B | A^B | |
| INPUT DATA | 0 | 1 | 2 | 3 | 4 | 5 | 6 | |
| SELAY ELEMENT 403 | 0 | 0^1 | 0^1^2 | 0^1^2^3 | 4 | 4^5 | 4^5^6 | |
| PARITY DATA OUTPUT | 0 | 0^1 | 0^1^2 | 0^1^2^3 | 4 | 4^5 | 4^5^6 | |

PARITY TO BE FOUND

PARITY GENERATION

FIG.48

| DATA NUMBER (PACKET TRANSFER BLOCK) | 0 | 1 | 2(P) | 3 | 4 | 5 | 6(P) | 7 | 8 | 9 | 10 |
|---|---|---|---|---|---|---|---|---|---|---|---|
| DELAY ELEMENT 401-1 | - | - | - | 0 | 1 | 2NG | 3 | 4 | 5 | 6NG | 7 |
| DELAY ELEMENT 401-2 | - | - | 0 | 1 | 2NG | 3 | 4 | 5 | 6NG | 7 | 8 |
| DELAY ELEMENT 401-3 | - | 0 | 1 | 2NG | 3 | 4 | 5 | 6NG | 7 | 8 | 9 |
| DELAY ELEMENT 401-4 | 0 | 1 | 2NG | 3 | 4 | 5 | 6NG | 7 | 8 | 9 | 10 |
| DELAY ELEMENT 402 | 0 | 0^1 | 0^1^P | 0^1^P^3=2 | 2 | 2 | 2 | 2 | 8 | 8^9 | 8^9^10 |
| DELAY ELEMENT 403 | - | - | - | - | 4 | 4^5 | 4^5^P | 4^5^6^7=6 | 6 | 6 | 6 |
| SELECTOR 452 | A | A | A | A | A | A | A | A | B | B | B |
| SELECTOR 453 | A | A | A | A | A | A | [B] | A | A | A | [B] |
| SELECTOR 454 | A | A^B | A^B | A^B | B | B | B | B | A | A^B | A^B |
| SELECTOR 455 | B | B | B | B | A | A^B | A^B | A^B | B | B | B |
| OUTPUT | - | - | - | - | 0 | 1 | 2 (CORRECTED) | 3 | 4 | 5 | 6 (CORRECTED) |

DATA CORRECTION

FIG.49

| FRAME SIGNAL \ DISK ID | 1 | 2 | 3 | 4 | 5 | 6 |
|---|---|---|---|---|---|---|
| 1 | P1(OUTER) | S1-1(INNER) | S1-2(OUTER) | S1-3(INNER) | S1-4(OUTER) | |
| 2 | | P2(OUTER) | S2-1(INNER) | S2-2(OUTER) | S2-3(INNER) | S2-4(OUTER) |
| 3 | S3-4(OUTER) | | P3(OUTER) | S3-1(INNER) | S3-2(OUTER) | S3-3(INNER) |
| 4 | S4-3(INNER) | S4-4(OUTER) | | P4(OUTER) | S4-1(INNER) | S4-2(OUTER) |
| 5 | S5-2(OUTER) | S5-3(INNER) | S5-4(OUTER) | | P5(OUTER) | S5-1(INNER) |
| 6 | S6-1(INNER) | S6-2(OUTER) | S6-3(INNER) | S6-4(OUTER) | | P6(OUTER) |
| 7 | P7(OUTER) | S7-1(INNER) | S7-2(OUTER) | S7-3(INNER) | S7-4(OUTER) | |
| 8 | | P8(OUTER) | S8-1(INNER) | S8-2(OUTER) | S8-3(INNER) | S8-4(OUTER) |
| 9 | S9-4(OUTER) | | P9(OUTER) | S9-1(INNER) | S9-2(INNER) | S9-3(INNER) |
| 10 | S10-3(OUTER) | S10-4(OUTER) | | P10(OUTER) | S10-1(INNER) | S10-2(OUTER) |
| ... | | | | | | |

FIG.62

EDITING SYSTEM AND EDITING METHOD

TECHNICAL FIELD

This invention relates to an editing system and an editing method for editing source video data, and particularly to an editing system and an editing method which enable editing of a higher degree by reading, in real time, a plurality of channels of video data recorded at arbitrary positions on a disk.

BACKGROUND ART

In editing at broadcasting stations, magnetic tapes have long been used as recording media for recording video data. Recently, in order to improve the editing efficiency, a non-linear editing machine using a randomly accessible disk medium such as a hard disk (HDD) is introduced. Also, in order to improve the accessibility, it is proposed to use a disk array unit including HDDs connected in an array as a recording medium for carrying out non-linear editing, instead of using a single hard disk.

This disk array unit is a device which includes a plurality of disk units (HDDs) and realizes high-speed reading or writing by operating the disk units in parallel. When data are to be stored in such disk array unit, the data are divided to generate a plurality of divided data and generates error correction data from the plurality of divided data. Then, the plurality of divided data and the error correction data are separately written in the disk unit.

On the contrary, when data are to be taken out from the disk array unit, a plurality of data constituting the data and error correction data are simultaneously read out from the disk unit where the plurality of data and the error correction data are stored, and the original data are constituted by the read out divided data and transmitted without carrying out any processing, if there is no error. At this point, if the data cannot be read out normally for a reason such that a recording area in which the divided data are stored is broken or the like, correct data are restored on the basis of other normally read out subblocks and the error correction data, and are then transmitted.

The disk array unit can be provided with a function such that even when one disk unit is completely broken, the broken data are restored by replacing the broken disk unit with a new disk unit and then using data of the other disk units.

The disk array unit employing error correction data has several different systems. Professor David A. Patterson of U.C. Berkeley classified these systems into five stages and introduced a term of RAID (Redundant Arrays of Inexpensive Disks) levels, for the first time. The contents of the RAID levels are briefly introduced hereinafter.

RAID-1 is a system for doubling data on a disk unit and is also referred to as a mirrored disk. In RAID-1, perfectly the same data are stored in two disk units. In RAID-2 and RAID-3, input data are divided on the bit basis or on the byte basis and are then stored in a plurality of disk units. As error correction data, Hamming codes are used in RAID-2 and parities are used in RAID-3. In RAID-4 and RAID-5, data are interleaved on the sector basis. Parities are stored in the same disk unit in RAID-4, while parities are dispersed into a plurality of disk units in RAID-5.

The system that is most frequently used for the ordinary disk array unit, of these RAID levels, is RAID-3 and RAID-5. FIG. 64 shows the structure of an example of a disk array unit employing the RAID-3 system, and FIG. 65 shows the structure of an example of a disk array unit employing the RAID-5 system.

In the disk array unit of the RAID-3 system shown in FIG. 64, input data are divided into byte units and the respective data divided into byte units are stored in the disk units. Parities as correction data are stored in a predetermined disk unit. In this case, a parity P1–4 with respect to data of numbers 1 to 4 stored in a plurality of disk units and a parity P5–8 with respect to data of numbers 5 to 8 are stored.

In the disk array unit of the RAID-5 system shown in FIG. 65, input data are divided into sector units and these data are interleaved and dispersed into a plurality of disk units. In this case, data A, E and I are stored in the first disk unit, and data B, F and J are stored in the next disk unit. In the subsequent disk unit, data C, G and a parity PI–L with respect to data I to L are stored. Then, data D, K and a parity PE–H with respect to data E to H are stored in the next disk unit, and a parity PA–D with respect to data A to D and data H, L are stored in the last disk unit.

With an HDD used in such disk array unit, in accessing a recording track, the seek time of a head to the track is not so problematical. However, after the head seeks a designated track, the time for the head to wait for rotation of requested data at the designated track position is greatly problematical. This latency time amounts to the time of one rotation of the disk. That is, such problem might not be occur if the requested several frames of data are recorded at physically continuous positions on the disk. However, if the requested several frames of data are recorded at physically random positions, there arises a problem that these several frames of data cannot be read out in real time because of the latency time of the head.

In short, though frames recorded at physically continuous positions can be read out in real time, frame recorded at physically discontinuous positions cannot be read out in real time. Such situations are greatly problematical at broadcasting stations and in the field of broadcast which require real time property in any case. Generally, at broadcasting stations and in the field of broadcast, guarantee of an upper limit of processing time in the worst case is referred to as guarantee of real time property. Particularly in the field of editing, it is very important to enable guarantee of this real time property.

In addition, recently, it is desired that an editing device used at broadcasting stations and in the field of broadcast has a high-degree editing function of processing a plurality of channels of video data in real time. An editing device using the conventional disk array has no such capability as to process a plurality of channels of data in real time, as is known from its inability to compensate real time property even in processing one channel.

DISCLOSURE OF THE INVENTION

In view of the foregoing status of the art, it is an object of the present invention to provide an editing system and an editing method which realize high-degree editing by processing, in real time, a plurality of channels of video data recorded at random positions on a disk.

An editing system according to the present invention includes a data recording/reproducing device for recording/reproducing a plurality of channels of source video data, an editing device for editing the source video data recorded in the recording device, and a computer for controlling the editing device and the data recording/reproducing device. The data recording/reproducing device includes: recording/reproducing means for recording one frame of pixel data of the plurality of channels of source video data onto a plurality of randomly accessible recording media and reproducing a plurality of channels of video streams constituted by desired frames of the plurality of channels of video data stored on the plurality of recording media; and control means for controlling the recording/reproducing means on the basis of a predetermined algorithm for dividing the one frame of pixel data into a plurality of subblocks and transferring the divided subblocks of data to a plurality of different recording media so that the subblocks of data are recorded onto the respective recording media and for recording each subblock data at a position such that a rotational delay time of a head becomes minimum in accessing a desired subblock on the recording medium of each transfer destination. The editing device includes video data processing means for processing, in real time, the plurality of channels of video streams reproduced from the data recording/reproducing device in accordance with an editing indication from the computer so as to generate edited video data.

Also, an editing system according to the present invention includes a data recording/reproducing device for recording/reproducing a plurality of channels of source video data, and a computer for controlling the data recording/reproducing device. The data recording/reproducing device includes: recording/reproducing means for recording one frame of pixel data of the plurality of channels of source video data onto a plurality of randomly accessible recording media and reproducing desired source video data from the plurality of recording media; and control means for controlling the recording/reproducing means by using a first algorithm for dividing the one frame of pixel data into a plurality of subblocks and dispersing the data of the subblocks to a plurality of different recording media, a second algorithm for, in access to a subblock of several frames with respect to each recording medium, scheduling an access order to the subblock of several frames so that a seek distance of a head becomes minimum, and a third algorithm for determining a recording position of each subblock to be recorded on the recording medium so that a rotational delay time of the head becomes minimum in accessing a desired subblock on the recording medium. The computer includes control means for controlling the data recording/reproducing device so as to read out, in real time, a plurality of channels of video streams constituted by desired frames of the plurality of channels of source video data recorded at random positions on the plurality of recording media, from the respective recording media in accordance with operation by an editing operator.

Also, an editing system according to the present invention is adapted for editing a plurality of channels of source video data on the basis of editing information inputted by an operator. The editing system includes: recording means for dividing each frame of pixel data of the plurality of channels of source video data into a plurality of subblocks, allocating divided subblocks so that the respective subblocks are recorded onto a plurality of different disks, and recording the subblocks so that, in each disk, a skew as an angular difference from the center of the disk between a starting point of the data on a track on which the data of the subblock is arranged and a starting point of the data on an adjacent track corresponds to a gap as an angular difference from the center of the disk between a starting point and an end point of one subblock; reproducing means for simultaneously reproducing the plurality of channels of video data by accessing the plurality of subblocks recorded by the recording means; and editing means for processing the plurality of channels of video data reproduced by the reproducing means on the basis of the editing information so as to generate at least one channel of edited video data.

In addition, an editing system according to the present invention is adapted for editing a plurality of channels of source video data on the basis of editing information inputted by an operator. The editing system includes: recording means for dividing each frame of pixel data of the plurality of channels of source video data into a plurality of subblocks, and recording the respective subblocks so that the subblocks are dispersed onto a plurality of different disks and so that, in each disk, a skew as an angular difference from the center of the disk between a starting point of the data on a track on which the data of the subblock is arranged and a starting point of the data on an adjacent track becomes substantially constant; reproducing means for simultaneously reproducing the plurality of channels of video data by accessing the plurality of subblocks recorded by the recording means; and editing means for editing the plurality of channels of video data reproduced by the reproducing means on the basis of the editing information so as to generate at least one channel of video data.

Also, an editing system according to the present invention is adapted for editing a plurality of channels of source video data on the basis of editing information inputted by an operator. The editing system includes: recording means for dividing each frame of pixel data of the plurality of channels of source video data into a plurality of subblocks, and recording the plurality of channels of source video data on the basis of a predetermined recording algorithm for recording the respective subblocks so that the subblocks are dispersed onto a plurality of different disks and so that, in each disk, a rotational delay time of a head becomes minimum in accessing a desired subblock; reproducing means for simultaneously reproducing the plurality of channels of video data by accessing the plurality of subblocks recorded by the recording means on the basis of the predetermined recording algorithm used in recording the source video data; and editing means for editing the plurality of channels of video data reproduced by the reproducing means on the basis of the editing information inputted by input means so as to generate at least one channel of video data.

Also, an editing system according to the present invention is adapted for editing a plurality of channels of source video data on the basis of editing information inputted by an operator. The editing system includes: recording means for dividing each frame of pixel data of the plurality of channels of source video data into a plurality of subblocks, and recording the respective subblocks so that the subblocks of pixel data are dispersed onto a plurality of different disks and so that, in each disk, an angular difference from the center of the disk between a starting point of the data on a track on which the data of the subblock is arranged and a starting point of the data on an adjacent track becomes substantially constant; edited stream generating means for generating an edited stream on the frame basis constituted by desired frames of the plurality of channels of source video data recorded by the recording means; and reproducing means for outputting a video stream corresponding to the edited stream generated by the edited stream generating means, by accessing the plurality of subblocks recorded by the recording means.

In addition, an editing system according to the present invention is adapted for editing a plurality of channels of source video data on the basis of editing information inputted by an operator. The editing system includes: recording means for dividing each frame of pixel data of the plurality of channels of source video data into a plurality of subblocks, and recording the plurality of channels of source video data on the basis of a predetermined recording algorithm for recording the respective subblocks so that the subblocks are dispersed onto a plurality of different disks and so that, in each disk, a rotational delay time of a head becomes minimum in accessing a desired subblock; edited stream generating means for generating an edited stream on the frame basis constituted by desired frames of the plurality of channels of source video data recorded by the recording means; and reproducing means for outputting a video stream corresponding to the edited stream generated by the edited stream generating means, by accessing the plurality of subblocks recorded by the recording means on the basis of the predetermined recording algorithm used in recording the source video data.

Also, an editing system according to the present invention includes a data recording/reproducing device for recording/ reproducing a plurality of channels of source video data, and an editing device for editing the source video data recorded in the recording device. The data recording/reproducing device includes: recording means for dividing one frame of data of the source video data into a plurality of subblocks and recording every plurality of subblocks onto a plurality of different disks; reproducing means for reproducing the plurality of subblock data from the plurality of different disks so as to generate one frame of the source video data from the plurality of reproduced subblock data; means for preparing a block map for managing which disk of the plurality of disks is to be used and how a recording area on the disk is to be used in recording the source video data, before starting recording of the source video data; and control means for controlling the recording/reproducing means on the basis of the block map in recording the plurality of subblocks onto the plurality of disks. The editing device includes editing means for controlling the data recording device so as to read out, in real time, desired frames of the source video data recorded at random positions on the plurality of recording media, from the plurality of recording media.

Also, an editing system according to the present invention includes a data recording/reproducing device for recording/ reproducing a plurality of channels of source video data, an editing device for editing the source video data recorded in the recording device, and a computer for controlling the editing device and the data recording/reproducing device. The data recording/reproducing device includes: recording/ reproducing means for recording one frame of pixel data of the plurality of channels of source video data onto a plurality of randomly accessible recording media, and reproducing a plurality of channels of video streams constituted by desired frames of the plurality of the channels of video data stored on the plurality of recording media; and control means for controlling the recording/reproducing means on the basis of a block map for theoretically managing recording areas on the recording media on the subblock basis so that, in recording a plurality of subblocks generated by dividing the one frame of pixel data onto the respective recording media, each subblock is recorded at a position such that a rotational delay time of a head becomes minimum. The editing device includes video data processing means for processing, in real time, the plurality of channels of video streams reproduced from the data recording/reproducing device in accordance with an editing indication from the computer so as to generate edited video data.

In addition, an editing system according to the present invention is adapted for editing a plurality of channels of source video data recorded on a plurality of recording media. The editing system includes: block map generating means for generating a block map for theoretically formatting recording areas on the recording media so that, in accessing a plurality of subblocks divided from one frame of the source video data, each subblock data is recorded at a position such that a rotational delay time of a head becomes minimum; recording means for recording the plurality of channels of video data onto the recording media on the subblock basis, on the basis of the block map generated by the block map generating means; edit list generating means for generating an edit list on the frame basis constituted by desired frames existing at random positions on the recording media on which the plurality of channels of source video data are recorded; and reproducing means for reproducing a plurality of subblocks corresponding to a frame designated by the edit list from the plurality of recording media on the basis of the block map so that a video stream corresponding to the edit list is generated.

Also, an editing method according to the present invention is adapted for editing a plurality of channels of source video data recorded on a plurality of recording media. The editing method includes the steps of: dividing the one frame of pixel data of the source video data into a plurality of subblocks and transferring the divided subblocks of data to a plurality of different recording media so that the subblocks of data are recorded onto the respective recording media, while recording each subblock data at a position such that a rotational delay time of a head becomes minimum in accessing a desired subblock on the recording medium of each transfer destination; generating an edit list on the frame basis constituted by desired frames existing at random positions on the recording media on which the plurality of channels of source video data are recorded; and repeating processing to reproduce a plurality of subblocks corresponding to a frame designated by the edit list and restore the one frame from the plurality of reproduced subblocks, for each frame designated as the edit list, so as to generate an edited video stream corresponding to the edit list.

Further, an editing method according to the present invention is adapted for editing a plurality of channels of source video data recorded on a plurality of recording media. The editing method includes the steps of: generating a block map for theoretically formatting recording areas on the recording media so that, in accessing a plurality of subblocks divided from one frame of the source video data, each subblock data is recorded at a position such that a rotational delay time of a head becomes minimum; recording the plurality of channels of video data onto the recording media on the subblock basis, on the basis of the block map; generating an edit list on the frame basis constituted by desired frames existing at random positions on the recording media on which the plurality of channels of source video data are recorded; and reproducing a plurality of subblocks corresponding to a frame designated by the edit list from the plurality of recording media on the basis of the block map so that a video stream corresponding to the edit list is generated.

BRIEF DESCRIPTION OF THE DRAWINGS

FIG. 9 shows an example of a ZBR table of FIG. 8 in the case of NTSC system.

FIG. 10 shows an example of the ZBR table of FIG. 8 in the case of PAL system.

FIG. 12 shows the principle of ZBR recording.

FIGS. 13(A) and 13(B) show examples of a physical address table of FIG. 8.

FIG. 14 shows a format of a block map of FIG. 8.

FIG. 15 shows an example of the block map of FIG. 8.

FIGS. 34(A) and 34(B) illustrate generation of parity data.

FIGS. 35(A) and 34(B) illustrate error correction by parity data.

FIG. 48 illustrates processing for parity generation in the RAID controller of FIG. 47.

FIG. 49 illustrates processing for data correction in the RAID controller of FIG. 47.

FIG. 62 illustrates arrangement of subblock data of each frame on each disk.

BEST MODE FOR CARRYING OUT THE INVENTION

Preferred embodiments of the editing system and the editing method according to the present invention will now be described.

Figure 1:
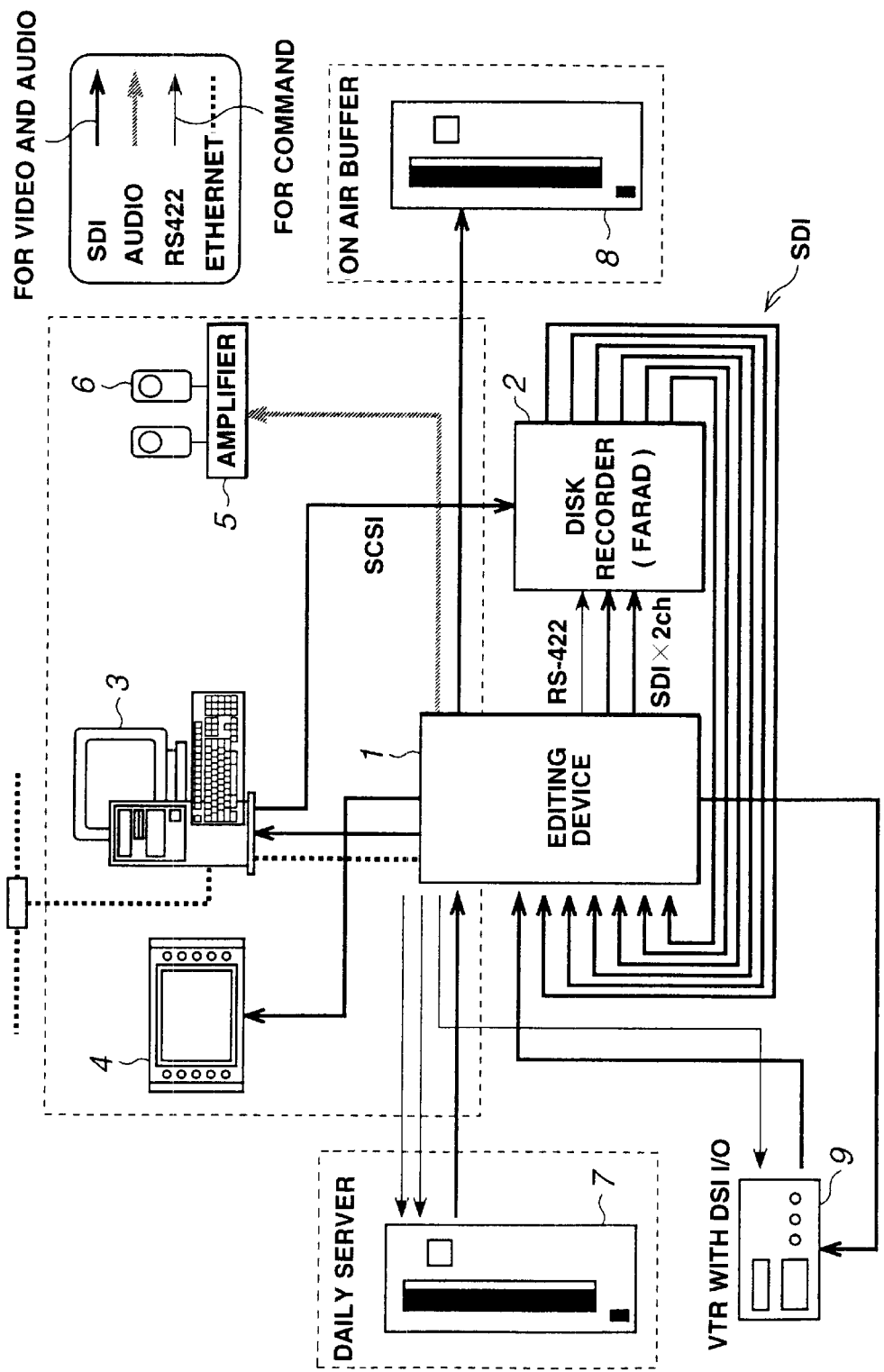
FIG. 1 is a block diagram showing an example of the structure of an editing system according to the present invention.

FIG. 1 shows an example of the structure of an editing system to which the present invention is applied. In this system, video data are inputted to an editing device 1 from a source video tape recorder (VTR) 9 and a daily server 7 so as to carry out editing. This editing device 1 controls a disk recorder 2 to carry out editing processing. The editing device 1 transmits video data and audio data to the disk recorder 2 through two channels of SDI (Serial Data Interface), and the disk recorder 2 supplies six channels of video data and 16 channels of audio data to the editing device 1 through the SDI. In addition, the editing device 1 supplies video data and audio data to a main monitor 4, an on air buffer 8, the source VTR 9, and a host personal computer 3 through the SDI. Also, the editing device 1 outputs an audio signal to an amplifier 5 so as to emit sound from a speaker 6.

Meanwhile, the host personal computer 3 sends a command to the editing device 1 by using a communication protocol of the RS-422 standard so as to control the editing device 1. Also, the editing device 1 sends a command to the disk recorder 2, the daily server 7 and the source VTR 9 through the RS-422 so as to control the respective sections. The editing device 1 is also controlled by the Ethernet through the host personal computer 3, and is capable of controlling an external device. The disk recorder 2 is controlled by the host personal computer 3 through a SCSI (ANSI Small Computer System Interface).

Figure 2:
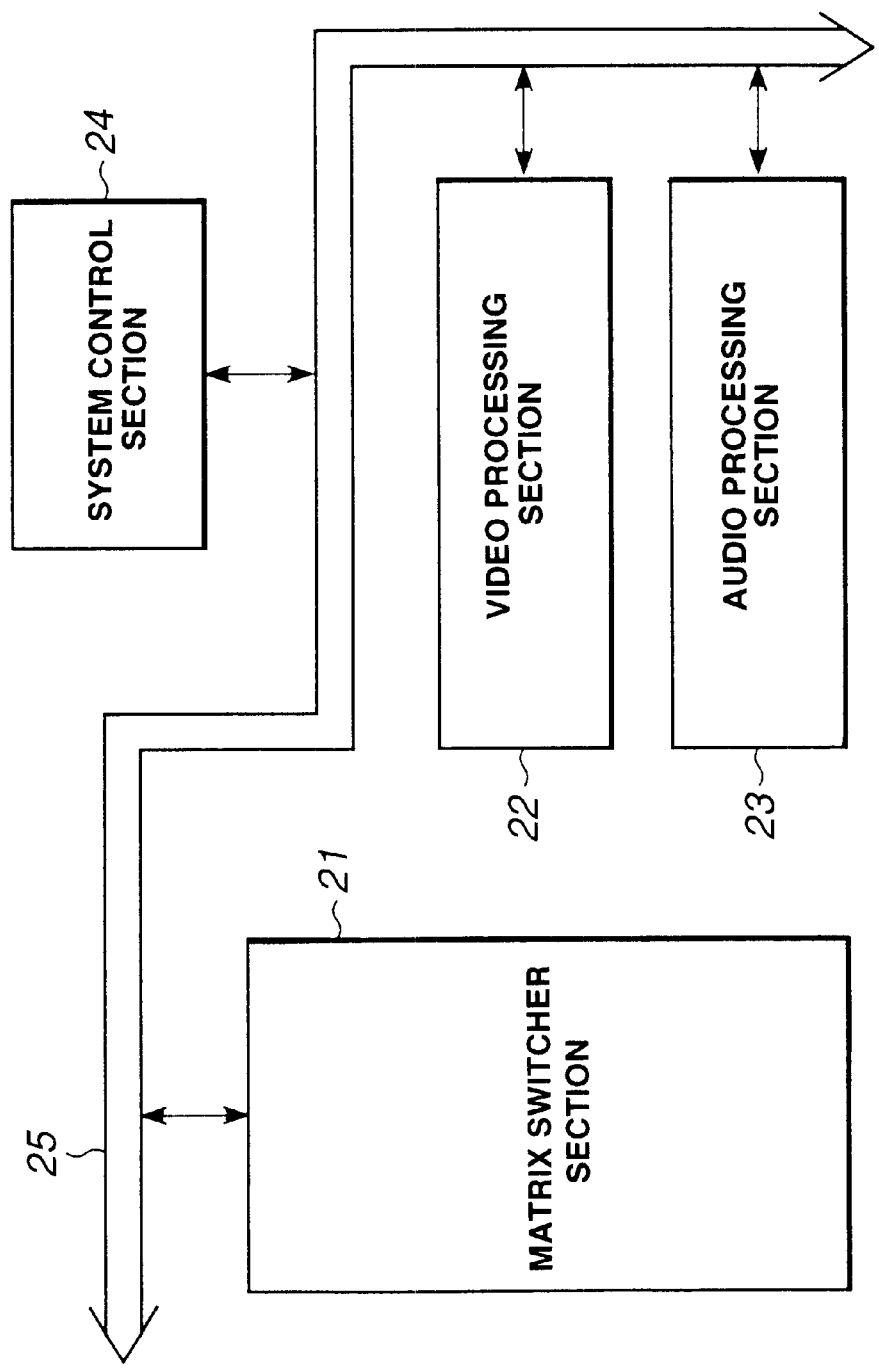
FIG. 2 is a block diagram showing the structure of an editing device of FIG. 1.

FIG. 2 shows an example of the structure of the inside of the editing device 1. This editing device 1 is constituted by a matrix switcher section 21, a video processing section 22, an audio processing section 23, and a system control section 24 which are interconnected through a control bus 25.

Figure 3:
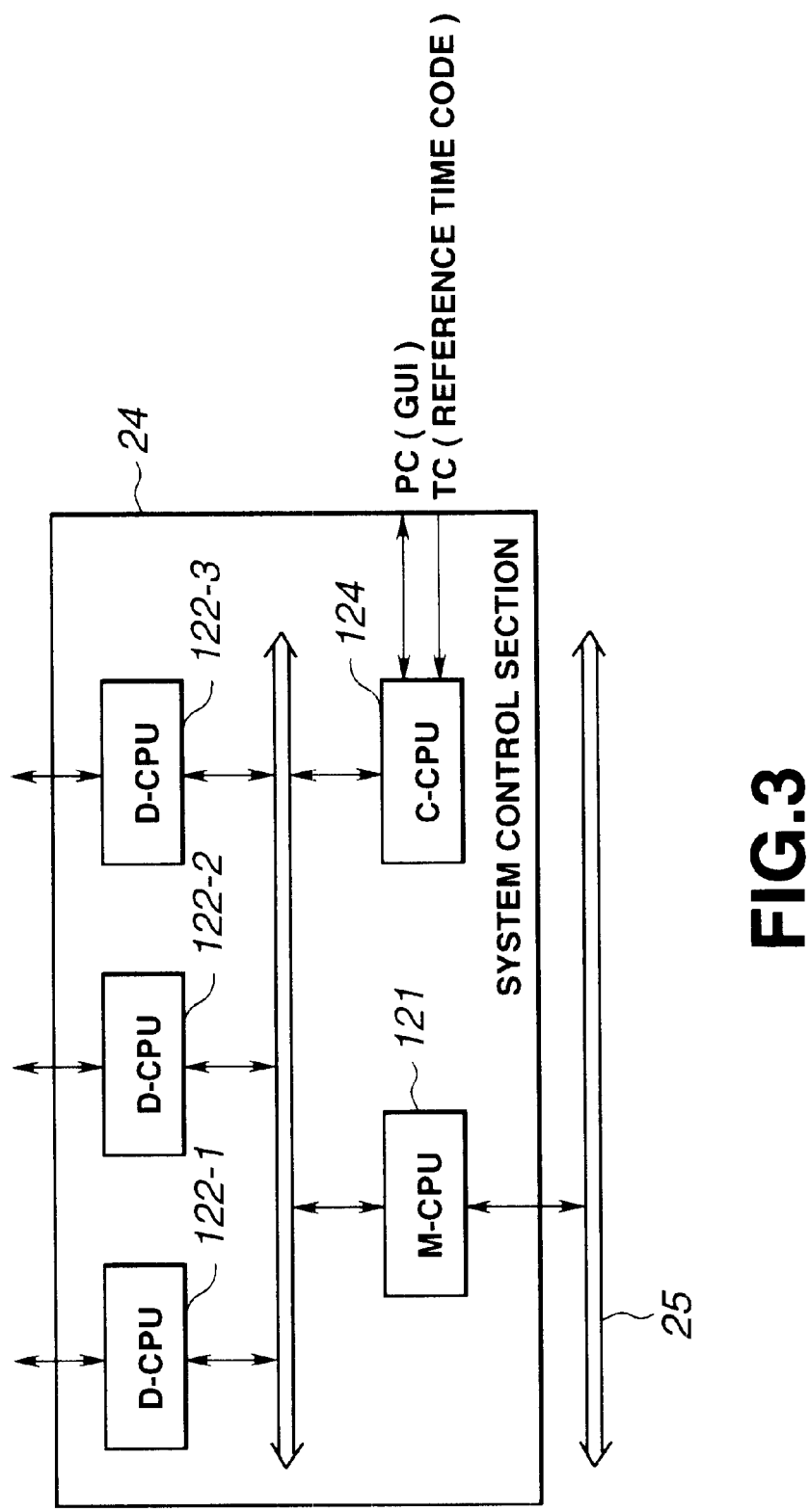
FIG. 3 is a block diagram showing the structure of a system control section of FIG. 2.

As shown in FIG. 3, the system control section 24 has a main CPU 121 for controlling the matrix switcher section 24, the video processing section 22 and the audio processing section 23 through the control bus 25, and device control CPUs 122-1 to 122-3 for controlling such devices as the source VTR 9, the disk recorder 2 as a local storage and the daily server 7. Also, the system control section 24 has a communication CPU 124 for carrying out interface processing for a GUI with respect to the host personal computer 3 and for supplying/receiving a reference time code.

Figure 4:
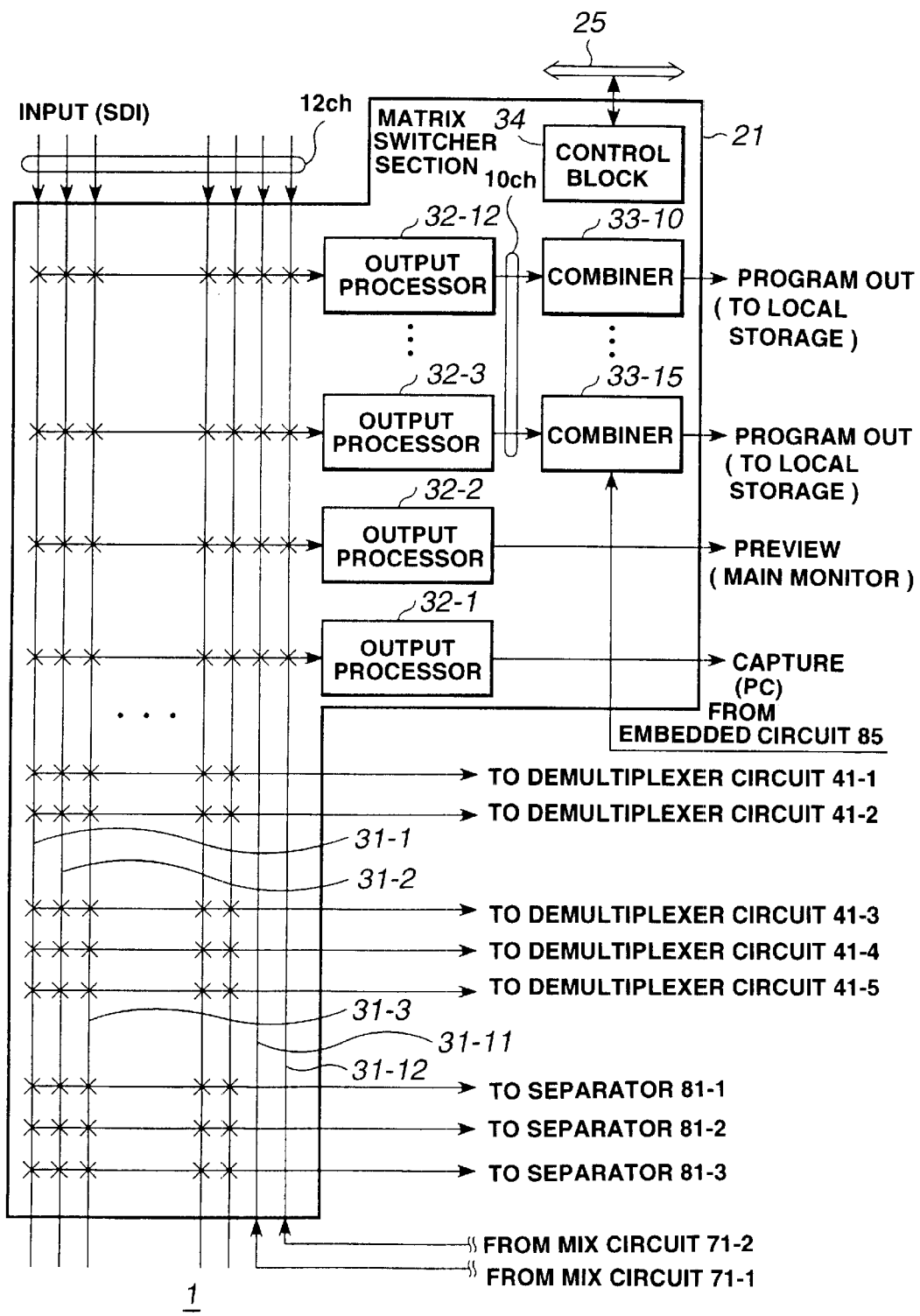
FIG. 4 is a block diagram showing the structure of a matrix switcher section of FIG. 2.

As shown in FIG. 4, the matrix switcher section 21 is a block for switching an input line and an output line. This matrix switcher section 21 has 12 input lines 31-1 to 31-12 for receiving video signals or audio signals supplied on the basis of the SDI format. With respect to these 12 input lines, 12 output lines are arranged in the form of matrix, and output processors 32-1 to 32-12 are arranged on the respective output lines. The input lines 31-1 to 31-12 and the output lines to which the output processors 32-1 to 32-12 correspond are appropriately connected at cross points indicated by × in FIG. 4. This connection is controlled in accordance with a command which is received by a control block 34 of the matrix switcher section 21 from the main CPU 121 of the system control section 24 through the control bus 25.

To these input lines, not only the video signals and audio signals from the daily server 7, the source VTR 9, or the disk recorder 2 of FIG. 1 but also video signals processed by the video processing section 22 are supplied. The control block 34 appropriately switches the cross points, thereby supplying a predetermined input of these input lines to any of the output processors 32-1 to 32-12 on the 12 output lines. The output processors 32-1 to 32-12 carry out processing for transforming the input video signals into the SDI format. An output of the output processor 32-1 is supplied as an output of a capture line to the host personal computer 3. An output of the output processor 32-3 is supplied as an output of a preview line to the main monitor 4.

Subsequent to the output processors 32-3 to 32-12, combiners 33-1 to 33-10 are provided. These combiners 33-1 to 33-10 carry out processing for superimposing an embedded audio signal supplied from the audio processing section 23 onto the video signals of the SDI inputted from the corresponding output processors 32-3 to 32-12. Outputs of the combiners 33-1 to 33-10 are supplied as outputs of program out lines to the disk recorder 2 as a local storage. The embedded audio signal means audio data inserted as auxiliary data during a blanking period of digital video data of the SDI standard.

Figure 5:
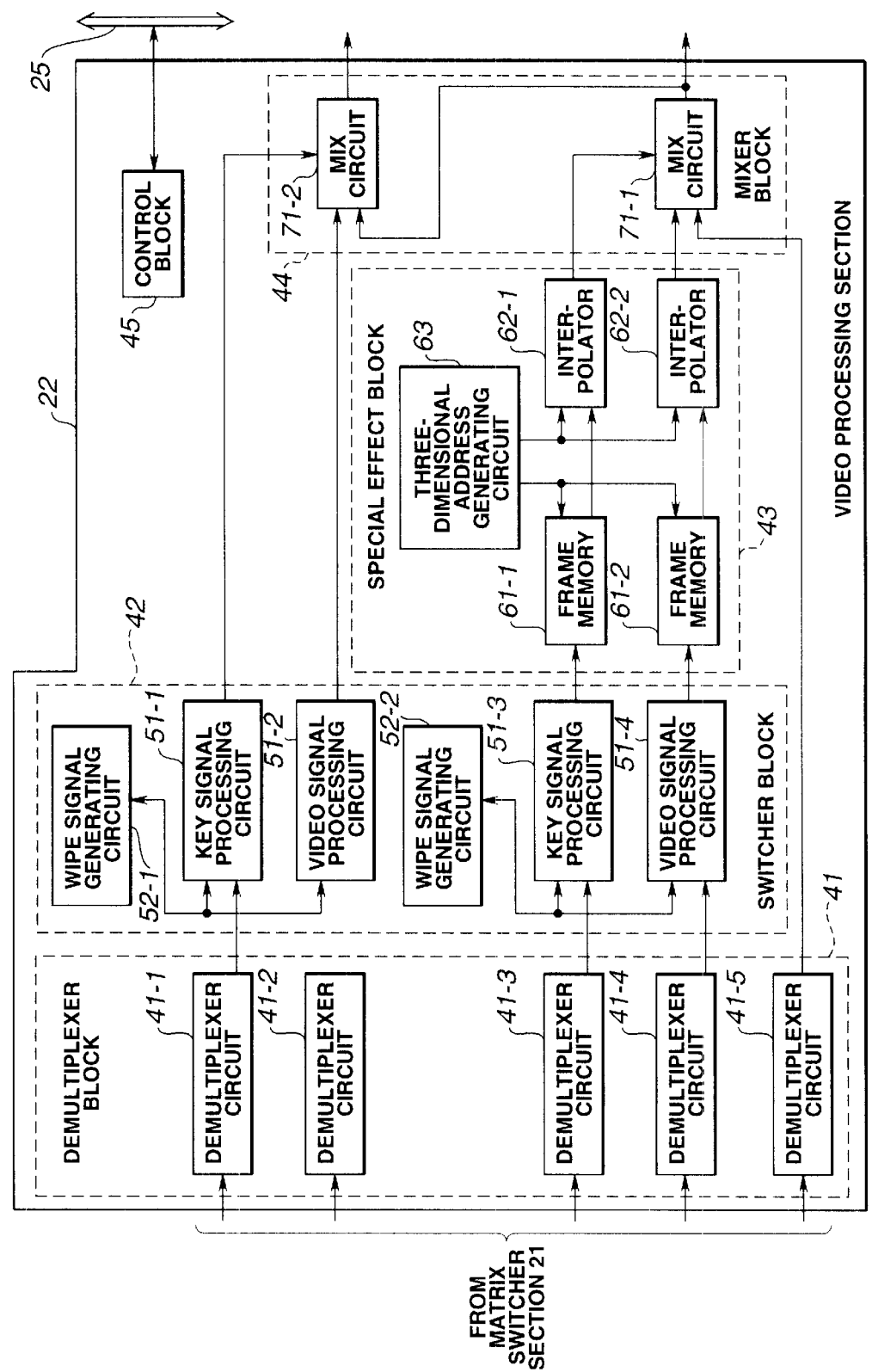
FIG. 5 is a block diagram showing the structure of a video processing section of FIG. 2.

As shown in FIG. 5, the video processing section 22 is a block for carrying out image transform processing with respect to the video signals supplied from the matrix switcher section 21. This image transform processing is processing for making a special effect on a source video signal, processing for making animation effect to insert a video signal on which a special effect is made into background video signals, processing for making a transition effect to switch an image from background video signals to foreground video signals, or synthesis processing for mixing a first video signal and a second video signal on which a special effect is made.

This video processing section 22 includes a demultiplexer block 41 for extracting a key signal or a video signal (a luminance signal and a chroma signal) from the signals of the SDI format inputted from the matrix switcher section 21, a switcher block 42 for making a transition effect such as wipe on the key signal or the video signal, a special effect block 43 for making an animation effect such as three-dimensional image transform on the key signal or the video signal, a mixer 44 for mixing the video signals from the switcher block 42, the special effect block 43 and the matrix switcher section 21, and a control block 45 for controlling the demultiplexer block 41, the switcher block 42, the special effect block 43 and the mixer block 44.

The control block 45 receives a control signal from the system control section 24 through the control bus 25, and controls the demultiplexer block 41, the switcher block 42, the special effect block 43 and the mixer block 44 through a control line, not shown.

The demultiplexer block 41 has demultiplexer circuits 41-1 to 41-5. These demultiplexer circuits 41-1 to 41-5 are circuits for extracting a video signal which is packetized in conformity to the SDI format and supplied from the matrix switcher section 21. The demultiplexer circuits 41-1 to 41-5 extract a video signal recorded in an area of a payload portion of each packet data on the basis of a synchronizing signal and header information recorded at a leading end of each of serially recorded video signals.

The switcher block 42 has wipe signal generating circuits 52-1 and 52-2 for generating a wipe signal corresponding to a transition effect designated by an operator in accordance with a control command from the control block 45. The wipe signal generating circuit 52-1 supplies a generated wipe signal to a key signal processing circuit 51-1 and a video signal processing circuit 51-2. The wipe signal generating circuit 52-2 supplies a generated wipe signal to a key signal processing circuit 51-3 and a video signal processing circuit 51-4.

The key signal processing circuit 51-1 processes the key signal supplied from the demultiplexer circuit 41-1 in accordance with the wipe signal supplied from the wipe signal generating circuit 52-1, or generates a new key signal. The video signal processing circuit 51-2 processes the video signal supplied from the demultiplexer circuit 41-2 in accordance with the wipe signal supplied from the wipe signal generating circuit 52-1.

Similarly, the key signal processing circuit 51-3 processes the key signal supplied from the demultiplexer circuit 41-3 in accordance with the wipe signal supplied from the wipe signal generating circuit 52-2, or generates a new key signal. The video signal processing circuit 51-4 processes the video signal supplied from the demultiplexer circuit 41-4 in accordance with the wipe signal supplied from the wipe signal generating circuit 52-2.

In the special effect block 43, the key signal supplied from the key signal processing circuit 51-3 and the video signal supplied from the video signal processing circuit 51-4 are stored in a frame memory 61-1 and a frame memory 61-2, respectively. A three-dimensional address generating circuit 63 receives a control command for special image transform from the control block 45, and generates a transform address for transforming the key signal and the video signal to a three-dimensional image so as to output the three-dimensional image to the frame memories 61-1, 61-2 and interpolators 62-1, 62-2. The frame memories 61-1 and 61-2 is controlled in reading of the key signal and the video signal, respectively, in accordance with the transform address from the three-dimensional address generating circuit 63. The interpolators 62-1 and 62-2 carry out processing for spatial interpolation of pixels of the key signal and the video signal supplied from the frame memories 61-1 and 61-2, respectively, on the basis of the transform address from the three-dimensional address generating circuit 63.

In the mixer block 44, a mix circuit 71-1 synthesizes the transformed video signal supplied from the interpolator 62-2 and the background video signal supplied from the demultiplexer circuit 41-5, on the basis of the image-transformed key signal supplied from the interpolator 62-1. A mix circuit 71-2 synthesizes the video signal outputted from the mix circuit 71-1 and the video signal processed on the basis of the wipe signal by the video signal processing circuit 51-2, in accordance with the key signal processed on the basis of the wipe signal and outputted from the key signal processing circuit 51-1. The video signals outputted from the mix circuits 71-1 and 71-2 are supplied to two input lines of the 12 input lines of the matrix switcher section 21.

Figure 6:
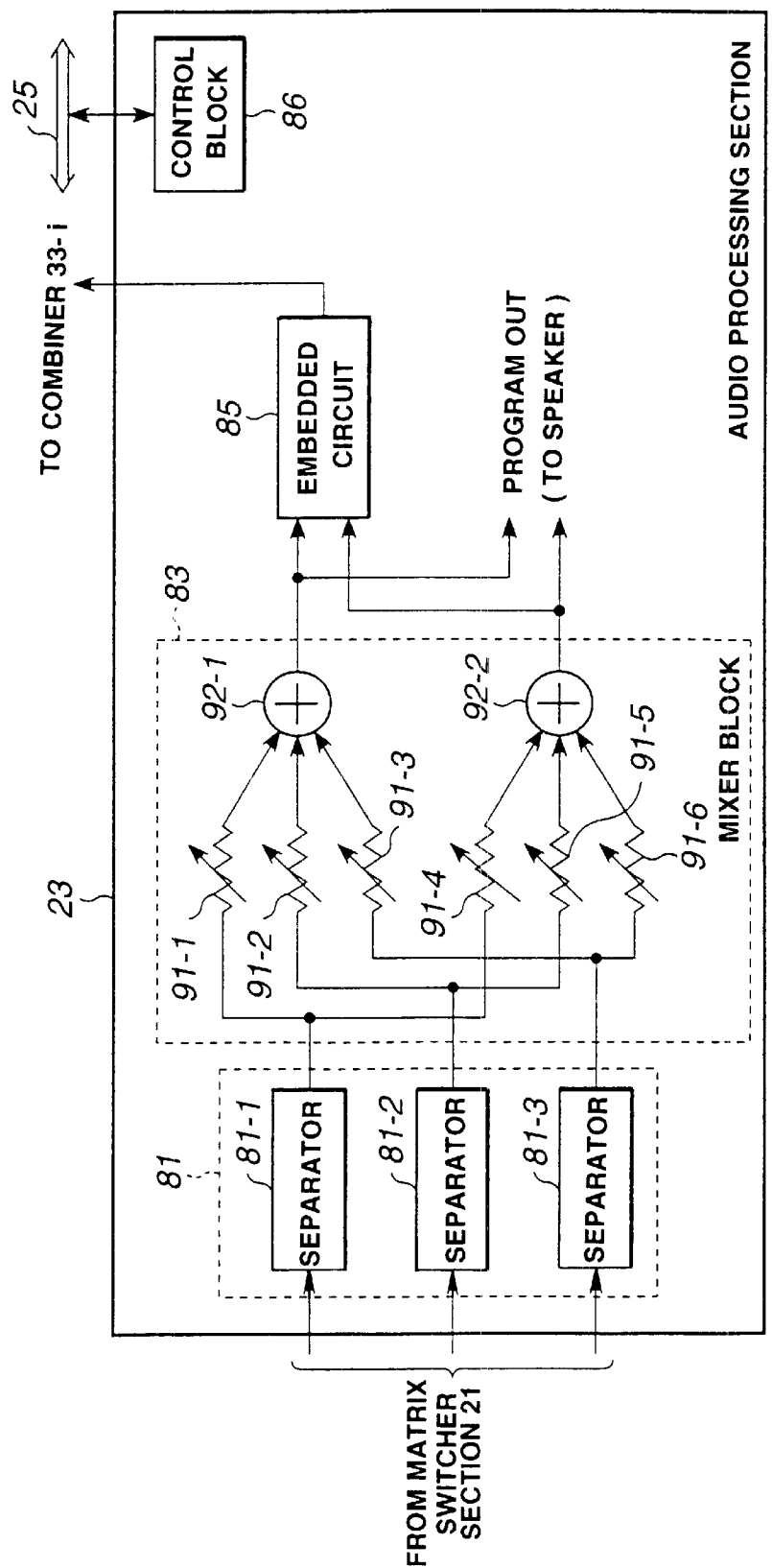
FIG. 6 is a block diagram showing the structure of an audio processing section of FIG. 2.

As shown in FIG. 6, in the audio processing section 23, a separator block 81 has separators 81-1 to 81-3. These separators 81-1 to 81-3 separate embedded audio signals from the signals of the SDI format supplied from the matrix switcher section 21. These signals are of an AES/EBU (Audio Engineering Society/European Broadcasting Union) format.

A mixer block 83 has an adder 92-1 for adding outputs of the separators 81-1 to 81-3 after adjusting these outputs to a predetermined level by variable resistors 91-1 to 91-3, and an adder 92-2 for adding the outputs of the separators 81-1 to 81-3 after adjusting these outputs to a predetermined level by variable resistors 91-4 to 91-6.

An embedded circuit 85 carries out processing for transforming the audio signals outputted from the adders 92-1 and 92-2 to embedded audio signals that can be superimposed on the signals of the SDI format. The output of the embedded circuit 85 is supplied to the combiners 33-1 to 33-10 of the matrix switcher section 21, then superimposed on the video signals transformed to the SDI format by the output processors 32-3 to 32-12, and supplied to the disk recorder 2.

A control block 86 receives a control signal from the system control section 24 through the control bus 25 so as to control the operation of the separator block 81, the mixer block 83, and the embedded circuit 85.

The outputs of the adders 92-1 and 92-2 are outputted from the speaker 6 through the amplifier 5 of FIG. 1.

Figure 7:
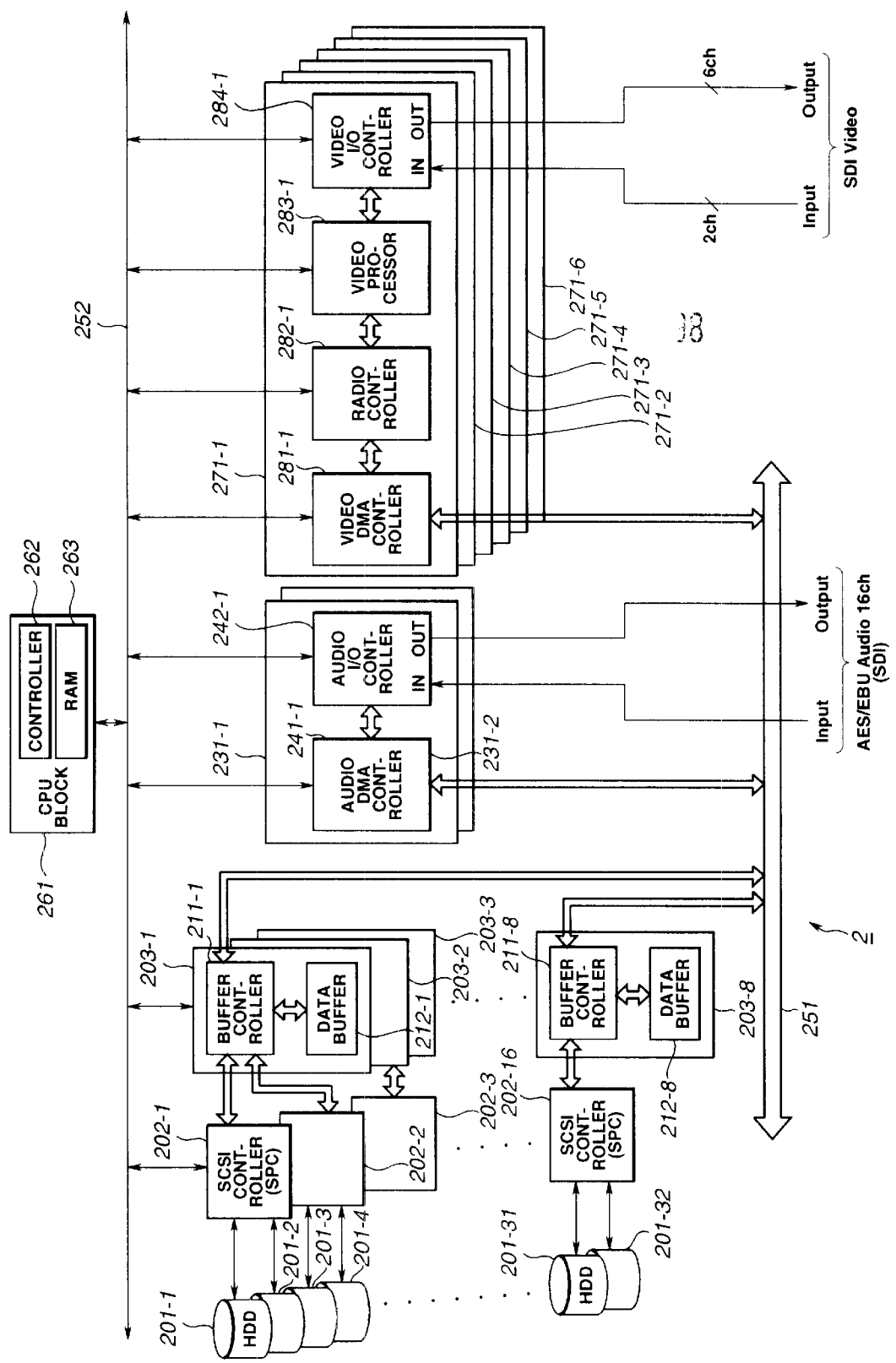
FIG. 7 is a block diagram showing an example of the structure of a disk recorder of FIG. 1.

FIG. 7 shows an example of the structure of the inside of the disk recorder 2. This disk recorder 2 applies a hard disk management algorithm FARAD (Fast Random Access Disk) (trademark) for high-speed real time random access, and enables high-speed random access to data of multiple channels with a relatively small number of disks.

In this example, 32 hard disks 201-1 to 201-32 are provided as a disk array. SCSI controllers 202-1 to 202-16 as SPCs (SCSI peripheral controller) are adapted for controlling two hard disks each. For example, the SCSI controller 202-1 controls the hard disks 201-1 and 201-2, and the SCSI controller 202-2 controls the hard disks 201-3 and 201-4.

Also, buffer blocks 203-1 to 203-8 are provided. One buffer block is adapted for controlling two SCSI controllers. For example, the buffer block 203-1 controls the SCSI controllers 202-1 and 202-2, and the buffer block 203-2 controls the SCSI controllers 202-3 and 202-4. Each buffer block 203-i (where i is an arbitrary value, in this case, i=1, 2, . . . , 8) is provided with a data buffer 212-i and a buffer controller 211-i for controlling the data buffer.

Serial addresses which are uniquely prescribed by a controller 262 of a CPU block 261 are allocated to data buffers 212-1 to 212-8, and a data storage position can be designated by using the addresses. Thus, these plural data buffers 212-1 to 212-8 constitute a single data buffer, viewed from the controller 262.

The disk recorder 2 may be equipped with a total of 36 hard disks. In this example, however, 32 hard disks are provided.

Audio blocks 231-1 and 231-2 are provided as blocks for recording and reproducing audio data to and from the hard disks 201-1 to 201-32, and video blocks 271-1 to 271-6 for recording and reproducing video data are provided.

The audio blocks 231-1 and 231-2 have similar structures and are adapted for processing eight channels of audio data each. Therefore, 16 channels of audio data in total can be processed.

Each audio block 231-i has an input/output (I/O) controller 242-i (where i=1, 2) and a DMA controller 241-i. The input/output controller 242-i receives supply of eight channels of audio signals from any one of the combiners 33-1 to 33-10 of the matrix switcher section 21 of FIG. 4, and then processes and supplies these audio signals to the DMA controller 241-i. Also, the input/output controller 242-i processes eight channels of audio signals at the maximum supplied from the DMA controller 241-i, and outputs the processed audio signals to the input line of the matrix switcher section 21 of the editing device 1 shown in FIG. 4.

The DMA controller 241-i supplies the audio signals supplied from the input/output controller 242-i to any one of the buffer controllers 211-1 to 211-8 through a DMA bus 251 so as to carry out DMA transfer to the corresponding data buffers 212-1 to 212-8. Also, the DMA controller 241-i reads data read out from the data buffers 212-1 to 212-8 through the DMA bus 251 so as to carry out DMA transfer to the input/output controller 242-i.

In the video block 271-i (where i=1,2, . . . , 6), a DMA controller 281-i carries out DMA transfer of video data between the data buffers 212-1 to 212-8 and a RAID controller 282-i through the DMA bus 251.

The RAID controller 282-i carries out error correction processing on the video data to be recorded onto the hard disks 201-1 to 201-32 supplied from a video processor 283-i, and supplies the processed video data to the DMA controller 281-i. Also, the RAID controller 282-i carries out error correction processing on the data reproduced from the hard disks 201-1 to 201-32 and supplied from the DMA controller 281-i, and outputs the processed data to the video processor 283-i. The processing of this RAID controller 282-i will be later described in detail.

The video processor 283-i carries out processing for transforming video data supplied from an input/output controller 284-i to a clock rate required for processing by the RAID controller 282-i, and conversely carries out processing for transforming the reproduced data supplied from the RAID controller 282-i to a clock rate required for processing by the input/output controller 284-i.

The input/output controller 284-i receives the video data supplied from any one of the combiners 33-1 to 33-10 of the matrix switcher section 21 of the editing device 1, and switches and supplies the video data to any one of the video processors 283-1 to 283-6. On the other hand, the input/output controller 284-i supplies the video data supplied from the video processor 283-i to the input line of the editing device 1.

In this example, since the six video blocks 271-1 to 271-6 are provided, six channels of video signals in total can be processed.

Figure 8:
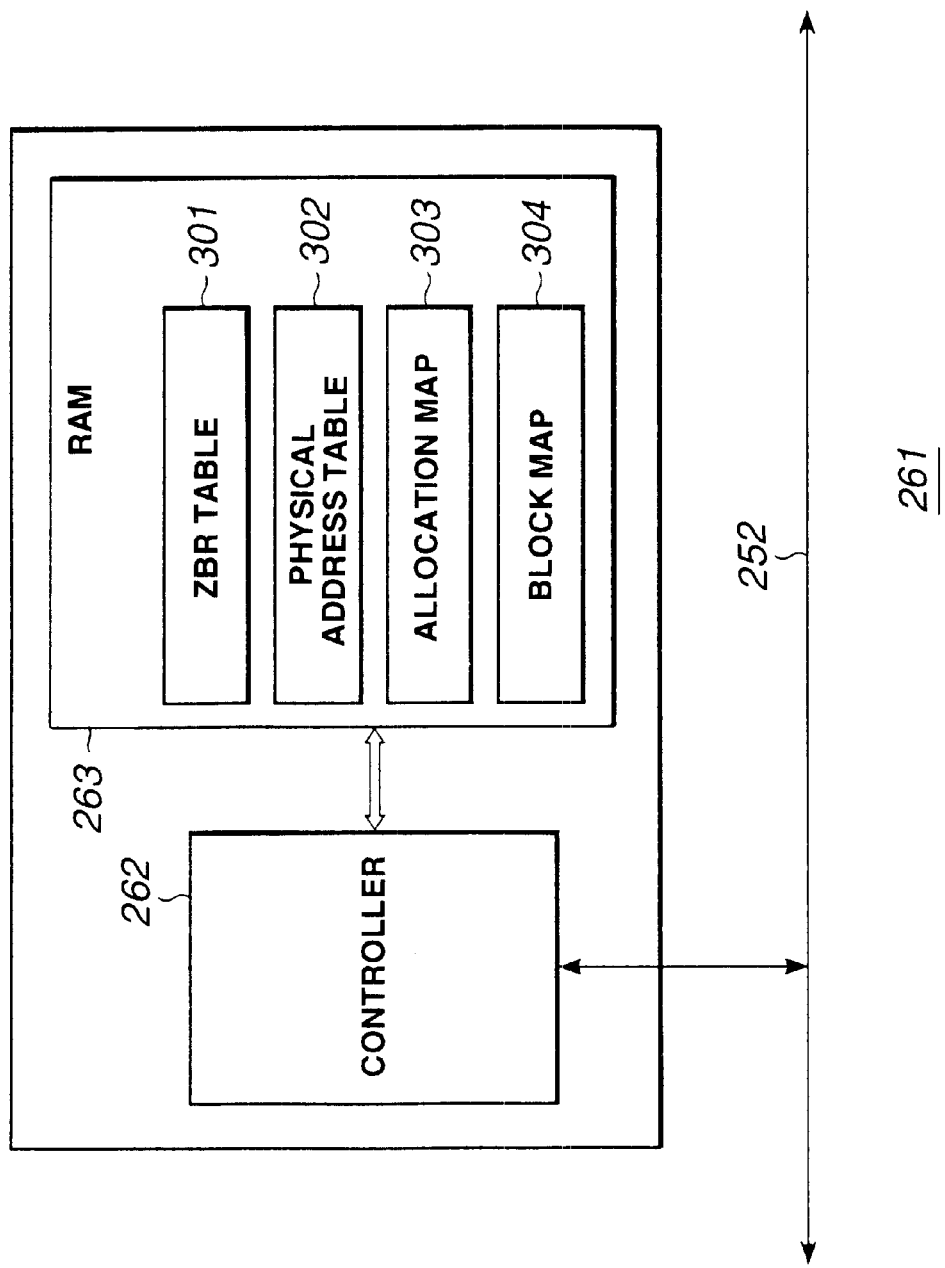
FIG. 8 is a block diagram showing an example of the structure of a CPU block of FIG. 7.

The CPU block 261 has the controller 262 and a RAM 263. The CPU block 261 is connected with the SCSI controller 202-i, the buffer block 203-i, the DMA controller 241-i, the input/output controller 242-i, the DMA controller 281-i, the RAID controller 282-i, the video processor 283-i, and the input/output controller 284-i through a control bus 252, and appropriately controls these sections. The controller 262 controls each block, and in the RAM 263, a software program necessary for the controller 262 to carry out various processing and table data are stored. The controller 262 prepares a block map 304 based on a designated format parameter and data from a zone bit recording (ZBR) table 301 formed in the RAM 263, as shown in FIG. 8, and suitably updates the block map 304. The format parameter includes a size S of one block as a recording/reproduction unit, a number n for dividing the one block of data, and an optimum skew value θskew.

In the disk recorder used in the editing system of the embodiment of the present invention, one block as a recording/reproduction unit is one video frame, and the number for dividing the one block of data is "4" in the case of video signals of the NTSC standard and "5" in the case of video signals of the PAL standard.

The controller 262 generates a command for controlling the operation of the DMA controller 281-i and the RAID controller 282-i, with reference to the block map 304. Also, the controller 262 carries out processing for scheduling the access order of the head so that the amount of head movement becomes minimum in recording or reproducing the video data or audio data buffered in the data buffer 212-i to or from the hard disk 201-i. This scheduling processing is referred to as SCAN processing. The SCAN processing will be described later.

In addition, the controller 262 generates a physical address table 302 and an allocation map 303, and records these table and map into the RAM 263, as shown in FIG. 8.

The zone bit recording (ZBR) table 301 is a table on which the cylinder addresses of the hard disks correspond to the numbers of sectors used in one track at the cylinder positions. FIGS. 9 and 10 shows examples of the ZBR table. FIG. 9 shows an example of the ZBR table in the case where video signals are of the NTSC standard. FIG. 10 shows an example of the ZBR table in the case where video signals are of the PAL standard.

Figure 11:
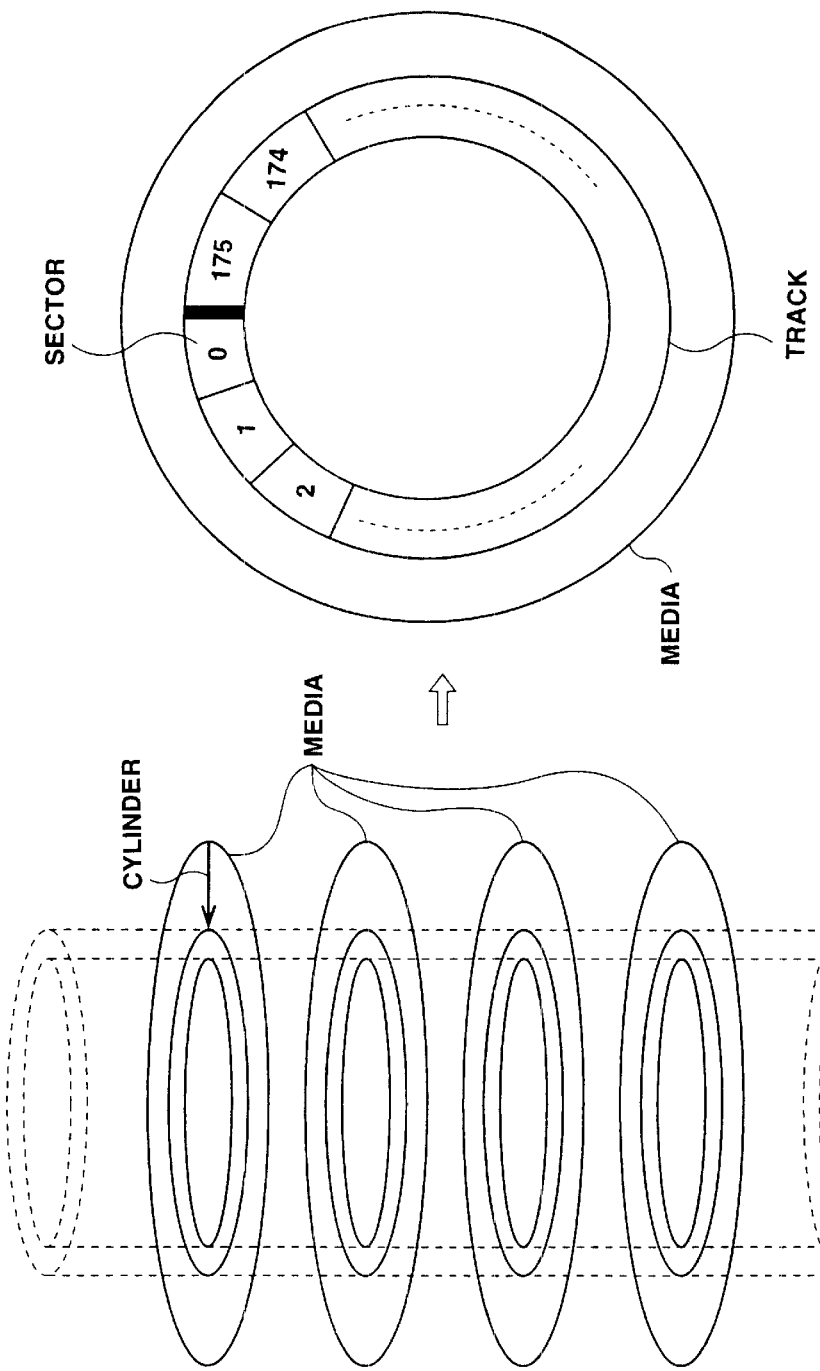
FIGS. 11(A) and 11(B) illustrate the relation between a cylinder, a track and a sector.

As shown in FIGS. 11(A) and 11(B), the hard disk 201-i is constituted by a plurality of media (disks), and a plurality of tracks are formed on each medium. Each track is segmented into a plurality of sectors, and each sector has a size of 512 bytes in this embodiment. An area defined by tracks located at the same radius from the center of the respective media is referred to as a cylinder. On this cylinder, continuous numbers are allocated from the outer circumference toward the inner circumference, and these numbers are used as cylinder addresses.

Each hard disk 201-i is formatted by zone bit recording for dividing a recording area in the direction of radius of the disk into a plurality of zones. That is, the hard disk is formatted in such a manner that the recording surface is segmented into a plurality of zones in accordance with the distance from the center of the disk, with the number of sectors per track being greater in an outer zone than in an inner zone. In this embodiment, 6000 tracks prescribed by cylinder addresses 0001 to 6000 are formed from the outermost circumference toward the innermost circumference, and the tracks are segmented into 12 zones based on 500 tracks as a unit, as shown in FIGS. 9, 10 and 12. For example, in the first zone on the outermost side prescribed by the cylinder addresses 0001 to 0500, 567 sectors are formed per track, as shown in FIG. 9. In the 12th zone on the innermost side prescribed by the cylinder addresses 5501 to 6000, the number of sectors per track is 393.

As will be later described in detail, the outermost first zone and the innermost twelfth zone of the 12 zones are used in a pair. Similarly, the second zone and the eleventh zone, the third zone and the tenth zone, the fourth zone and the ninth zone, the fifth zone and the eighth zone, and the sixth zone and the seventh zone are used in pairs, respectively. By thus using an outer zone and an inner zone in a pair, the disk capacity can be used most efficiently. This feature will be later described in detail.

Thus, since the number of sectors per track of each zone is stored on the ZBR table 301, the number of sectors that can be used in the track can be determined when the cylinder address is specified. In this embodiment, 128 words of data (where one word consists of 32 bits) can be recorded per sector.

Meanwhile, the physical address table 302 shown in FIG. 8 is a table for making correspondence between logical sector numbers (also referred to as logical block addresses) and physical addresses of the hard disk 201-i. The physical address is an address including a cylinder number, a medium number and a sector number.

FIGS. 13(A) and 13(B) shows an example of the physical address table 302. A logical sector number Lki is a number continuously appended to each sector of all the media of the hard disks 201-i. As shown in FIG. 13(A), this logical sector number Lki can be specified by a cylinder number CYLki, a medium number MEDki, and a sector number SECki. FIG. 13(B) expresses a specific example of these numbers. For example, a sector of a logical number 2 is a sector of a cylinder number 0, a medium number 0 and a sector number 2. Therefore, by referring the physical address table 302, a logical sector number can be transformed to a physical sector number, or conversely, a physical sector number can be transformed to a logical sector number.

The allocation map 303 of FIG. 8 is a map for managing addresses of a recorded area and a non-recorded area of all media (disks) of the hard disks 201-i. By referring to the allocation map 303, a non-recorded area on each disk can be retrieved.

The block map 304 is a map on a table showing what size of data are stored at which position on a disk. As shown in FIG. 14, the block map 304 is a map for managing the arrangement position on a disk for each block data (data to be recorded or data to be reproduced) having a block number indicated by k (which is an arbitrary natural not exceeding the total number of data). The one block data indicated by the block number k is, for example, one frame (an image of a predetermined size) of video data, and the block number k is a number (ID number) uniquely designated to each frame data of the video data of all channels. Thus, if reproduction of the video data is requested, the arrangement position on the disk can be specified by the block number k.

As shown in FIG. 14, one frame of block data consists of n units of subblock data Dk1 to Dkn and one error correction parity data Dkp, which are recorded on the different hard disks 201-i, respectively. The arrangement position of the parity data is prescribed by the disk identification number (ID) Dkp of the hard disk 201-i, the logical sector number Lkp indicating the record starting position of the area where the parity data are recorded, and the number of sectors Skp indicating the size of the area where the parity data are recorded.

Similarly, the arrangement position of the subblock of the number k is prescribed by the disk ID Dki of the hard disk 201-i, the logical sector number Lki indicating the record starting position of the area where the subblock is recorded, and the number of sectors Ski indicating the size of the area where the subblock is recorded.

In this case, n (number dividing one frame of video data) can be appropriately determined in accordance with its standard (NTSC or PAL) (or the data quantity). This will be later described in detail.

FIG. 15 shows a specific example of the block map 304 used in the case where one frame of video data of the NTSC standard having 1440×512 pixels is divided into four subblocks and thus recorded. In this example, parity data P1 of a frame indicated by a block number (frame number) 1 is recorded in an area (outermost area) of 567 sectors from a start logical sector of a number 0 on a hard disk with a disk ID of 1. Data S1-1 of the first subblock of the frame indicated by the block number 1 is recorded in an area (innermost area) of 393 sectors from a start logical sector of a number 599600 on a hard disk with a disk ID of 2. Similarly, data S1-2 of the second subblock of this frame is recorded in an area (outermost area) of 567 sectors from a start logical sector of a number 0 on a hard disk with a disk ID of 3, and data S1-3 of the third subblock is recorded in an area (innermost area) of 393 sectors from a start logical sector of a number 599600 on a hard disk with a disk ID of 4. Data S1-4 is recorded in an area (outermost area) of 567 sectors from a start logical sector of a number 0 on a hard disk with a disk ID of 5.

Although the size of data of one subblock is basically one-fourth the size of data of one frame, the data of one subblock is not necessarily constituted by continuous 1/4 pixel data of one frame of video data. As a matter of course, the pixel data of this subblock can be pixel data of a continuous 1/4 area of one frame of video data. In such case, however, the influence of loss of pixel data is increased accordingly. Thus, one subblock is constituted by collecting a plurality of packet transfer blocks consisting of pixel data of dispersively existing predetermined areas, instead of a continuous area, of one frame of video data. In addition, the respective subblocks are not necessarily equal in size. This feature will be later described in detail with reference to FIGS. 43 and 44.

The processing for preparing the block map 304 by the controller 262 of the CPU block 261 will now be described with reference to the flowchart of FIG. 16. This processing for preparing the block map 304 is carried out before source video data are recorded on each hard disk. That is, theoretical formatting by the prepared block map 304 is a more appropriate expression than physical formatting of the disk.

In the following description, if the hard disks 201-1 to 201-32 need not be discriminated from one another, the hard disks are referred to simply as the hard disk(s) 201. Other devices having a plurality of corresponding devices are similarly referred to.

The controller 262 predetermines the size of one subblock of video data to be recorded, the average moving distance La of the head in SCAN scheduling, the seek time Ts(L) of the drive of the hard disk 201 to be used, and the physical format of the hard disk 201 (the number of cylinders, the number of sectors in one track, and the number of media constituting a cylinder) as format parameters for generating the block map 304. (Determination of the size of the subblock will be described later with reference to FIG. 27.) Referring to these format parameters, the controller 262 determines the position of each subblock on the hard disk 201 in accordance with procedures of steps S1 to S5 shown in FIG. 16.

The average moving distance La of the head is provided by the following Equation (1) from the total number of cylinders Lt of the hard disk 201 and the number of accesses N processed in one scan. (See FIG. 24(C).)

$$La=Lt/(N-1) \quad (1)$$

Figure 17:
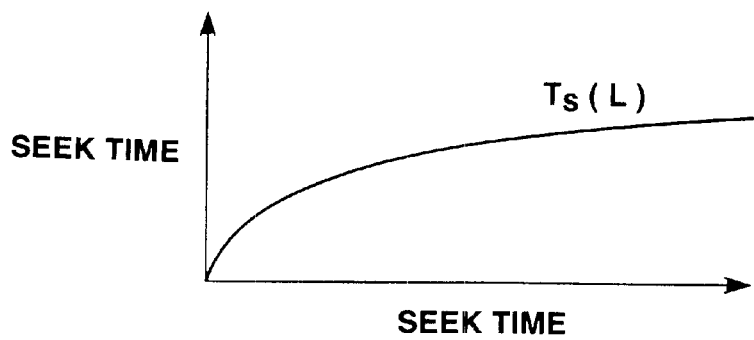
FIG. 17 shows characteristics of seek time.

The seek time Ts(L) of the drive is a function of the seek distance L (the number of cylinders), and its value is determined by mechanical characteristics of the disk drive to be used. FIG. 17 shows an example of the seek time. The number of access requests to be collectively processed by using a scan algorithm is determined from the character of an application using the disk recorder 2, the performance required, and the capacity of the data buffer 212 that can be used. As the number N of access requests to be collectively scanned increases, the random access performance of the hard disk improves. However, it also causes adverse effects such as increase in required capacity of the data buffer and increase in response time.

Figure 16:
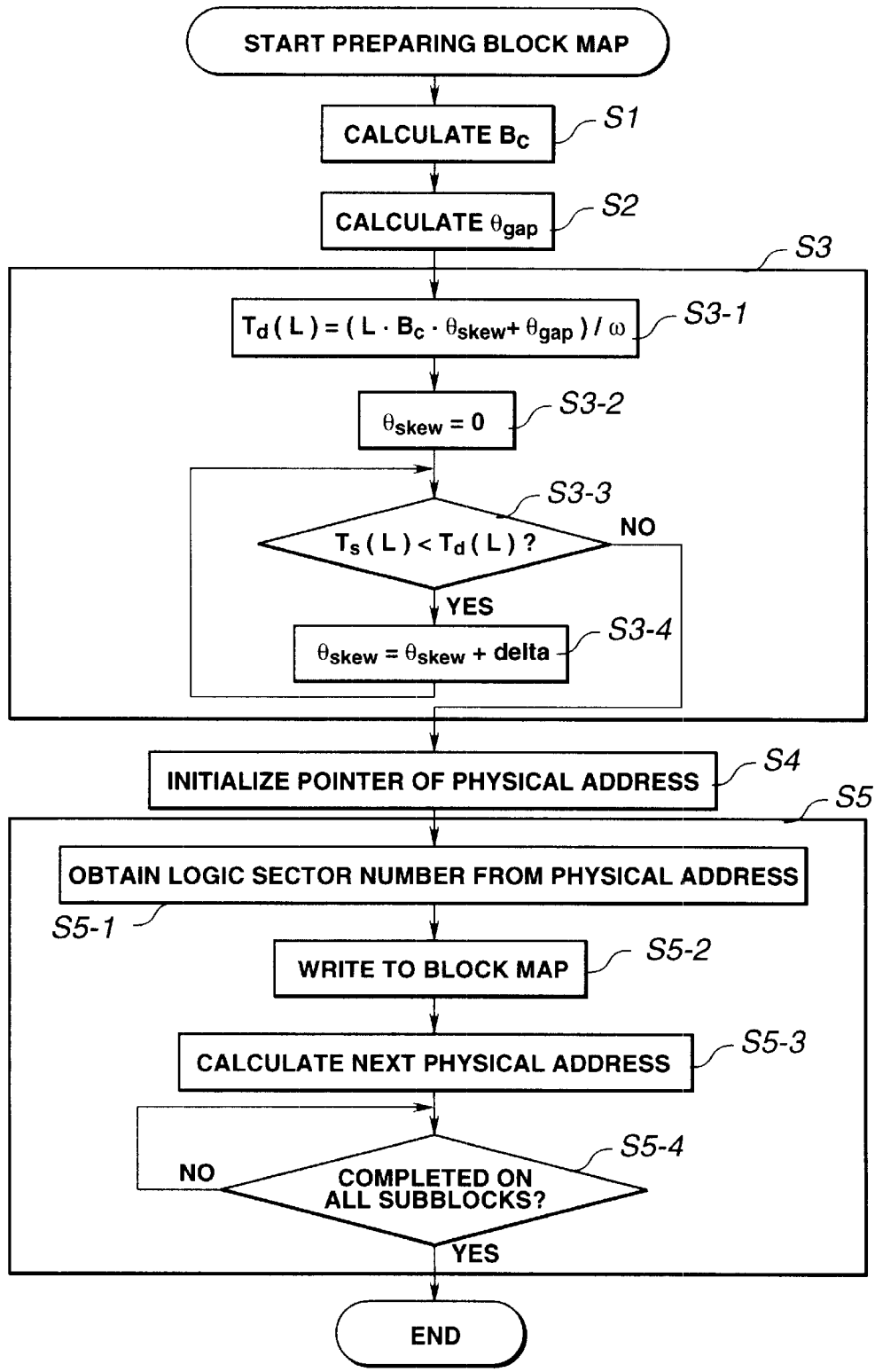
FIG. 16 is a flowchart for explaining processing for preparing the block map.

At step S1 of FIG. 16, the number (Bc) of subblocks existing in one cylinder is calculated. The total number of sectors in one cylinder is found by multiplying the number of sectors in a track by the number of media. Therefore, Bc is determined by dividing the total number of sectors in one cylinder by the number of sectors necessary for storing on subblock of data.

Figure 18:
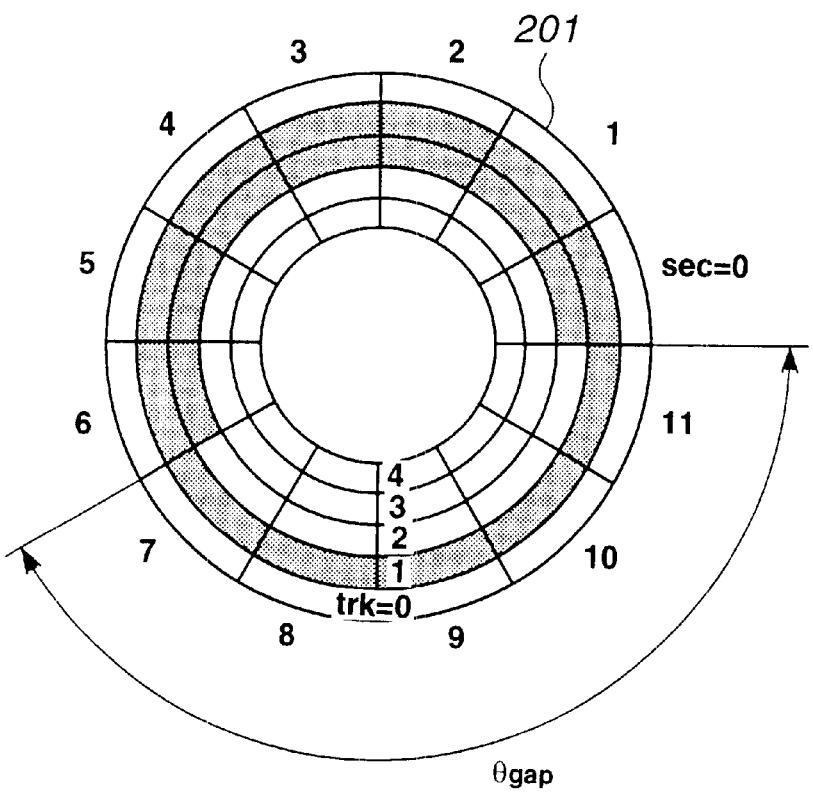
FIG. 18 illustrates a gap θgap.

At step S2, a gap θgap is found. The θgap is an angular difference viewed from the center of the disk between the leading sector and the last sector of the subblock. For example, as shown in FIG. 18, with respect to a subblock indicated by shading, its leading end is a sector "0" of a track "1" and its trailing end is a sector "6" of a sector "2". Therefore, the gap θgap is 5/12 of the circumference, that is, 5π/6 radian.

Figure 19:
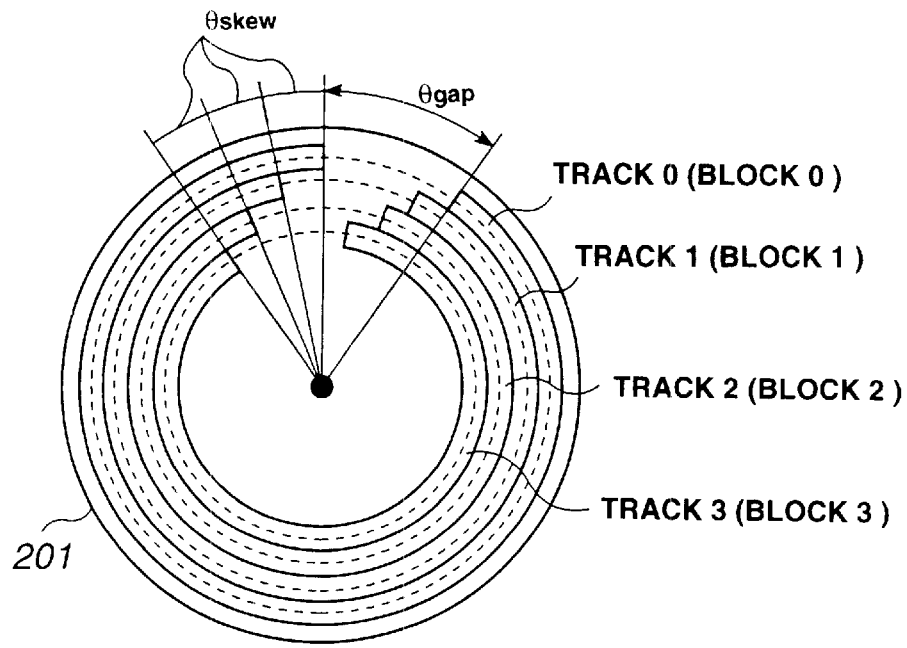
FIG. 19 illustrates the gap θgap and a skew θskew.

On the basis of these data, a skew θskew is found at step S3. The skew θskew is an angular difference in the circumferential direction viewed from the center of the disk between the leading ends of adjacent subblocks on the hard disk 201, as shown in FIG. 19. First, the position of the head at the time point when writing or reading of one subblock is completed is used as a starting point, and the time Td(L) until the leading end of the data reaches the same angle in the circumferential direction, at a position (track) shifted inward in the direction of radius from the starting point by an amount of the L cylinders, is expressed as the following Equation (2).

$$Td(L)=(L \cdot Bc \cdot \theta skew + \theta gap + 2 \cdot m \cdot \pi)/\omega \quad (2)$$

In this equation, L represents the seek distance with its unit being the number of cylinders, Bc represents the number of subblocks existing in one cylinder, θskew represents the skew with its unit being radian, θgap represents the gap with its unit being radian, ω represents the rotational speed (radian/second) of the hard disk 201, and m is an arbitrary integer number which makes Td(L) positive.

Figure 20:
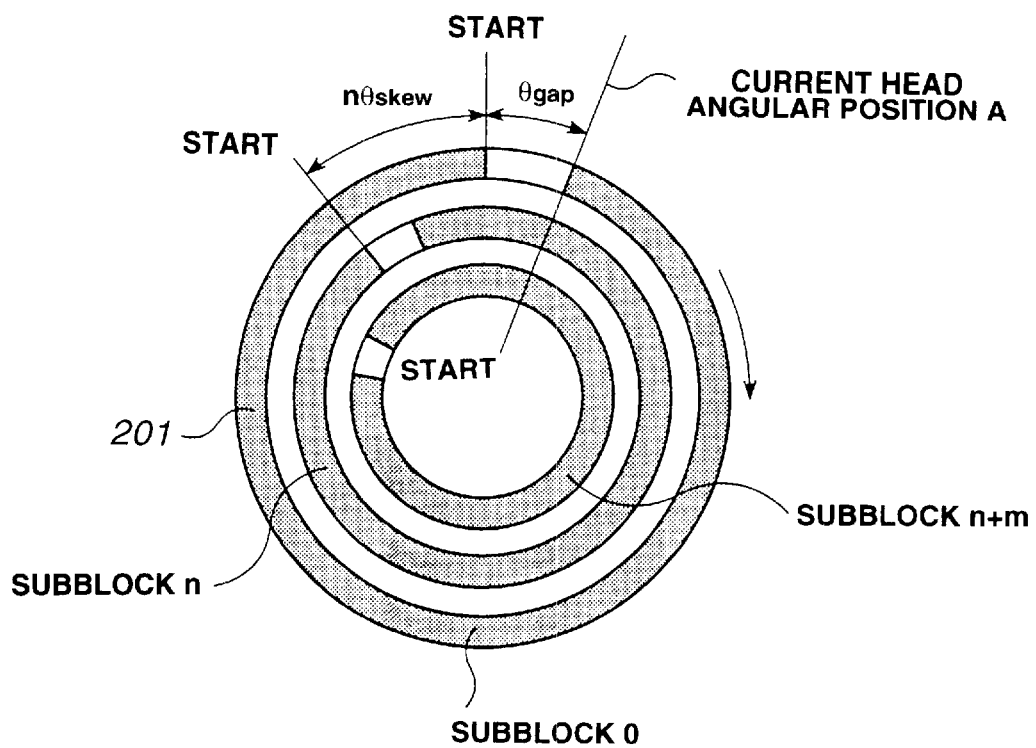
FIG. 20 illustrates the skew between plural cylinders.

FIG. 20 illustrates the meaning of the Equation (2) on the hard disk 201. In FIG. 20, it is assumed that access to a subblock "0" has just been completed. At this point, the head is located in a direction of an angle A viewed from the center. If the same subblock "0" is to be accessed again, rotation of the disk by an amount of the gap θgap must be waited for. Thus, a latency time of θgap/ω is generated.

Figure 21:
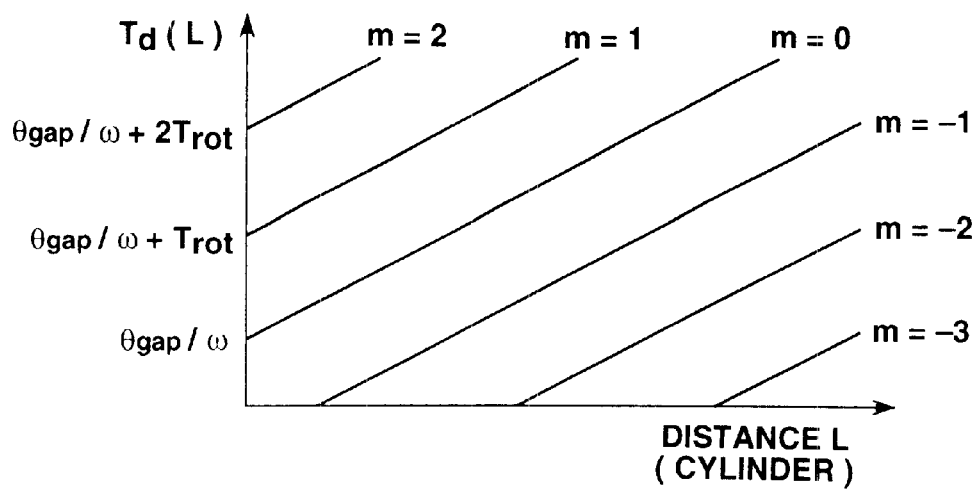
FIG. 21 illustrates the relation of the gap θgap with the cylinder.

On the other hand, to access a leading end of a subblock "n" inner than the subblock "0" by an amount of n tracks (subblocks), rotation of the hard disk 201 by an angle of sum of the skew (nθskew) of n subblocks must be waited for. Thus, a time of nθskew/ω is required. Since the hard disk 201 is rotated, the leading end of the data reaches the position where the head exists at a time obtained by adding an integral multiple of a rotation cycle (Trot) to the time found in the foregoing manner. A shift of n subblocks corresponds to a shift of n/Bc cylinders, in terms of the number of cylinders. Therefore, a graph as shown in FIG. 21 is obtained with the lateral axis representing the number cylinders and the longitudinal axis representing the latency time until the leading end reaches the head position. As the skew θskew increases, the slope of a group of lines in FIG. 21 increases.

In the foregoing description, it is assumed that the position (angle) of the head in the circumferential direction viewed from the center is constant regardless of the distance from the center. Although, actually, the position might not be accurately constant depending on the head mechanism, the influence thereof is small enough to ignore normally.

Figure 22:
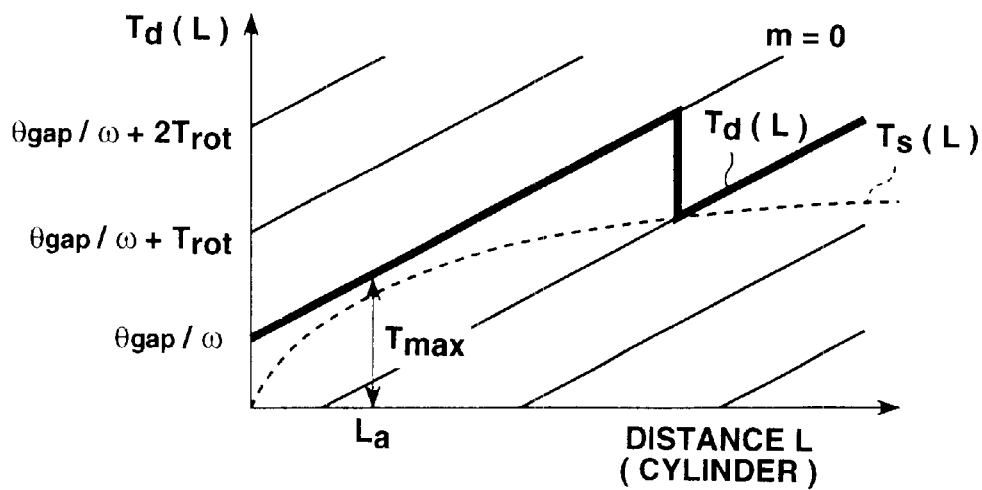
FIG. 22 illustrates the relation of the gap θgap with the cylinder.

As shown in FIG. 21, the time until the leading end of the subblock in each cylinder reaches under the head is obtained by the above-mentioned Equation (2). However, since the head must be moved to a desired cylinder within this time period, the latency time is a time until the leading end of the block first appears after the seek time. This is an overhead Td(L) in consideration of both the seek and the rotational delay. FIG. 22 shows an example of the overhead, and the following Equation (3) shows the definition thereof. The actual overhead (latency time) Td(L) is indicated by a bold line in FIG. 22. The function of the seek time Ts(L) is indicated by a dotted line. in FIG. 22, Trot represents one rotation cycle.

At step S3-1, the equation of a straight line such as Equation (2) or m=0 in FIG. 21, that is, an equation expressed by the following Equation (3) is found.

$$Td(L)=(L \cdot Bc \cdot \theta skew + \theta gap)/\omega \quad (3)$$

At subsequent steps S3-2, S3-3 and S3-4, the skew θskew is selected so that the straight line is constantly above (greater than) the seek time Ts(L) and substantially tangent to the seek time Ts(L).

Specifically, at step S3-2, the controller 262 initializes the skew θskew to 0, and at step S3-3, compares the size of the seek time Ts(L) and the overhead Td(L). If it is determined that the seek time Ts(L) is smaller than the overhead Td(L), the controller 262 proceeds to step S3-4 so as to make increment of the skew θskew by an amount of delta. Then, the controller 262 returns to step S3-3 so as to compare the size of the seek time Ts(L) and the overhead Td(L) again.

Thus, the processing of steps S3-3 and S3-4 is repeatedly carried out until it is determined that the seek time Ts(L) is equal to or greater than the overhead Td(L). If it is determined at step S3-3 that the seek time Ts(L) is equal to or greater than the overhead Td(L), the slope (skew θskew) of the straight line of m=0 located most closely to and above the seek time Ts(L) in FIG. 22 is found.

At steps S4 and S5, by using the skew θskew and the gap θgap thus obtained, the position of each subblock on the disk is determined over the entire hard disk 201. First, at step S4, a pointer of the physical address (cylinder/medium/sector) is initialized to (0/0/0). The subsequent step S5 is a loop for repeating with respect to all the subblocks. Within the loop, at step S5-1, a logical sector number is obtained from the physical address with reference to the physical address table 302, and at step S5-2, the logical sector number and information such as the physical address are written in the block map 304.

On completion of up to this processing, the pointer Ppa of the physical address is updated at step S5-3 as preparation for processing of the next subblock. At step S5-4, it is discriminated whether or not the processing of steps S5-1 to S5-3 has been carried out with respect to all the subblocks. If the processing has not been carried out with respect to all the subblocks, the processing of steps S5-1 to S5-3 is carried out on the subblocks which are not processed. At this point, the location of the N-th subblock on the hard disk 201 is an area which:

(1) is rear from the allocated subblock (that is, the inner side in the case where subblocks are allocated sequentially from the outer side, or the outer side in the case where subblocks are allocated sequentially from the inner side); and (2) employs a sector with an angular difference from the leading end of the 0th block being most close to Nθskew, as the leading end.

By thus carrying out the foregoing flow of processing, the block map 304 as shown in FIGS. 14 and 15 can be prepared. At the time when the block map 304 is prepared, actual video data and parity data are not yet recorded on the disk. In short, the block map 304 as shown in FIGS. 14 and 15 is prepared before video data are actually recorded on the disk.

The block map 304 includes data for theoretically formatting the recording area on the disk so that video data and parity data are recorded in accordance with the prepared block map 304. In other words, the block map 304 includes data for reserving the recording area on the disk so that video data and parity data are recorded in accordance with the block map 304.

Thus, in the example of the block map shown in FIG. 15, the recording area on the disk is reserved so that parity data P1 of the frame indicated by the block number (frame number) 1 is recorded in the area (outermost area) of 567 sectors from the start logical sector of the number 0 on the hard disk with the disk ID 1. Also, the recording area on the disk is reserved so that data S1-1 of the first subblock of the frame indicated by the block number 1 is recorded in the area (innermost area) of 393 sectors from the start logical sector of the number 599600 on the hard disk with the disk ID 2. Similarly, the recording area on the disk is reserved so that data S1-2 of the second subblock of this frame is recorded in the area (outermost area) of 567 sectors from the start logical sector of the number 0 on the hard disk with the disk ID 3, and the recording area on the disk is reserved so that data S1-3 of the third subblock is recorded in the area (innermost area) of 393 sectors from the start logical sector of the number 599600 on the hard disk with the disk ID 4. The recording area on the disk is reserved so that data S1-4 of the fourth subblock is recorded in the area (outermost area) of 567 sectors from the start logical sector of the number 0 on the hard disk with the disk ID 5.

The worst overhead that should be considered in guaranteeing the real time property in this embodiment will now be described.

Figure 23:
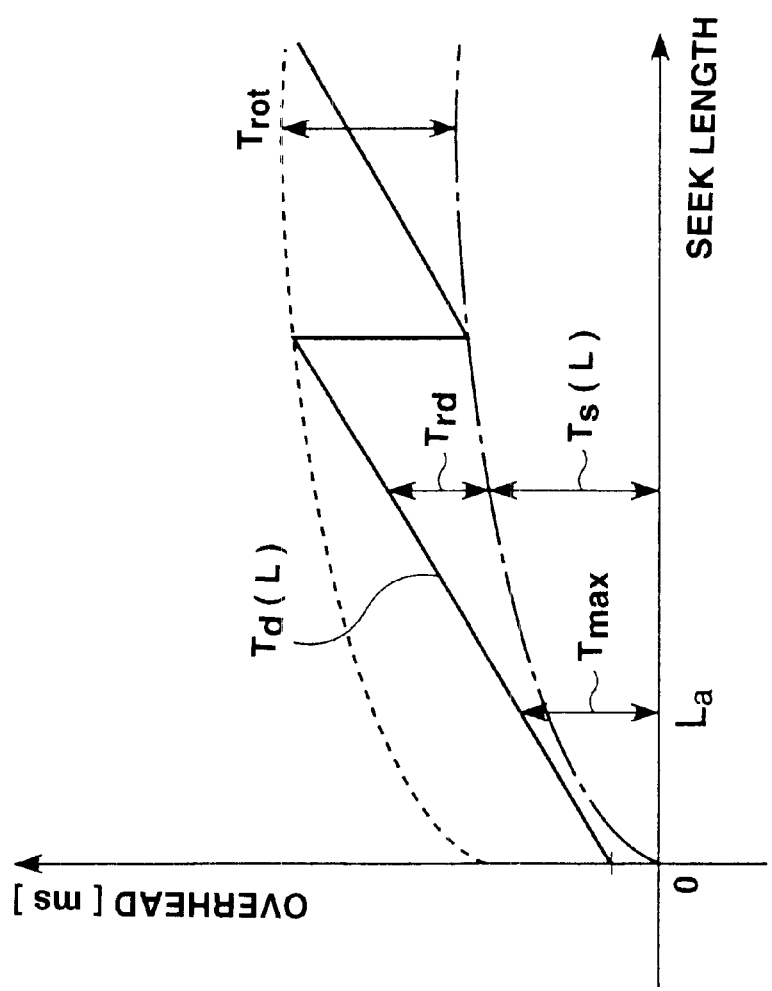
FIG. 23 illustrates the relation of the gap θgap with the cylinder.

FIG. 23 shows the overhead time of the disk on which each subblock is arranged as shown in FIG. 19. The lateral axis represents the seek distance, that is, the number of cylinders L crossed by the head of the hard disk 201 as it moves. The longitudinal z axis represents the time Td(L) required therefor. A chain-dotted line expresses the seek time Ts(L) and a solid line expresses the overall overhead time Td(L). Since the overhead time is the sum of the seek time Ts(L) and the rotational delay time Trd, the difference between the solid line and the chain-dotted line is the rotational delay time Trd.

Figure 24:
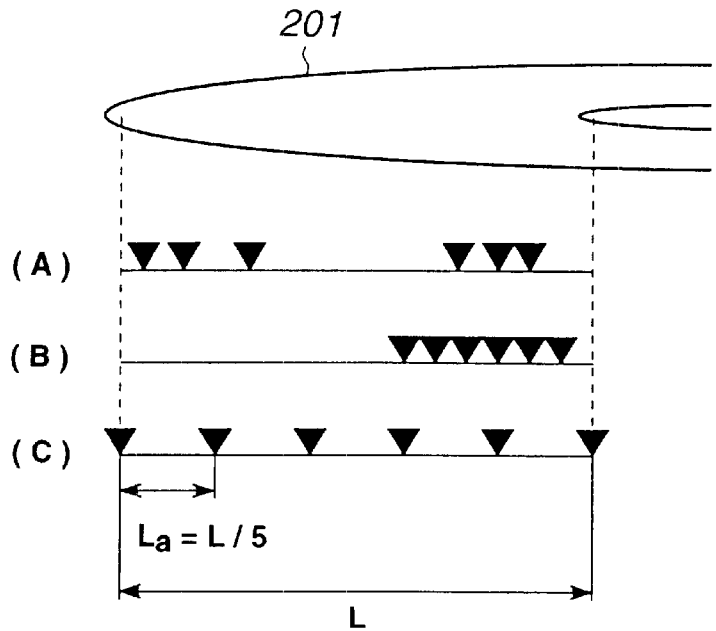
FIG. 24 illustrates scheduling.

In general, an access request is generated at any position on the hard disk 201. The portion processed by one scan is partially distributed as shown in (A) and (B) of FIG. 24, or on the contrary, uniformly distributed as shown in (C) of FIG. 24. In the example of FIG. 24, since the head moves between six access requests, five random accesses and accompanying overheads are generated. At each time of random access, the overhead indicated by the bold line in FIG. 22 is generated. The sum of overheads with respect to the five random accesses becomes worst when all the accesses are uniformly distributed as shown in (C) of FIG. 24 in the case where the function Td(L) of the overhead is convex upward as shown in FIG. 23. When the accesses are partially distributed, the sum of overheads is smaller. In other words, when the overhead at the average moving distance La (=L/5) of the head is repeatedly generated, the sum of overheads becomes worst (maximum).

At step S3 shown in FIG. 16, the skew θskew is selected so that one of the group of lines having the rotational delay expressed by Equation (2) is above and as close as possible to the seek time Ts(L). Thus, Td(L) can be reduced near the distance La, and the maximum overhead Tmax can be reduced.

Figure 25:
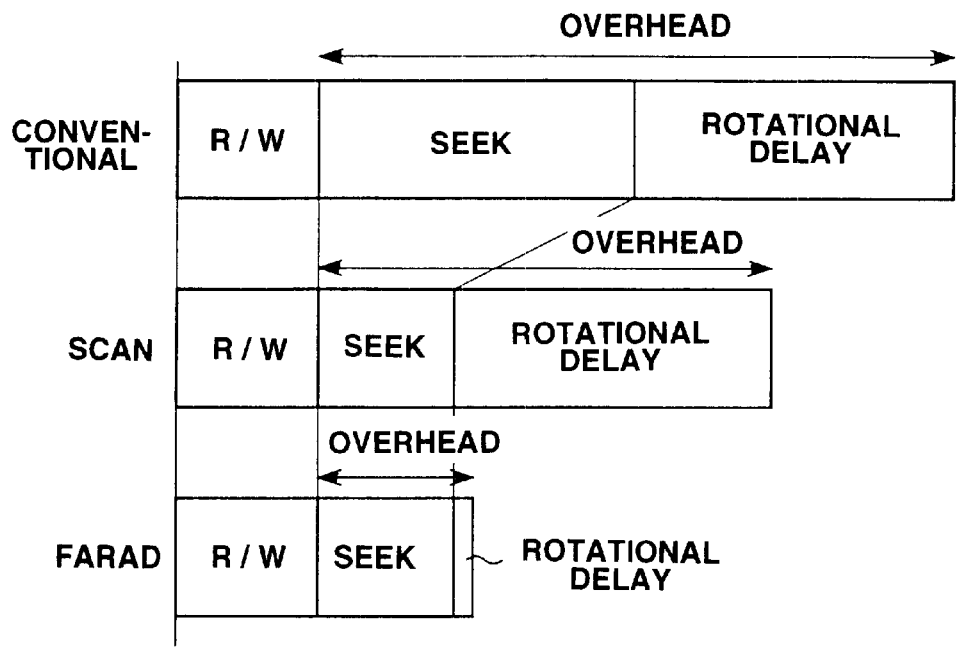
FIG. 25 illustrates overhead.

FIG. 25 schematically shows the length of the overhead in the case where the algorithm by the foregoing method (FARAD system (trademark)) is used. As shown in FIG. 25, in the SCAN system for collecting a plurality of accesses and sequentially making accesses in the range of collected accesses from the outer circumference toward the inner circumference or conversely from the inner circumference toward the outer circumference, the seek time can be reduced in comparison with the conventional method for making accesses in the order of generation. However, in this SCAN system, the rotational time delay cannot be reduced through the seek time can be reduced in comparison with the conventional case. On the other hand, in the above-described method (FARAD system (trademark)), not only the seek time can be reduced similarly to the SCAN system, but also the rotational time delay can be reduced in comparison with the conventional case (or SCAN system). Therefore, the total overhead can be made shorter than in the case of the SCAN system.

As described above, in this embodiment, the overhead Td(L) at the average moving distance La of the head can be restrained to the minimum level by appropriately selecting the skew θskew and the gap θgap (so that the skew θskew corresponds to the gap θgap). Thus, the rotational time delay can be reduced.

In the processing of the flowchart of FIG. 16, the size of the subblock is the fixed value. However, the size of the subblock is selectable in a certain range. In this case, since both the gap θgap and the skew θskew can be changed, the position of the line can be controlled more precisely so as to be close to the seek time near the average moving distance La. This feature will be later described in detail.

By the above-described method, the overhead accompanying the move between subblocks is significantly improved. However, in the case where the subblock is large across a plurality of tracks or a plurality of cylinders, the time required for change of track and the time required for moving to an adjacent cylinder must be considered. The time required for change of track and the time required for moving an adjacent cylinder are constant, respectively. Therefore, by providing a skew between tracks or between cylinders so that the data reach under the head after the lapse of the required time, generation of a long rotational delay time within the subblock due to the change of track or the move between cylinders can be restrained.

Figure 26:
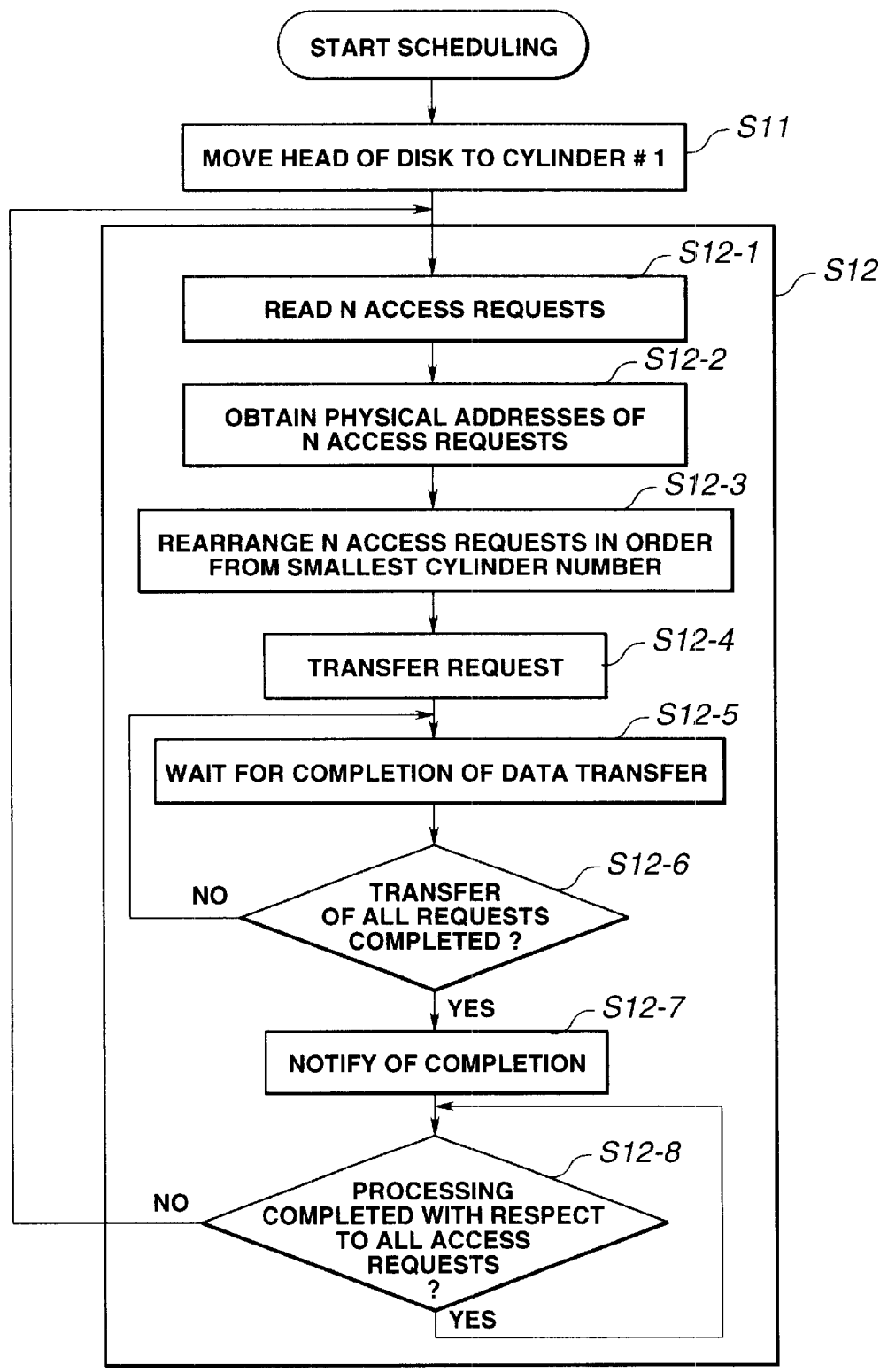
FIG. 26 is a flowchart for explaining scheduling processing of a controller of FIG. 7.

A SCAN algorithm for scheduling for the controller 262 to determine the access order of th head so that the quantity of movement of the head becomes minimum will now be described. FIG. 26 shows a flowchart of scheduling processing based on this SCAN algorithm. At step S11, the controller 262 controls the SCSI controller 202 so as to move the head of the hard disk 201 to a cylinder "#0". Then, the controller 262 shifts to step S12 for actual scheduling.

At step S12-1 of step S12, the controller 262 reads N units of access requests sequentially from the temporally preceding (old) one, from a built-in access request buffer (not shown). In this access request buffer, access requests supplied from the host personal computer 3 are held in the order of input. In one access request, the number of the subblock to be accessed and the leading address of the data buffer 212 to be used for data transfer are described. The number of units N is a constant provided in advance from the host personal computer 3.

At step S12-2, the controller 262 learns the physical address (cylinder number, medium number, and sector number) of the subblock to be accessed, referring to the block map 304 with respect to each of the N access requests. Then, at step S12-3, these N access requests are rearranged in the order from the smallest cylinder number (from the outer circumference to the inner circumference). By this operation, the schedule of the SCAN algorithm is realized.

At step S12-4, the rearranged access requests are sent sequentially from the smallest cylinder number to the hard disk 201 through the SCSI controller 202, and actual access and data transfer are carried out. When an access indication for one subblock is made, completion of data transfer is waited for at step S12-5, and then the next access indication is made. At step S12-6, it is discriminated whether transfer of all the requests is completed or not. If there is any request which is not transferred, the controller returns to step S12-4 so as to carry out the same processing. By repeating this operation for N times, it is determined at step S12-6 that processing of the N access requests is completed.

Then, at step S12-7, the host personal computer 3 is notified of the completion of processing of the N accesses, and a series of processing concerning the N access requests ends.

At the last step S12-8, it is discriminated whether or not all the access requests are processed to clear the access request buffer. If there is any access request left in the access request buffer, the controller 262 returns to step S12-2 so as to take out next N access requests and continue processing. If there are not N access requests in the access request buffer, the controller 262 waits at this step until N requests are accumulated. When N requests are accumulated, the controller 262 returns to step S12-2 to carry out the same processing.

Also, the controller 262 determines the size of the subblock and the record starting position of the subblock so that the gap θgap and the skew θskew are substantially constant over the entire area from the outer side to the inner side of the hard disk 201. Thus, the real time property of access can be further improved. Actually, the controller 262 generates the block map 304 so that the gap θgap and the skew θskew are substantially constant over the entire area from the outer side to the inner side of the hard disk 201.

Referring to the flowcharts of FIGS. 27 to 32, processing procedures in the case where the controller 262 arranges the k-th subblock on a predetermined track on a predetermined hard disk 201 will now be described.

First, at step S31, n+1 units of hard disks 201 for storing parity data for error correction and n units of subblock data are selected from m units of hard disks in total (m=32 in the case of the embodiment of FIG. 7). In this example, the hard disk 201 for storing the parity data is first selected, and then, the hard disk 201 for sequentially arranging the subblock data from the inner side and a hard disk 201 for sequentially arranging the subblock data from the outer side are selected.

When numbers 1 to n are appended to the respective subblocks, the subblocks of odd numbers are sequentially arranged from the inner side on the hard disk 201, and the subblocks of even numbers are sequentially arranged from the outer side on the hard disk 201. In addition, in order to prevent concentrated arrangement of the subblocks on a small number of hard disks 201, the hard disks 201 are selected in such a manner that the hard disks for arrangement are shifted depending on the data.

Figure 27:
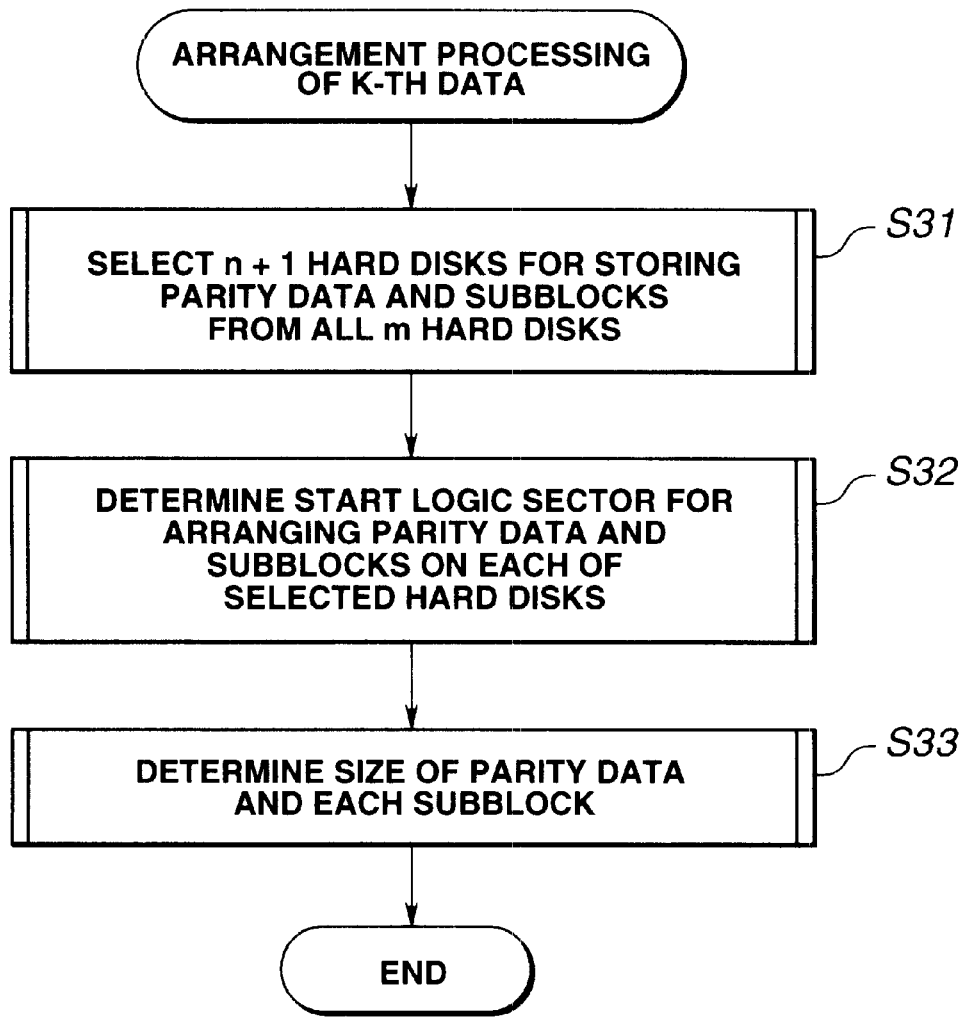
FIG. 27 is a flowchart for explaining arrangement processing of the k-th data of the controller of FIG. 7.
Figure 28:
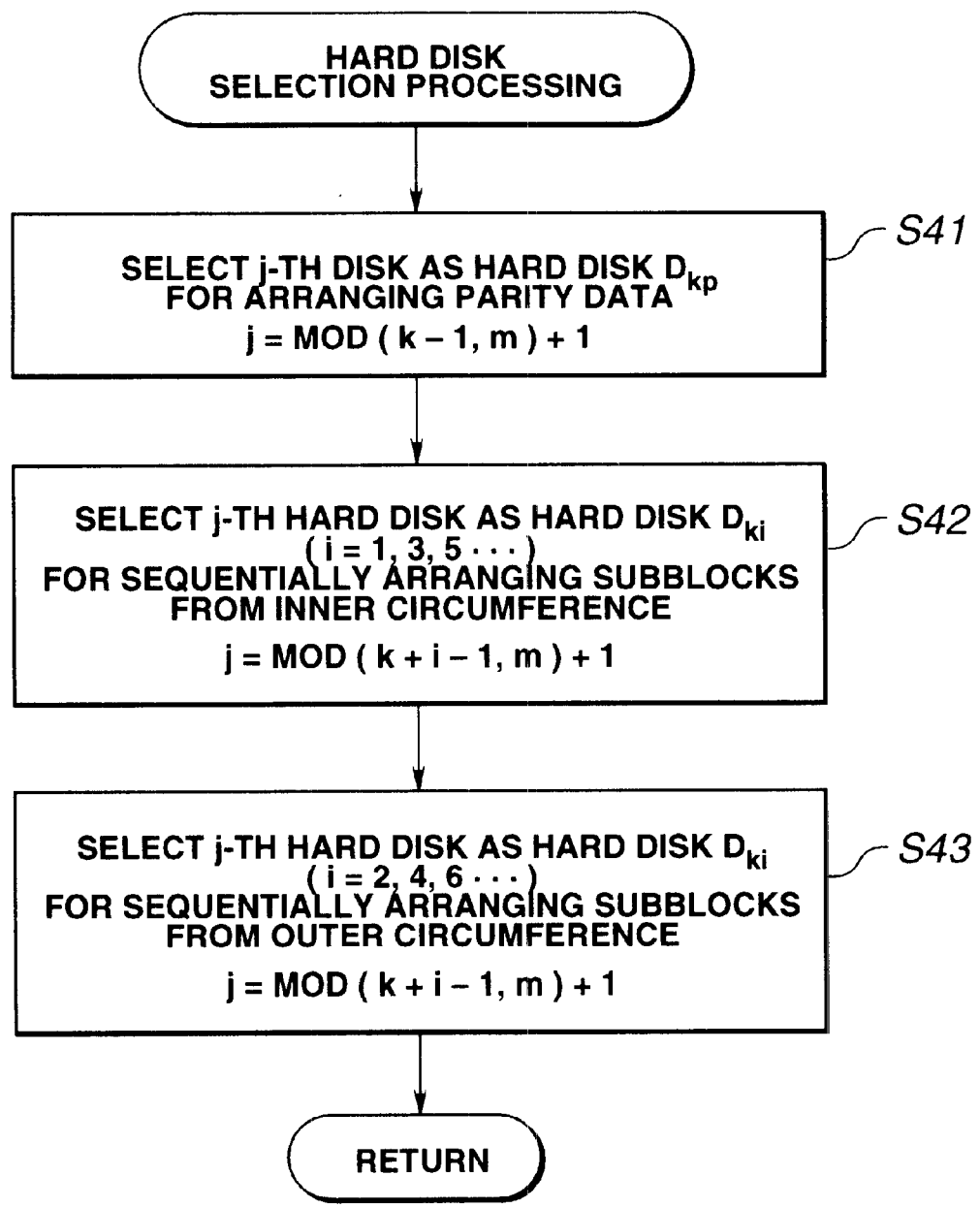
FIG. 28 is a flowchart for explaining processing of step S31 of FIG. 27 further in detail.

FIG. 28 is a flowchart showing the processing of step S31 of FIG. 27 further in detail. In this FIG. 28, k represents the data number such that k=1, 2, . . . , m represents the number of hard disks, n represents a number for dividing data, and i=1, 2, . . . , n. At step S41, the j-th hard disk 201 expressed by the following Equation (4) is selected as the hard disk 201 for arranging the parity data thereon.

$$j = MOD(k-1, m)+1 \quad (4)$$

In this equation, MOD is an operator for calculating the remainder of division of k−1 by m (the total number of hard disks 201).

By this processing, for example, on the assumption that the number m of hard disks 201 is 32, the respective hard disks 201 are selected in the order of j=1, 2, 3, . . . , 31, 32, 1, 2, . . .

Then, at step S42, the j-th hard disk 201 expressed by the following Equation (5) is selected as the hard disk 201 for sequentially arranging the i-th subblock data (i=1, 2, 5 . . . )from the inner side.

$$j = MOD(k+i-1, m)+1 \quad (5)$$

Thus, for example, in the case where i=1 (that is, where the first subblock is to be recorded), the hard disks 201 are selected in the order of j=2, 3, 4, . . . , 32, 1, 2, . . . , and in the case where i=3 (that is, where the third subblock is to be recorded), the hard disks 201 are selected in the order j=4, 5, 6, . . . , 32, 1, 2, . . .

The processing proceeds to step S43, and the j-th hard disk 201 expressed by the foregoing Equation (5) is selected as the hard disk 201 for sequentially arranging the i-th subblock data (i=2, 4, 6, . . . ) from the outer side.

Thus, for example, in the case where i=2 (that is, where the second subblock is to be recorded), the hard disks 201 are selected in the order of j=3, 4, 5, . . . , 32, 1, 2, . . . , and in the case where i=4 (that is, where the fourth subblock is to be recorded), the hard disks 201 are selected in the order j=5, 6, 7, . . . , 32, 1, 2, . . .

By thus alternately using an outer track and an inner track as a pair, the size of the subblock on the inner side can be made smaller than the size of the subblock on the outer side, and the gap θgap of the respective blocks can be made constant.

In the flowchart shown in FIG. 28, the subblock data to be sequentially arranged from the inner side and the subblock data to be sequentially arranged from the outer side are alternately determined. However, the subblock data need not be determined alternately as long as the balance is kept. That is, it may also be considered to arrange the subblocks sequentially from the inner side on the hard disk 201 and then arrange the remaining subblocks sequentially from the outer side on the hard disk 201.

Also, as long as the subblocks are not concentrated on a small number of hard disks 201, the j-th hard disk 201 expressed by Equations (4) and (5) need not be selected. For example, a method for selecting the hard disk 201 for sequentially arranging the subblocks from the inner side, from among the hard disks 201 such that the inner circumference is not used frequently, and selecting the hard disk 201 for sequentially arranging the subblocks from the outer side, from among the hard disks 201 such that the outer circumference is not used frequently, is also effective. In any case, the parity data are sequentially arranged from the outer side on the hard disk 201 selected at step S41.

When the hard disks 201 are thus determined, the processing returns and then proceeds to step S32 of FIG. 27.

At step S32, a start logical sector for starting arrangement of the parity data and the subblock data on the each of the selected hard disks 201 is determined.

Figure 29:
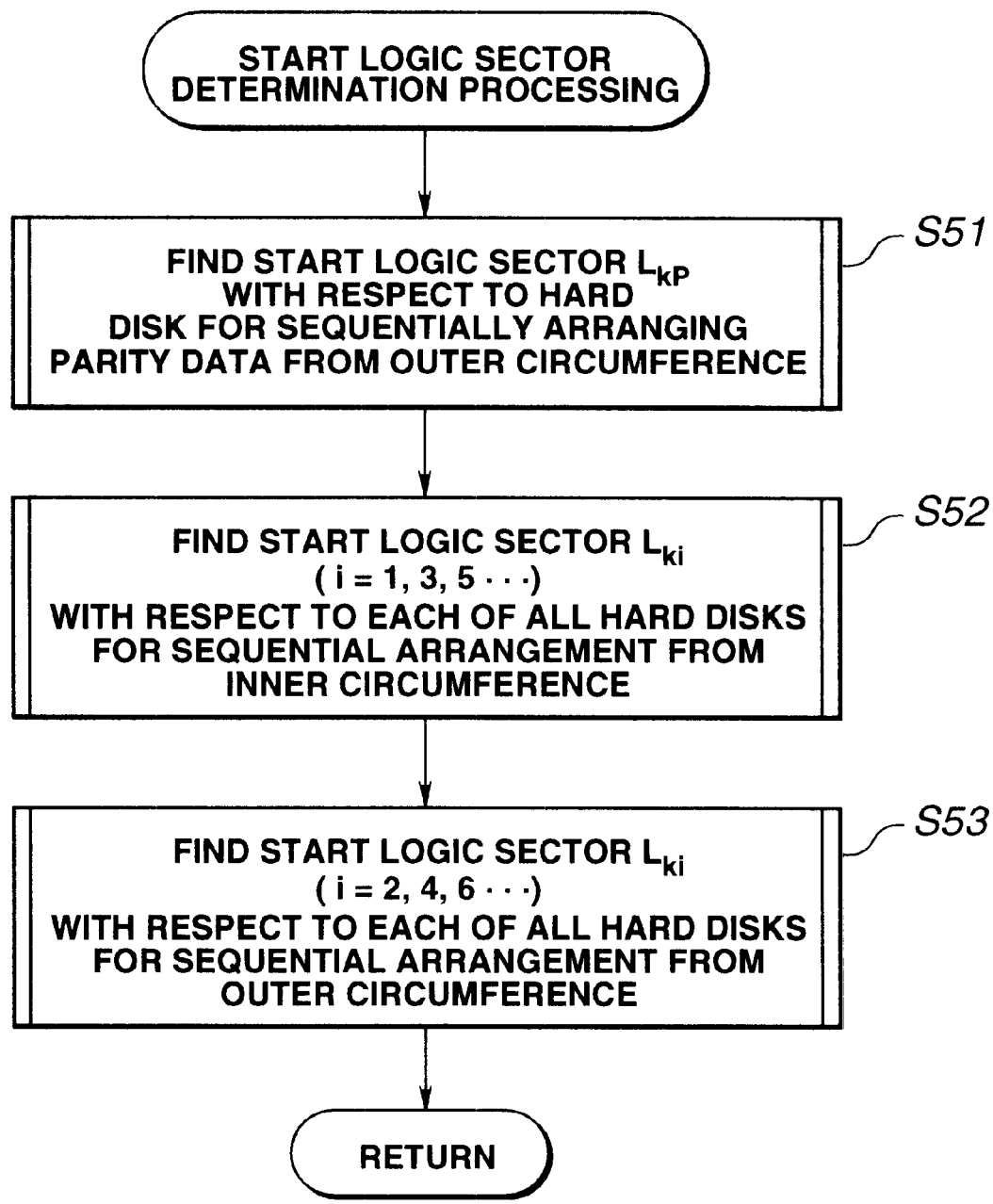
FIG. 29 is a flowchart for explaining processing of step S32 of FIG. 27 further in detail.

FIG. 29 is a flowchart showing processing procedures for determining the start logical sector. First, at step S51, a start logical sector address Lkp is found with respect to the hard disk 201 for sequentially arranging the parity data from the outer side.

Figure 30:
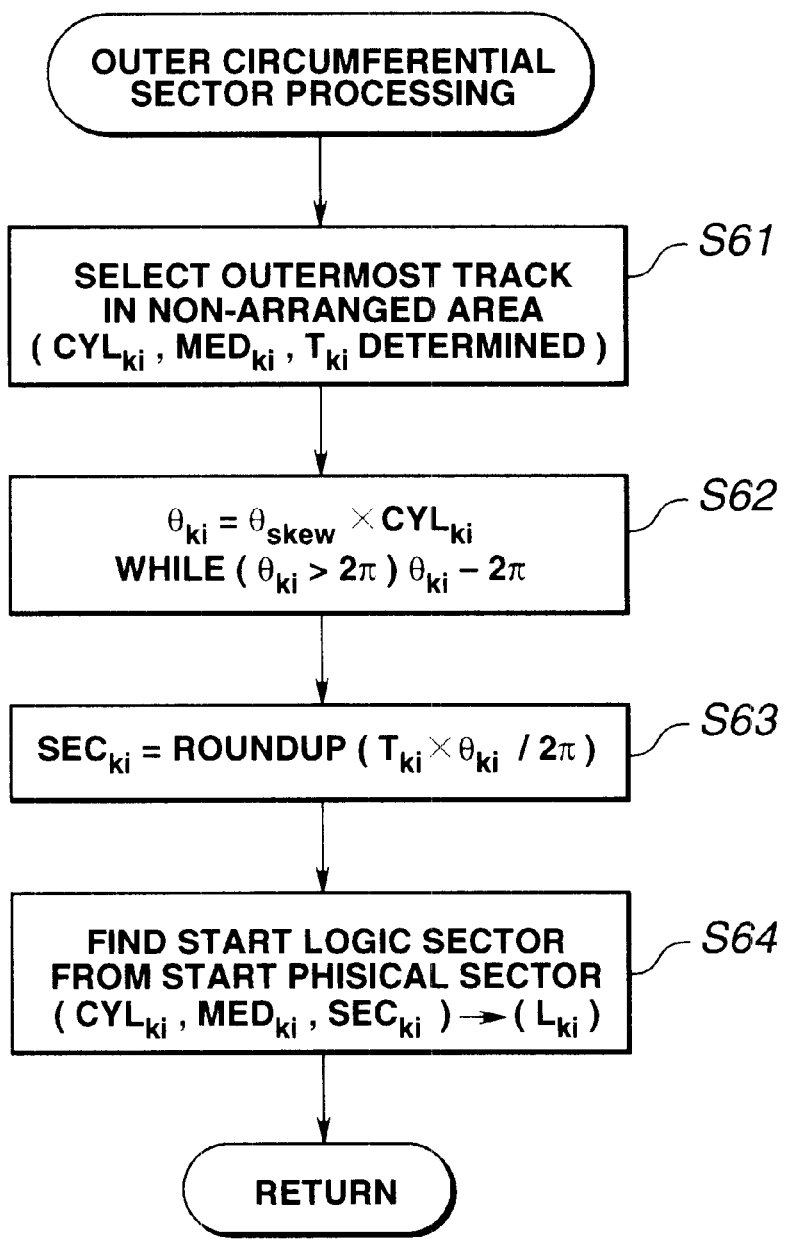
FIG. 30 is a flowchart for explaining processing of step S51 of FIG. 29 further in detail.

FIG. 30 is a flowchart showing the processing of step S51 of FIG. 29 further in detail. First, at step S61, an outermost track in a non-arranged area where no subblock (parity data) is arranged is selected as a track for arranging subblocks (in this case, parity data). The non-arranged area can be known from the allocation map 303. Thus, the cylinder number (CYLki) and the medium number (MEDki) of the physical sector address are determined, and the number of sectors (Tki) per track at this arrangement position can be known with reference to the ZBR table 301.

Then, at step S62, an angle θki made between a leading end of the outermost track (with the cylinder number CYLki) in the non-arranged area selected at step S61 and a leading end of a physically outermost track (track on which first subblock data are recorded, that is, a track with a cylinder number 0) is found from the cylinder number (CYLki) and the value of the optimum skew (θskew), by using the following Equation (6). (The number of cylinders between these tracks is CYLki.)

$$\theta ki = \theta skew \times CYLki \quad (6)$$

However, when θki>2π, processing of θki=θki−2π is repeated until θki<2π is obtained.

Then, at step S63, the sector number (SECki) is found from the angle θki found by Equation (6) and the number of sectors (Tki) per track, by using the following Equation (7).

$$SECki = ROUNDUP(Tki \times \theta ki/2\pi) \quad (7)$$

In this equation, ROUNDUP represents an operator for finding an integer with decimal fractions rounded out.

At step S64, the logical sector address (Lki) (in this case, Lkp) is determined from the physical sector address (CYLki, MEDki, SECki) found at steps S61 to S63, with reference to the physical address table 302 (FIG. 13). The processing then returns.

Subsequently, the processing proceeds to step S52 of FIG. 29, and the start logical sector address Lki (i=1, 3, 5, . . . ) is found with respect to each of all the hard disks 201 on which the subblock data are sequentially arranged from the inner side.

Figure 31:
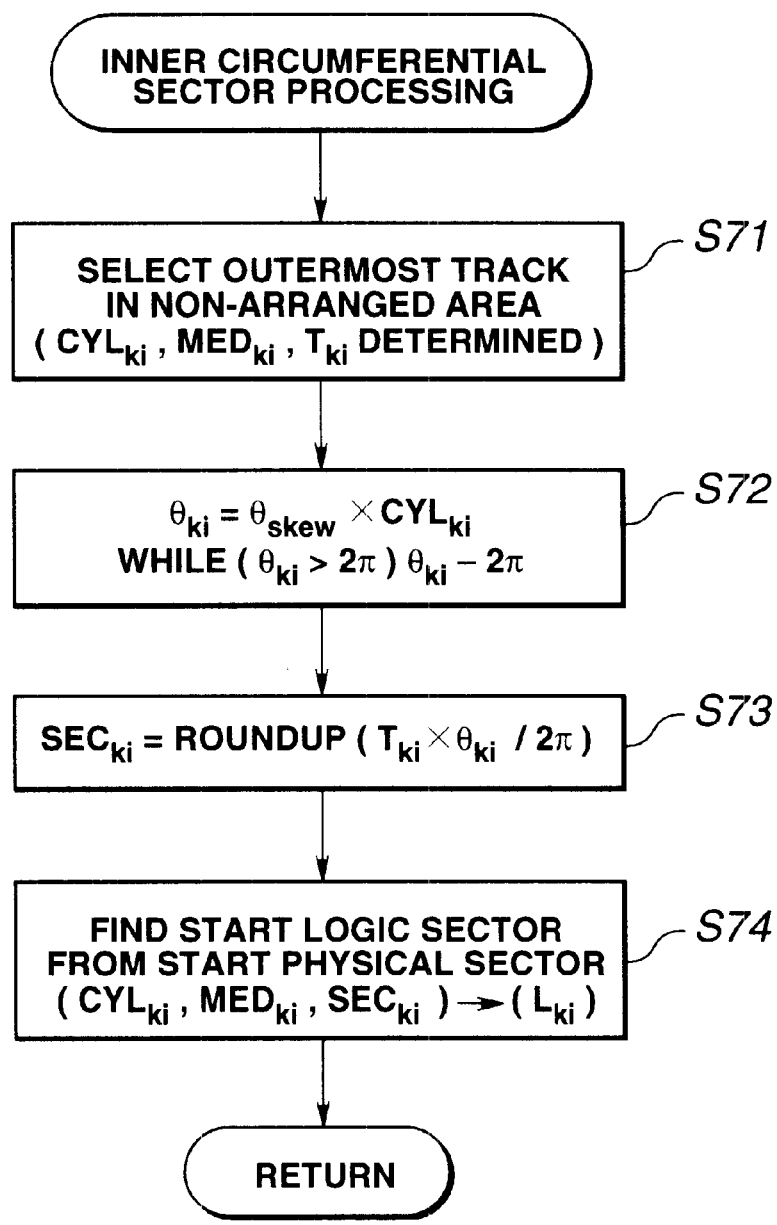
FIG. 31 is a flowchart for explaining processing of step S52 of FIG. 29 further in detail.

FIG. 31 is a flowchart showing the processing of step S52 of FIG. 29 further in detail. First, at step S71, an innermost track in the non-arranged area is selected as a track for arranging subblocks, with reference to the physical address table 302 (FIG. 13). Thus, the cylinder number (CYLki) and the medium number (MEDki) of the physical sector address are determined, and the number of sectors (Tki) per track at this arrangement position can be known with reference to the ZBR table 301.

Then, at step S72, an angle $\theta$ki made between a leading end of the innermost track in the non-arranged area selected at step S71 and a leading end of a physically innermost track (track on which first subblock data are recorded) is found. At step S73, the sector number (SECki) is found. Then, at step S74, the logical sector address (Lki) is determined from the found physical sector address (CYLki, MEDki, SECki), and the processing then returns. The processing of the above-described steps S72 to S74 is basically similar to the processing of steps S62 to S64 of FIG. 30, except for selecting tracks sequentially from the inner side instead of the outer side, and therefore will not be described further in detail.

Subsequently, the processing proceeds to step S53 of FIG. 29, and the start logical sector address Lki (i=2, 4, 6, . . . ) is found with respect to each of all the hard disks 201 on which the subblock data are sequentially arranged from the outer side. The processing procedure at this step is similar to the case described with reference to the flowchart of FIG. 30 and therefore will not be described further in detail. On completion of this processing, the operation returns.

In the example of processing shown in FIGS. 29 to 31, in the case where the subblocks are arranged on each track sequentially from the outer side, the track for arranging the subblocks is selected from the outermost tracks in the non-arranged area, and in the case where the subblocks are arranged on each track sequentially from the inner side, the track for arranging the subblocks is selected from the innermost tracks in the non-arranged area. However, the outermost track or the innermost track need not be necessarily selected. For example, in the ZBR system format, the number of sectors per track is the same in the same zone, and the size of each subblock and the value of the gap are not varied.

When the start logical sector address is thus found, the processing proceeds to step S33 of FIG. 27, and the size of parity data and each subblock is determined. The processing procedure for determining the size of the subblock will be described later with reference to the flowchart of FIG. 32.

The size (the number of sectors) of each subblock (including the case of parity data) will now be considered. First, the sum of the sizes of the respective blocks is equal to the size of the original one block of data. That is, if the size (the number of sectors) of each subblock is Ski (i=1, 2, 3, . . . , n) and the size (the number of sectors) of the original one block data is S, S is expressed by the following Equation (8).

$$Sk1+Sk2+,\ldots,+Skn=S \qquad (8)$$

Meanwhile, to make the reading times or writing times of the respective subblocks to be equal, the values of the gaps $\theta$gap of the respective subblocks must be equal. That is, the following Equation (9) must be held.

$$Sk1/Tk1=Sk2/Tk2=\ldots,=Skn/Tkn \qquad (9)$$

In the foregoing Equation (9), Tki (i=1, 2, 3, . . . , n) represents the number of sectors on a track where the i-th subblock is arranged.

From Equations (8) and (9), the number of sectors Ski of each subblock for realizing the constant value of the gap $\theta$gap of each subblock is provided by the following Equation (10).

$$Ski=S\times Tki/T \qquad (10)$$

where $$T=Tk1+Tk2+,\ldots,+Tkn.$$

Actually, since the number of sectors Ski is provided as an integer number, each size must be slightly adjusted.

On the other hand, the size Skp of the parity data is provided by the following Equation (11) when the size of each subblock is determined.

$$Skp=MAX(Sk1, Sk2,\ldots, Skn) \qquad (11)$$

In Equation (11), MAX is an operator for finding the largest one of the subblock sizes Sk1 to Skn.

Since it is guaranteed at steps S31 and S32 of FIG. 27 that the parity data is arranged on an outer track on the hard disk 201, the following Equation (12) is established.

$$Sk1/Tk1=Sk2/Tk2=,\ldots,=Skn/Tkn=Skp/Tkp \qquad (12)$$

In this equation, Tkp represents the number of sectors on the track where the subblock Skp is arranged.

Figure 32:
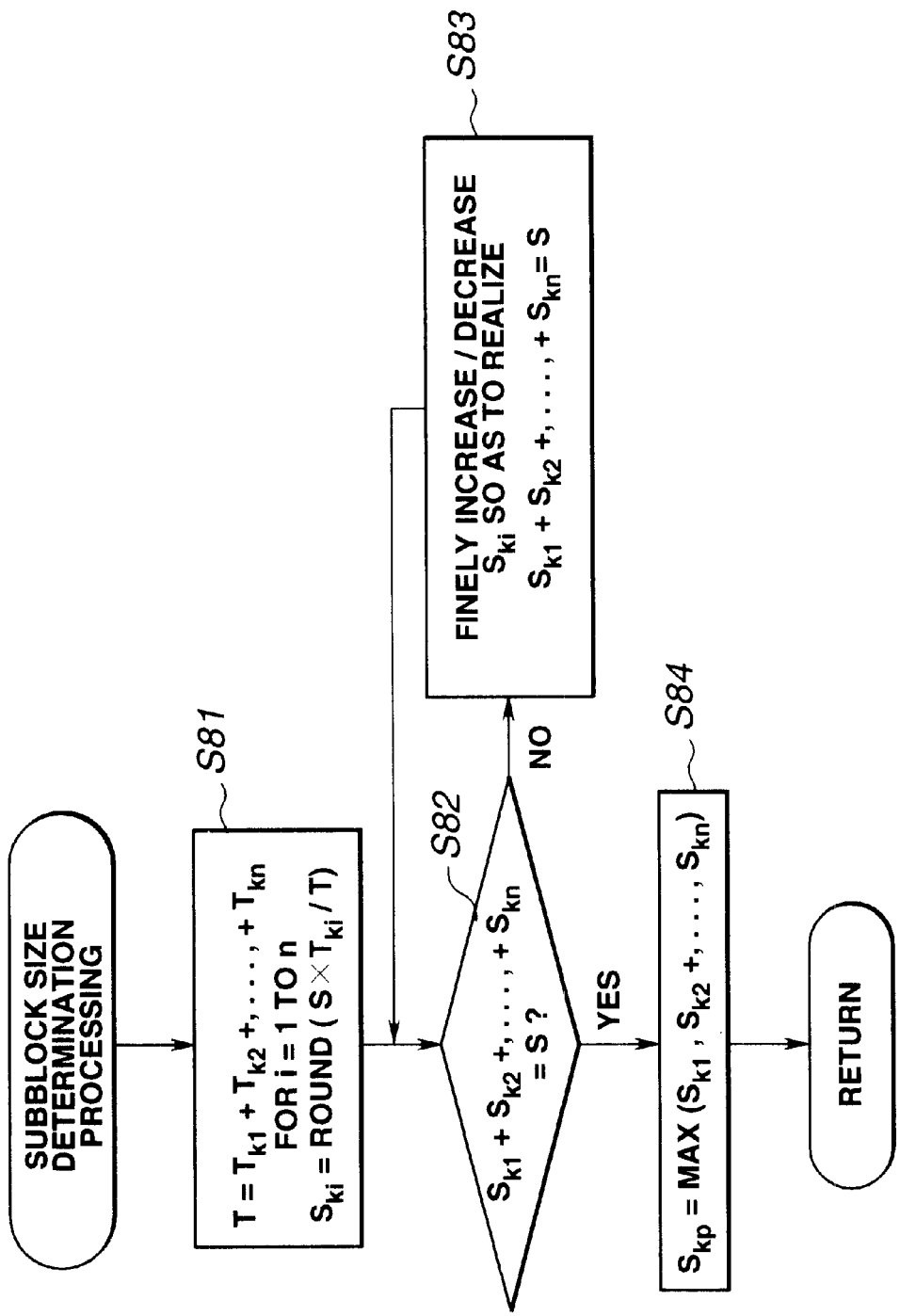
FIG. 32 is a flowchart for explaining processing of step S33 of FIG. 27 further in detail.

FIG. 32 shows a flowchart for realizing the above-described procedure for determining the subblock size. First, at step S81, the sum T of the numbers of sectors Tki (i=1, 2, . . . , n) per track of the tracks corresponding to the arrangement position where n subblocks are arranged is found. Then, the operation expressed by Equation (10) is carried out with respect to the variable i of 1 to n so as to find the size Ski (i=1, 2, . . . , n) of each subblock.

Then, at step S82, the operation expressed by Equation (8) is carried out, and it is discriminated whether or not the sum of the sizes Ski of the respective subblocks found at step S81 is equal to the size S of the original one block of data. If it is discriminated that the sum of the sizes Ski of the respective subblocks is not equal to the size S of the original one block of data, the processing proceeds to step S83 to finely increase or decrease the size Ski of each subblock so that the sum of the sizes Ski of the respective subblocks becomes equal to the size S of the original one block of data. Then, the processing returns to step S82, and the processing of steps S82 and S83 is repeated until it is discriminated that the sum of the sizes Ski of the respective subblocks is equal to the size S of the original one block of data.

On the other hand, if it is discriminated at step S82 that the sum of the sizes Ski of the respective subblocks is equal to the size S of the original one block of data, the processing proceeds to step S84 to find the size Skp of the parity data. That is, the largest size of the subblock sizes Ski is employed as the size Skp of the parity data.

On completion of the processing of step S84, the processing returns. Thus, the processing of step S33 of the flowchart shown in FIG. 23 is completed, and all the processing ends.

In the above-described manner, on each hard disk 201, the size of the subblock arranged on the inner side is made small and the size of the subblock arranged on the outer side is made large so that the gap θgap of the respective subblocks becomes constant.

Figure 33:
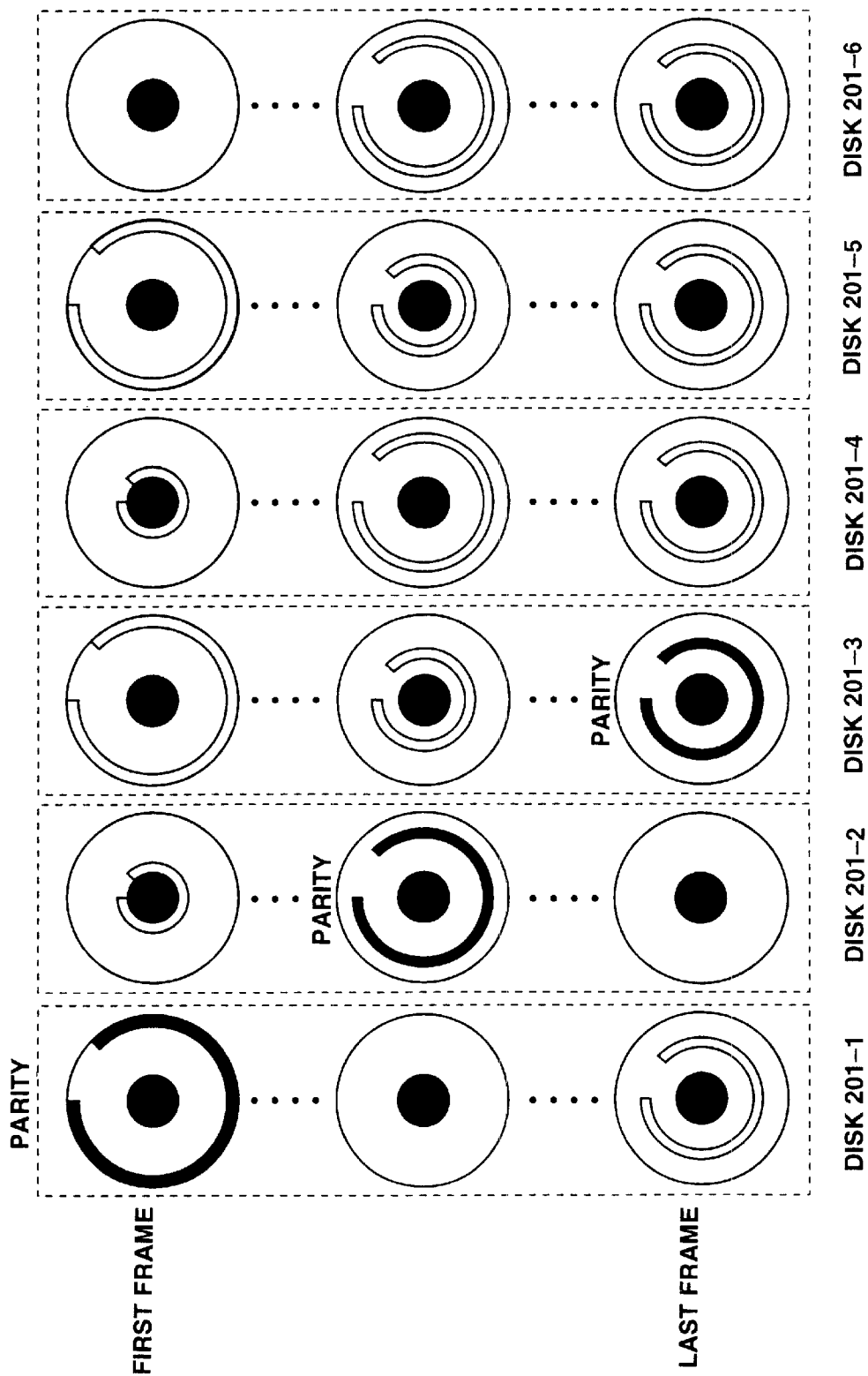
FIG. 33 illustrates arrangement processing of data on a hard disk realized by the processing of FIG. 28.

FIG. 33 shows an example of subblocks thus distributed on the hard disks 201. In this example, the number m of hard disks 201 is 6 and the number n of subblocks is 4.

The parity data of the first frame is arranged on the hard disk 201-1, and four subblocks corresponding thereto are distributed on the hard disks 201-2 to 201-5. The parity data arranged on the hard disk 201-1 and the subblocks arranged on the hard disks 201-3 and 201-5 are located on the outermost tracks. The subblocks arranged on the hard disks 201-2 and 201-4 are located on the innermost tracks.

The parity data of the second frame is arranged on the hard disk 201-2 and the subblocks are arranged on the hard disks 201-3 to 201-6, in the orders from the outer circumference, from the inner circumference, from the outer circumference, from the inner circumference, and from the outer circumference, respectively. The parity data of the third frame is arranged on the hard disk 201-3 and the subblocks are arranged on the hard disks 201-4 to 201-6 and the hard disk 201-1, in the orders from the outer circumference, from the inner circumference, from the outer circumference, from the inner circumference, and from the outer circumference, respectively. Similarly, the data of the respective frames are arranged, and the data of the last frame are arranged at substantially intermediate positions of the cylinders of the hard disks 201-3 to 201-6 and the hard disk 201-1.

The parity data and the subblocks thus arranged are observed with respect to one hard disk 201. Since the values of the gaps θgap and the skews θskew of the respective subblocks are substantially the same, the time required for reading and writing the respective subblocks is substantially constant.

In the above-described embodiment, the time for actually reading or writing the parity data and the subblocks can be made constant regardless of the storage position of the data on the hard disk 201.

Also, in the above-described embodiment, in accessing the data, scanning is carried out from the outer circumference toward the inner circumference. However, it is also possible to carry out scanning from the inner circumference toward the outer circumference. In such case, the optimum skew can be set at the time of accessing the data while the head is moved from the inner circumference to the outer circumference.

The operation of the RAID controller 282 in the case where parity data is generated and used to correct errors will now be described. For example, as shown in FIG. 15, the size of the subblock recorded on the outer circumference is made greater than the size of the subblock recorded on the inner circumference, and one block is divided into four subblocks #1 to #4.

The size of the parity data is set to be equal to the size of the largest subblock of the divided subblocks.

Basically, the j-th parity data Pj is generated from the j-th data of each subblock. As shown in FIG. 34(A), if the value of j is small, the j-th data corresponding to all the subblocks exist. Therefore, the parity data Pj is generated from the data of all the subblocks #1 to #4. On the other hand, as j becomes greater to a certain extent, the j-th data do not exist in the subblocks #1 and #3, as shown in FIG. 34(B).

In such case, the parity data Pj is generated on the basis of the j-th data from the subblocks #2 and #4 having a size not smaller than j. Alternatively, it is also possible to add predetermined data to the subblocks #1 and #3 and then generate the parity data Pj from the data of all the subblocks. Although there are various types of algorithms for generating the parity data, such algorithms need not be described in detail here, and therefore description thereof will be omitted.

The operation in the case where a data error is corrected will now be described. Specifically, in the case where the j-th data of a predetermined subblock has an error, basically, the error is corrected by using the j-th data of the other subblocks and the parity data. For example, as shown in FIG. 35(A), if the value of j is small, since the parity data is generated from the j-th data of all the subblocks, the j-th data of the subblock #4 having an error is corrected by using the j-th data of the parity data and the j-th data of the subblocks #1 to #3 having no error.

Figure 35B:
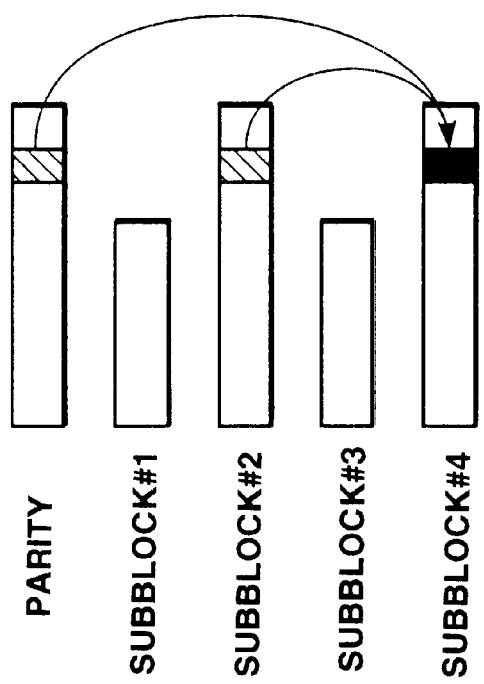
Figure 35A:
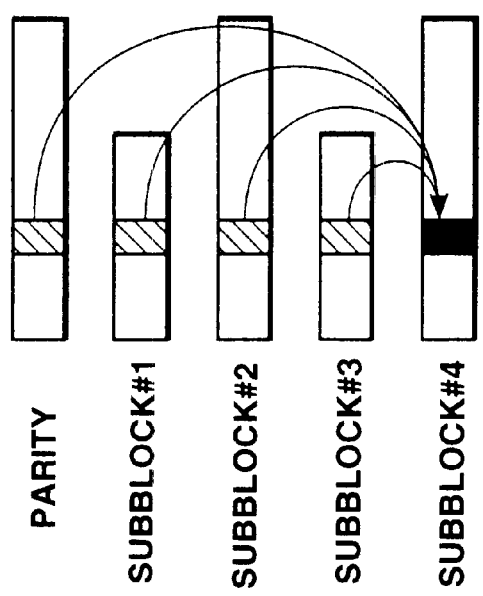

On the other hand, as shown in FIG. 35(B), as the value of j becomes greater to a certain extent, the parity data is generated from the j-th data of the subblocks having a size not smaller than j. Therefore, the j-th data of the subblock #4 having an error is corrected by using the subblock #2 having no error, from among the subblocks of the size not smaller than j, and the parity data.

Figure 36:
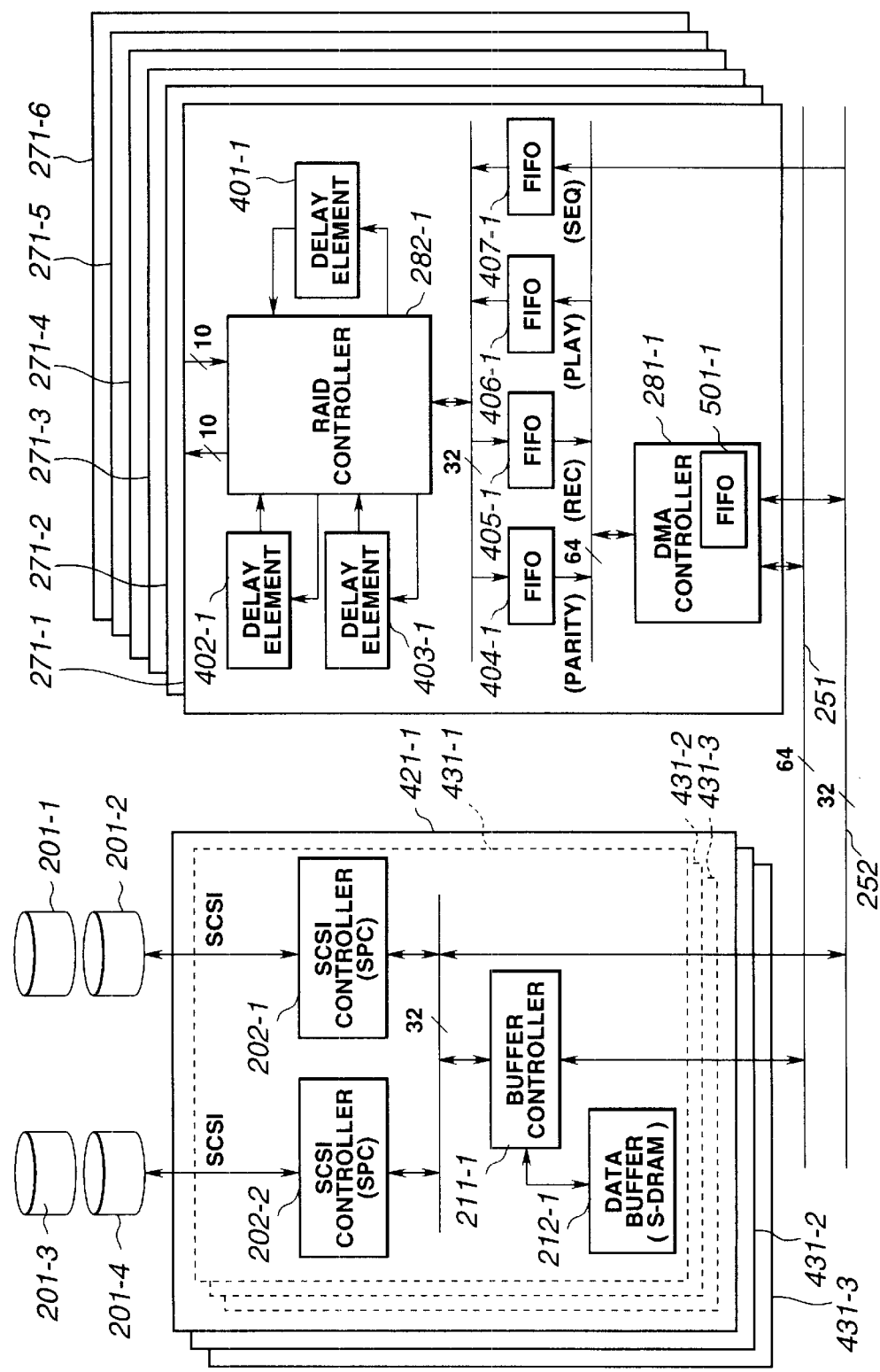
FIG. 36 is a block diagram showing an example of the structure of a RAID controller and a DMA controller of FIG. 7, further in detail.

In this embodiment, such generation of parity data and error correction processing using the parity data are carried out in real time. FIG. 36 shows the structure of a section for carrying out such processing.

As shown in FIG. 36, the RAID controller 282-1 of the video block 271-1 has delay elements 401-1 to 403-1 for delaying data by an amount of one packet transfer block. The RAID controller 282-1 generates parity data from pixel data supplied from the video processor 283-1 through a 10-bit bus, and supplies the parity data to a FIFO 404-1 through a 32-bit bus. The RAID controller 282-1 also supplies the pixel data to a FIFO 405-1 through the 32-bit bus. Also, the RAID controller 282-1 carries out error correction processing based on the parity data with respect to pixel data (reproduced data) supplied from the DMA controller 281-1 through a 64-bit bus and a FIFO 406-1, and supplies the corrected pixel data to the video processor 283-1 by a pixel data unit of 10 bits.

Figure 37A:
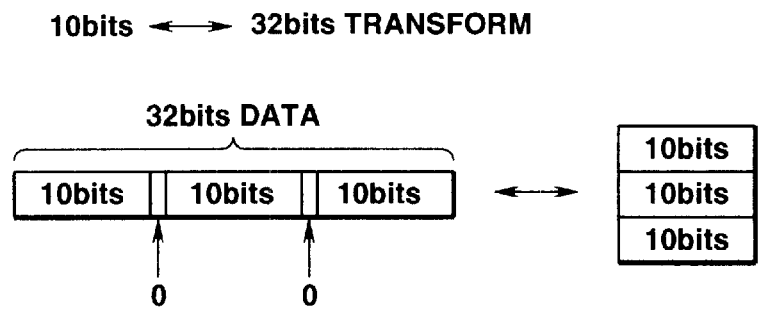
FIGS. 37(A) and 37(B) illustrate bit transform processing of the RAID controller of FIG. 36.
Figure 37B:
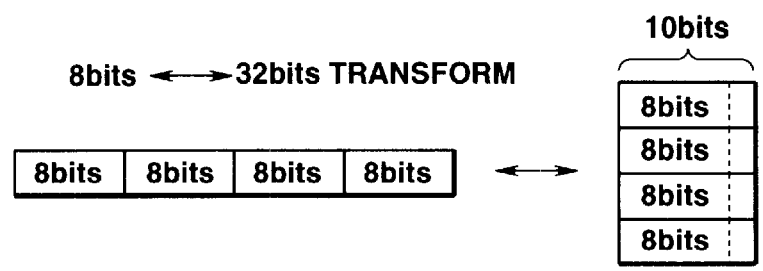

FIGS. 37(A) and 37(B) show examples of transform processing between 10-bit data and 32-bit data in the RAID controller 282-1. In the case where the first mode is set, when data is supplied on the basis of 10 bits as a unit from the video processor 283-1, the RAID controller 282-1 collects three 10-bit data, and inserts 1-bit dummy data of 0 between the first 10-bit data and the second 10-bit data and 1-bit dummy data of 0 between the second 10-bit data and the third 10-bit data so as to generate data of 32 bits in total, as shown in FIG. 37(A). On the contrary, when 32-bit data is supplied from the bus, the RAID controller 282-1 ignores the 11th bit and 22nd bit and processes three 10-bit data before and after the ignored bits. In the case where the second mode is set, the RAID controller 282-1 ignores lower 2 bits of 10-bit input data and combines four sets of 8-bit data to generate 32-bit data, as shown in FIG. 37(B). On the contrary, when 32-bit data is inputted, the RAID controller 282-1 segments the data by 8 bits each and adds 2-bit dummy data to each 8-bit data to generate 10-bit data.

The RAID controller 282-1 and the DMA controller 281-1 of FIG. 36 are interconnected through the FIFOs 404-1 to 406-1. The portion of the FIFOs 404-1 to 406-1 on the side of the RAID controller 282-1 is constituted by the 32-bit bus, and the portion on the side of the DMA controller 281-1 is constituted by the 64-bit bus. Since each FIFO is constituted by 32 bits, for example, the FIFO 404-1 outputs the first 32-bit parity data inputted thereto to the DMA controller 281-1 through an upper 32-bit bus of the 64-bit bus, and supplies the next 32-bit parity data inputted thereto to the DMA controller 281-1 through a lower 32-bit bus of the 64-bit bus.

Similar to the FIFO 404-1, the FIFO 405-1 outputs the first 32-bit pixel data, supplied from the RAID controller 282-1, to the DMA controller 281-1 through a MSB-side 32-bit bus of the 64-bit bus, and outputs the next 32-bit pixel data inputted thereto to the DMA controller 281-1 through a LSB-side 32-bit bus of the 64-bit bus.

Figure 38:
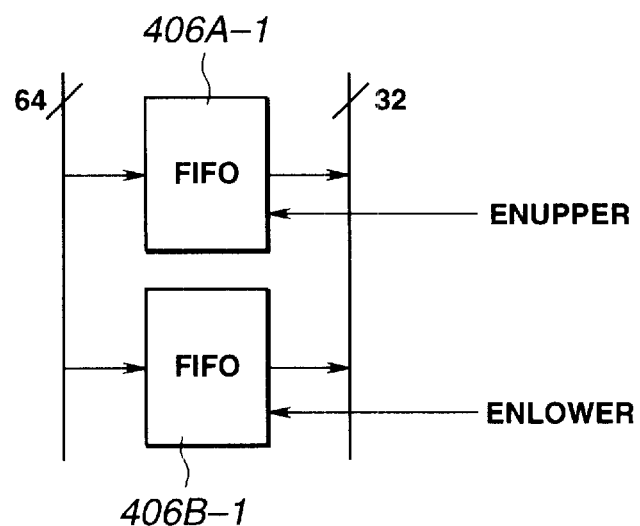
FIG. 38 illustrates operation of a FIFO of FIG. 36.

On the other hand, the FIFO 406-1 for supplying pixel data (reproduced pixel data), supplied from the DMA controller 281-1 through the 64-bit bus, to the RAID controller 282-1 is constituted by FIFOs 406A-1 and 406B-1 each having a capacity of 32 bits, as shown in FIG. 38. The pixel data supplied from the DMA controller 281-1 through the MSB-side 32-bit bus of the 64-bit bus is supplied to the FIFO 406A-1, and the pixel data supplied through the LSB-side 32-bit bus is supplied to the FIFO 406B-1. Then, after the pixel data stored in the FIFO 406A-1 is supplied to the RAID controller 282-1 through the 32-bit bus, the pixel data of 32 bits stored in the FIFO 406B-1 is read out and supplied to the RAID controller 282-1 through the 32-bit bus.

The DMA controller 281-1 is connected to the DMA bus 251 of 64 bits. A FIFO 407-1 is connected to the control bus 252 of 32 bits so as to output a command, inputted through the control bus 252, to the RAID controller 282-1.

Although not shown, the video blocks 271-2 to 271-6 are constituted similarly to the video block 271-1.

On a board 421-1, three SCSI boards 431-1 to 431-3 are provided. On the SCSI board 431-1, a data buffer 212-1 constituted by a S-DRAM is provided, with its input and output controlled by the buffer controller 211-1. To the buffer controller 211-1, two SCSI controllers 202-1 and 202-2 are connected through a 32-bit bus. The SCSI controller 202-1 controls two hard disks 201-1 and 201-2. The SCSI controller 202-2 controls two hard disks 201-3 and 201-4.

Although not shown, the SCSI boards 431-2 and 431-3 are constituted similarly to the SCSI board 431-1. Also, boards 421-2 and 421-3 are constituted similarly to the board 421-1. In this example, a single board 421-i can control 12 hard disks 201, and the three boards are provided. Therefore, a function for controlling 36 hard disks 201 in total is provided. Actually, however, 32 hard disks 201 are connected.

As described above, one frame of picture data is segmented into four subblocks, for example. These subblocks are further segmented into packet transfer blocks based on 128 words of pixel data as a unit, and generation of parity data and error correction processing using the parity data are carried out.

Figure 39:
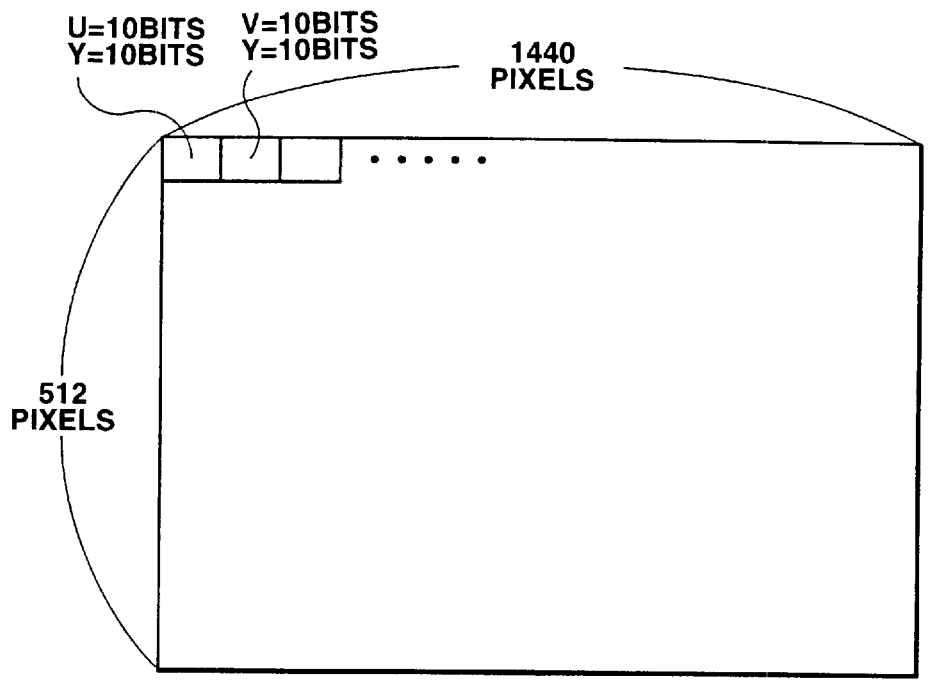
FIG. 39 illustrates pixel data of one frame of picture.

Specifically, one frame of picture data of the NTSC system is constituted by 1440×512 pixels, as shown in FIG. 39. One pixel consists of 10-bit luminance (Y) data and 10-bit color-difference (U or V) data.

Since one word consists of 32 bits, three units of 10-bit luminance data can be arranged in one word. By adding 2-bit dummy data between three luminance data as shown in FIG. 37(A), data of three pixels can be arranged by one word. In view of this, data of 384 pixels is arranged in one packet transfer block, as shown in FIG. 40.

However, if it is considered that the data of one pixel is constituted by 10-bit luminance data and 10-bit color-difference data, the number of pixels arranged in one packet transfer block (128 words) is 129 since 1.5 pixels can be arranged in one word.

Figure 40:
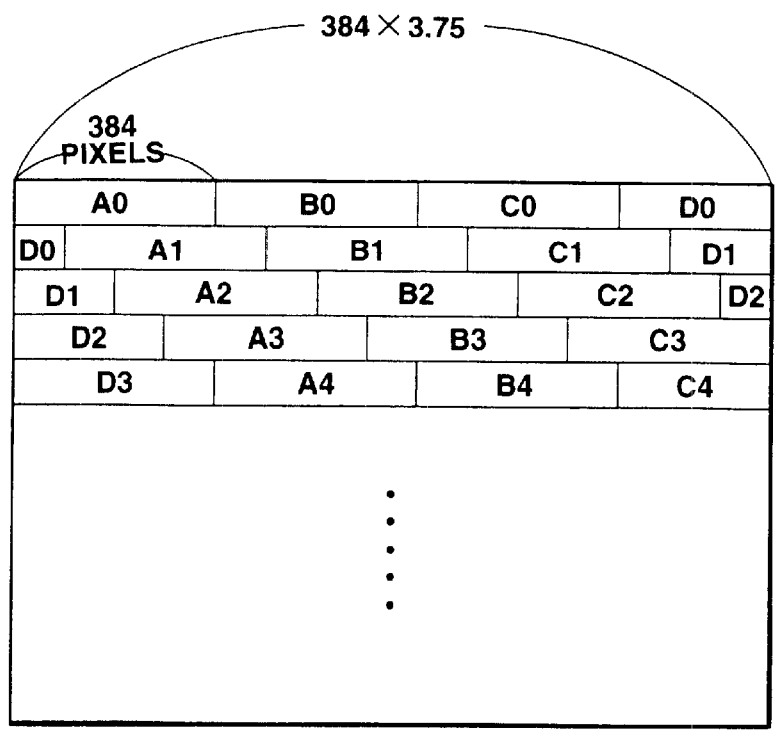
FIG. 40 illustrates a packet transfer block.

To simplify the description, it is now assumed that one pixel is constituted by 10-bit luminance data, and therefore 384 pixels are arranged in one packet transfer block, as shown in FIG. 40.

Figure 41:
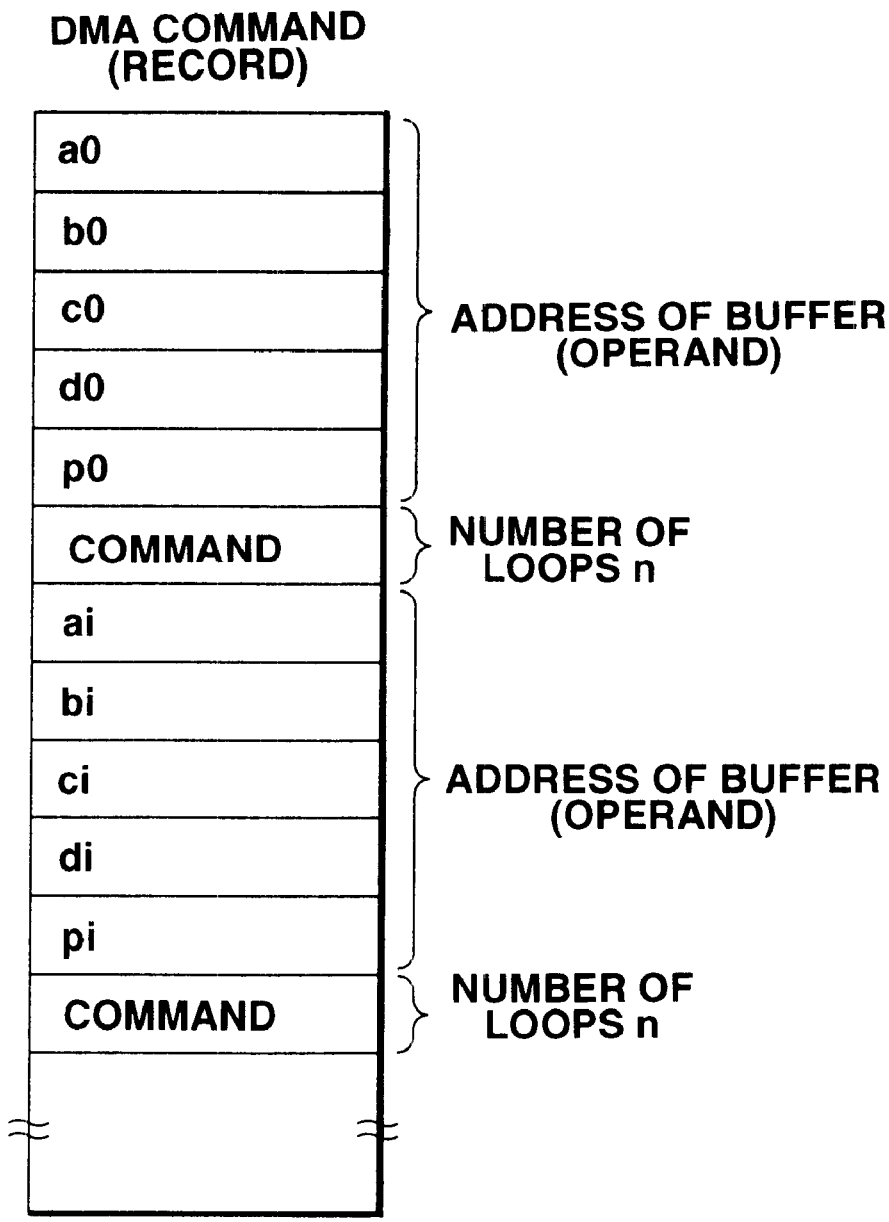
FIG. 41 illustrates a DMA command.

As described above, the DMA controller 281 of FIG. 36 carries out DMA transfer based on a packet transfer block as a unit between the RAID controller 282 and the data buffer 212. FIG. 41 shows an example of a DMA command supplied from the controller 262 to the DMA controller 281 through the control bus 252. In this example of the command, pixel data that should be recorded are DMA-transferred from the RAID controller 282 to the data buffer 212.

As shown in FIG. 41, this DMA command includes a command and an operand. In the operand, an address of the data buffer 212 where the pixel data should be recorded is held. In the command, the number of times for transferring a packet transfer block (that is, the number of loops) is prescribed.

It is a matter of course that, as this command, a command for commanding various controls can be arranged instead of the number of loops. For example, a RAID ratio is set in the command to the RAID controller 282.

Figure 42:
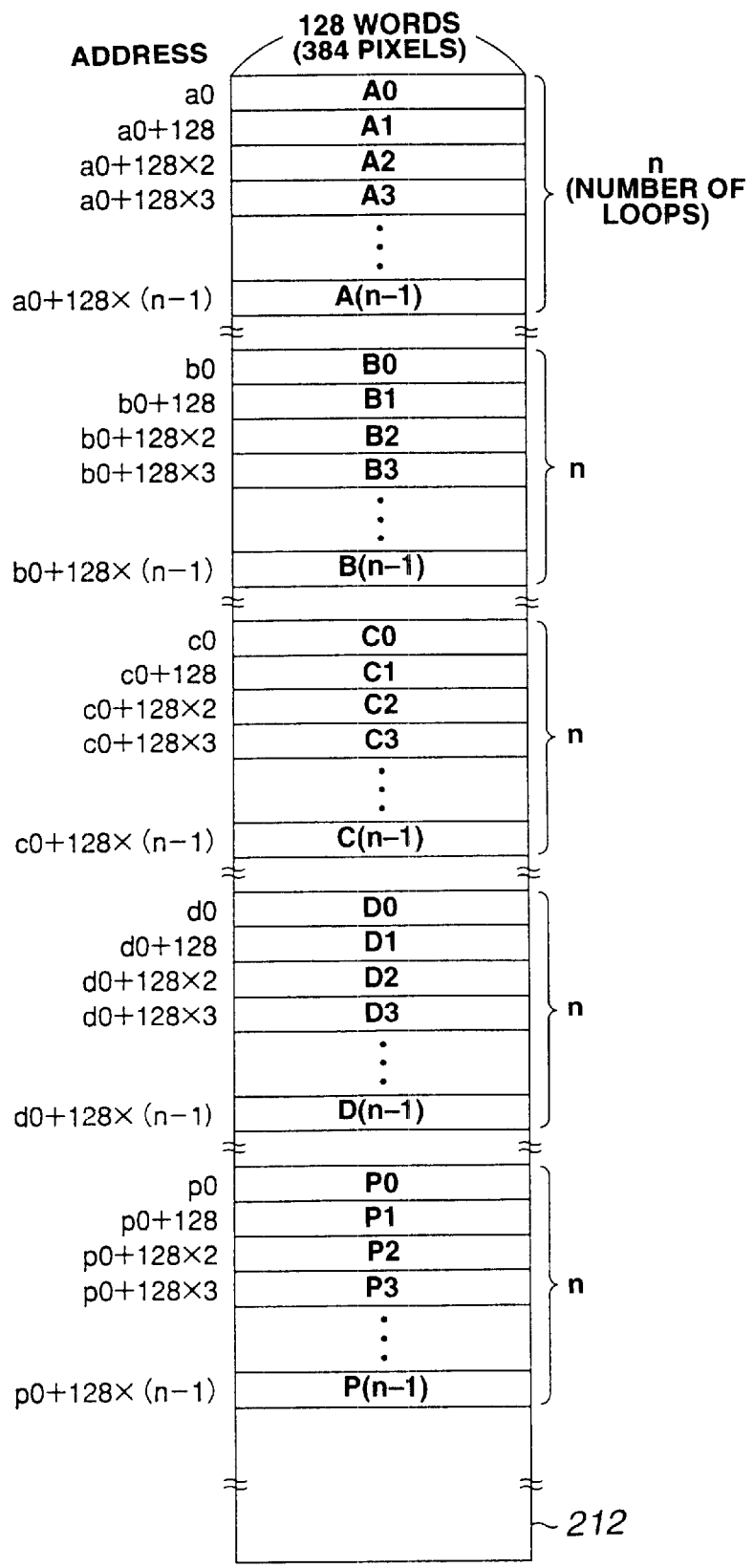
FIG. 42 illustrates a state of data write in a data buffer of FIG. 36.

It is now assumed that pixel data of one frame is sequentially segmented into A0, B0, C0, D0, A1, B1, C1, D1, . . . from upper left to lower right for each packet transfer block, as shown in FIG. 40. When transfer of this packet transfer block to the DMA controller 281 of FIG. 36 is commanded by the DMA command as shown in FIG. 41, the DMA controller 281 receives this command by its FIFO 501-1 and writes the data into the data buffer 212 as shown in FIG. 42.

Specifically, as shown in FIG. 41, with respect to the command, addresses a0 to d0 of the data buffer 212 corresponding to four subblocks are prescribed in the operand, and p0 is described in the operand, as an address of the data buffer 212 where parity data corresponding to the four subblocks should be recorded. As the command, the number of loops n is described. In this case, as shown in FIG. 42, the packet transfer block A0 is written at the address a0 of the data buffer 212. The packet transfer block B0 is written at the address b0. The packet transfer block C0 is written at the address c0. The packet transfer block D0 is written at the address d0. Then, parity data P0 for the first one packet transfer block, from among the parity data generated corresponding to the four subblocks, is written at the address p0 of the data buffer 212.

Subsequently, the packet transfer block A1 is written at an address a0+128 (words) of the data buffer 212. The packet transfer block B1 is written at an address b0+128. The packet transfer block C1 is written at an address c0+128. The packet transfer block D1 is written at an address d0+128. Then, parity data P1 is written at an address p0+128.

Similarly, in areas continuing from the address a0, data A0, A1, A2, . . . , A(n−1) are written. In areas continuing from the address b0, data B0, B1, B2, B(n−1) are written. In areas continuing from the address c0, data C0, C1, C2, . . . , C(n−1) are written. In areas continuing from the address d0, data D0, D1, D2, . . . , D(n−1) are written. In areas continuing from the address p0, parity data P0 to P(n−1) are written.

Figure 43:
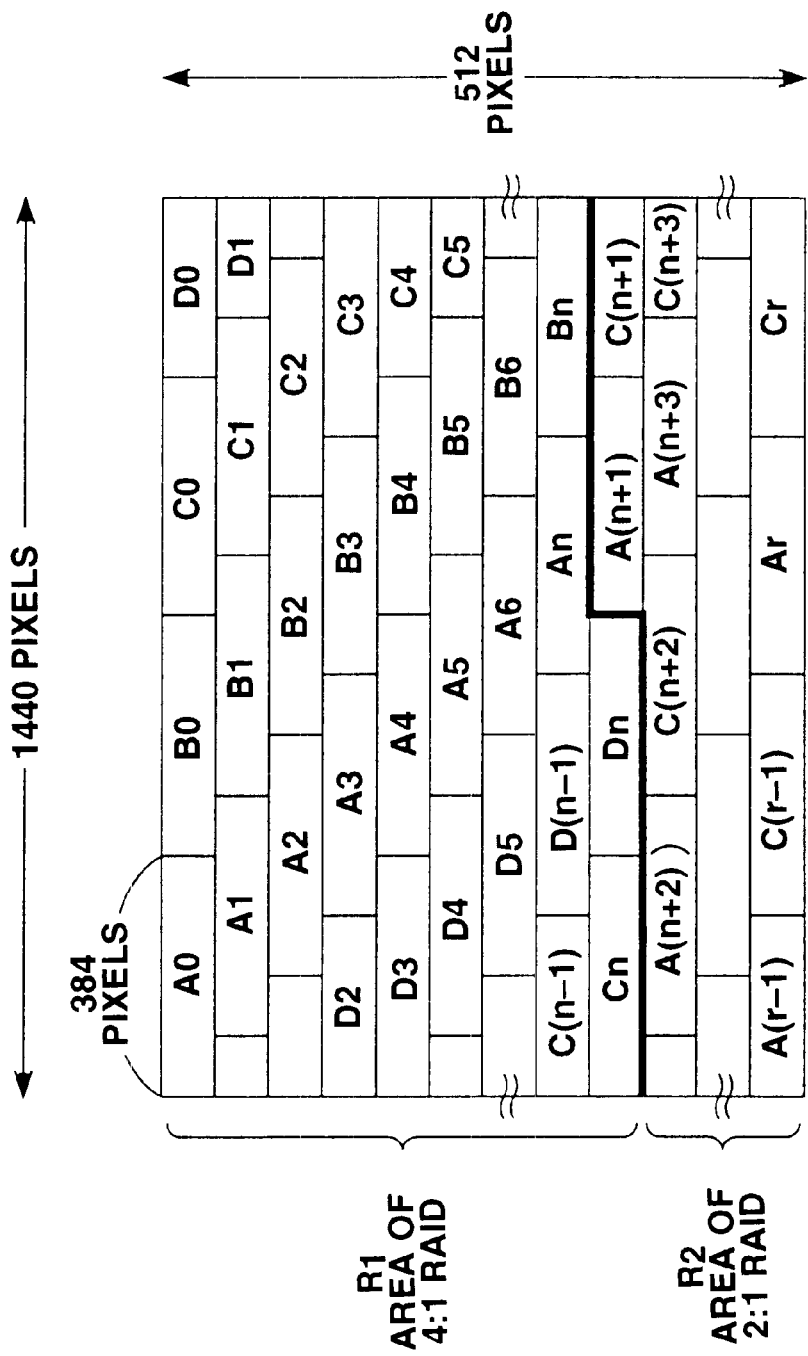
FIG. 43 illustrates a RAID area of one frame of picture.

FIG. 43 shows ranges of an area R1 where pixel data of one frame is transferred by 4:1 RAID and an area R2 where 2:1 RAID is carried out. In the following description, "n:m RAID" expresses a RAID algorithm for dividing source video data into n units of subblocks and generating m units of parity data from the n units of subblocks. Therefore, "4:1 RAID" means a RAID algorithm for generating one parity data from four subblocks.

As shown in FIG. 43, continuous packet transfer blocks A0, B0, C0, D0, A1, B1, C1, D1, . . . , An, Bn, Cn, Dn are transferred by 4:1 RAID. Then, packet transfer blocks A(n+1), C(n+1), A(n+2), C(n+2), . . . , Ar, Cr of the subsequent area R2 are transferred by 2:1 RAID.

The packet transfer blocks Ai, Bi, Ci, Di constitute the first to fourth subblocks, respectively.

Figure 44:
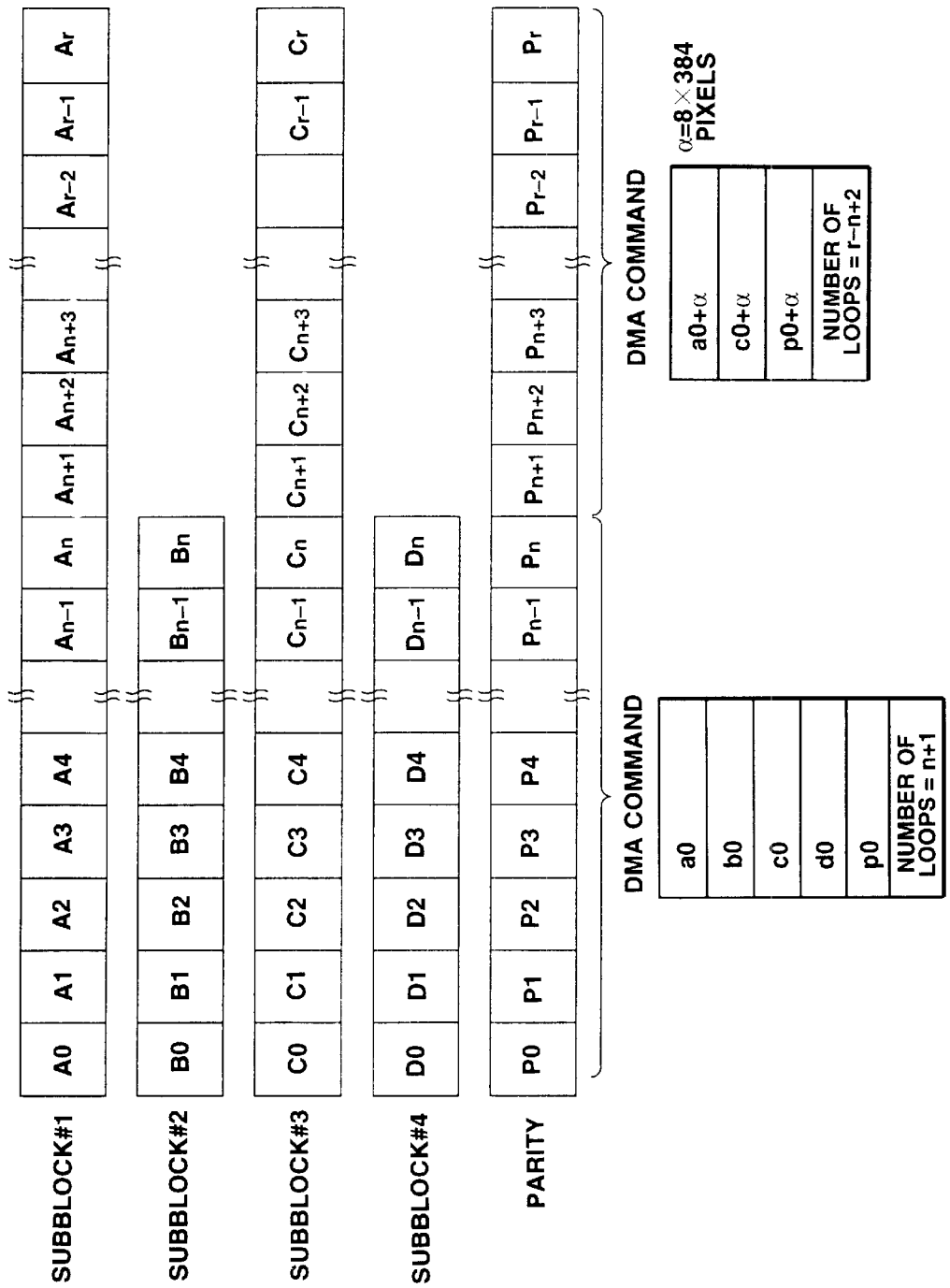
FIG. 44 illustrates the structure of a subblock of one frame of picture shown in FIG. 43.

Specifically, as shown in FIG. 44, the first subblock includes the packet transfer blocks A0 to Ar. The second subblock includes the packet transfer blocks B0 to Bn. The third subblock includes the packet transfer blocks C0 to Cr. The fourth subblocks includes the packet transfer blocks D0 to Dn. The parity data includes packet transfer blocks P0 to Pr.

As is clear from comparison of FIGS. 43 and 44, for example, the packet transfer blocks Ai constituting the first subblock include pixels dispersed at predetermined positions instead of continuous pixels on one frame of picture shown in FIG. 43. (As a matter of course, pixels are continuous within one packet transfer block.) As shown in FIG. 44, n+1 units of packet transfer blocks of each subblock constitute 4:1 RAID, together with n+1 units of parity data.

On the other hand, the packet transfer blocks from the packet transfer block An+1 to the packet transfer block Ar of the first subblock, the packet transfer blocks from the packet transfer block Cn+1 to the packet transfer block Cr of the third subblock, and the parity data from the packet transfer block Pn+1 to the packet transfer block Pr constitute 2:1 RAID.

The packet transfer blocks in the area of 4:1 RAID are DMA-transferred to the data buffer 212 of FIG. 36 by a DMA command as shown on the left side in FIG. 44. Specifically, the data A1 of the first subblock is stored at an address a0 of the data buffer 212. The packet transfer block B1 of the second subblock is stored at an address b0 of the data buffer 212. The packet transfer block C1 of the third subblock is stored at an address c0 of the data buffer 212. The packet transfer block D1 of the fourth subblock is stored at an address d0 of the data buffer 212. The parity data is stored at an address p0 of the data buffer 212. Then, the second packet transfer blocks A2, B2, C2, D2 and parity data P2 are sequentially transferred. Similarly, n+1 times of transfer is carried out with respect to the packet transfer blocks in the area of 4:1 RAID.

On the other hand, the packet transfer blocks in the area of 2:1 RAID are DMA-transferred to the data buffer 212 of FIG. 36 by a DMA command shown on the right side in FIG. 44. Specifically, the packet transfer block An+1 of the first subblock is stored at the address a0 of the data buffer 212. Similarly, the packet transfer block Cn+1 of the third subblock is stored at the address c0 of the data buffer 212. The parity data Pn+1 is stored at the address p0 of the data buffer 212. Similarly, the second and subsequent packet transfer blocks An+2, Cn+2, Pn+2, An+3, Cn+3, Pn+3, . . . are sequentially transferred. In this case, the number of times of transfer of the packet transfer blocks is r−n+2.

Figure 45:
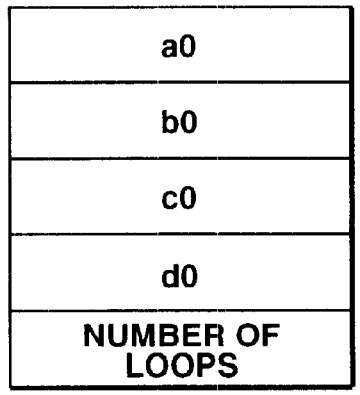
FIG. 45 illustrates a DMA command at the time of reproduction in the case where there is no error.
Figure 46:
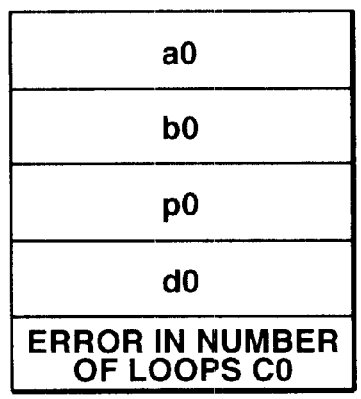
FIG. 46 illustrates the DMA command at the time of reproduction in the case where there is an error.

FIGS. 45 and 46 show DMA commands in the case where packet transfer blocks are read out from the data buffer 212. FIG. 45 shows the case where there is no error in each packet transfer block, and FIG. 46 shows the case where there is an error.

As shown in FIG. 45, in the case where there is no error in each packet transfer block, addresses a0 to d0 of the data buffer 212 where the respective packet transfer blocks are stored and the number of transfer times are described. That is, in this case, one packet transfer block of the first subblock is read out from the address a0 of the data buffer 212. One packet transfer block of the second subblock is read out from the address b0. On packet transfer block of the third subblock is read out from the address c0. One packet transfer block of the fourth subblock is read out from the address d0. Such reading is carried out corresponding to the number of loops.

On the other hand, in the case where there is an error in, for example, the packet transfer block of the third subblock, as shown in FIG. 46, the address p0 where the parity data is stored is described in place of the address c0 where the packet transfer block having an error is stored. The number of loops is designated as a command, and a flag indicating that the third subblock data stored at the address c0 has an error is described. Therefore, in this case, the third subblock data is not read out from the data buffer 212, and instead, the parity data is read out.

Figure 47:
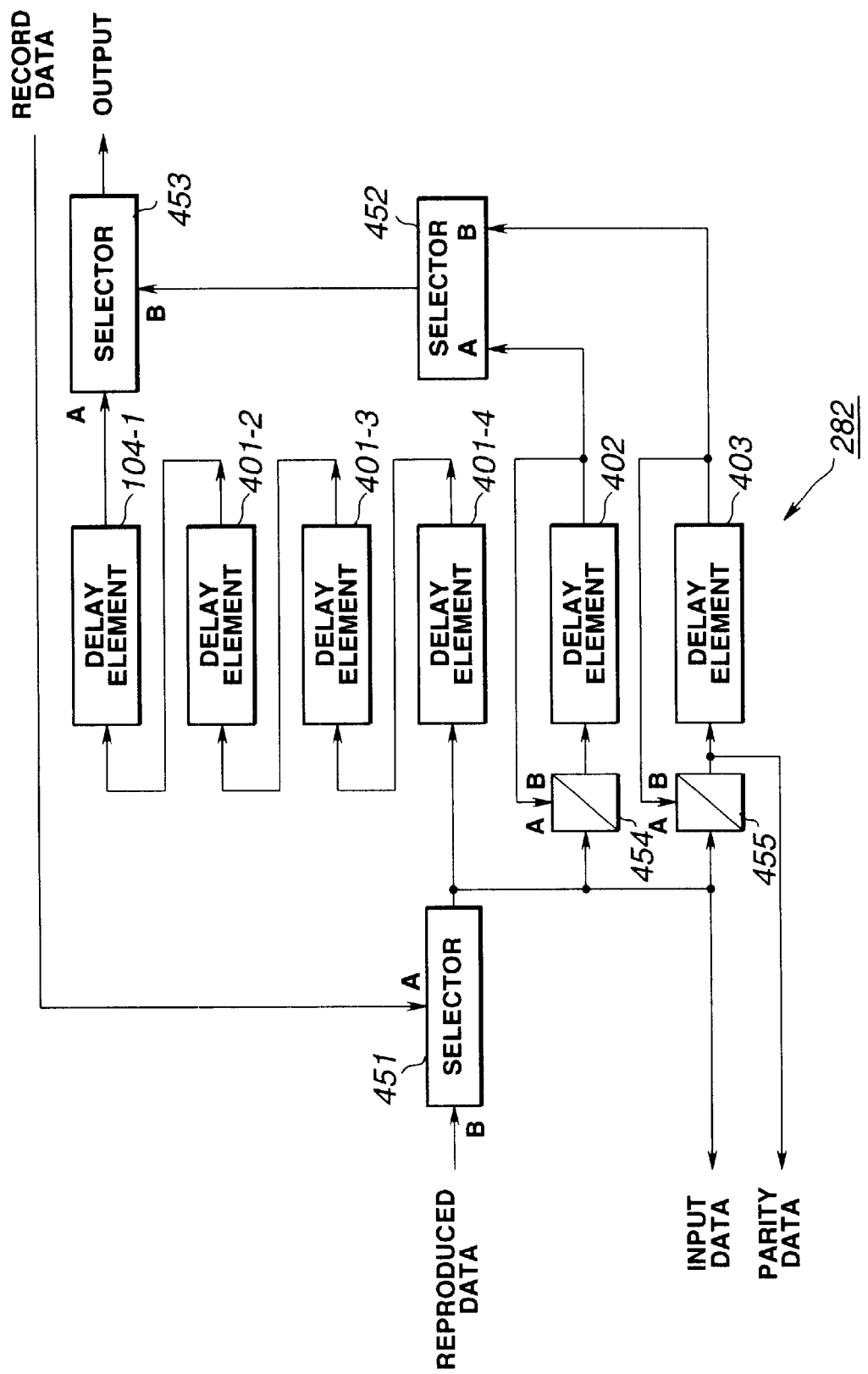
FIG. 47 is a block diagram showing the structure of the RAID controller of FIG. 36, further in detail.

Specific structure and operation for generating parity data in real time and carrying out error correction by using the parity data in real time in the RAID controller 282 of FIG. 36 will now be described. FIG. 47 shows an example of the structure of such section of the RAID controller 282 for generating parity data in real time and carrying out error correction by using the parity data.

A selector 451 selects either one of record data (pixel data) supplied from the video processor 283 and pixel data (reproduced data) supplied from the data buffer 212, and supplies the selected data to another circuit, not shown, and to a delay element 401-4 and inputs A of selectors 454, 455. The delay element 401-4 delays the inputted data by the amount of one packet transfer block and outputs the delayed data to a subsequent delay element 401-3. The delay element 401-3, too, delays the inputted data by the amount of one packet transfer block and outputs the delayed data to a subsequent delay element 401-2. The delay element 401-2, too, delays the inputted data by the amount of one packet transfer block and outputs the delayed data to a subsequent delay element 401-1. The delay element 401-1 delays the inputted data by the amount of one packet transfer block and outputs the delayed data to an input A of a selector 453.

In the block diagram of FIG. 47, the four delay elements 401-1 to 401-4 are shown. Actually, however, the delay elements are constituted by the single delay element 401 of FIG. 36, and by repeatedly using the delay element 401 for the number of loops (in this case, four), the delay of the packet transfer block for the number of loops can be obtained.

The selector 454 selects one of an input B supplied with an output of a delay element 402 and the input A supplied with the output of the selector 451 or calculates an exclusive OR of the two inputs, and outputs the result to the delay element 402. An output of the delay element 402 is supplied to an input A of a selector 452.

The selector 455, too, selects one of the input A supplied with the output of the selector 451 and an input B supplied with an output of a delay element 403 or calculates an exclusive OR of the two inputs. The selector 455 outputs the result to the delay element 403, and outputs the result as parity data to a circuit, not shown. An output of the delay element 403 is supplied to an input B of the selector 452.

The selector 452 selects one of the inputs A and B and supplies the selected data to an input B of the selector 453. The selector 453 selects on the input A from the delay element 401-1 and the input B from the selector 452, and outputs the selection result to the video processor 283.

Operation in the case where parity data is to be generated will now be described with reference to FIG. 48. When pixel data that should be recorded into the data buffer 212 is inputted from the video processor 283 to the RAID controller 282, the RAID controller 282 transforms the pixel data from data based on 10 bits as a unit to data based on 32 bits (one word) as a unit. In addition, the RAID controller 282 collects the data for 128 words (for one packet transfer block), and supplies the collected record data to the input A of the selector 451. It is now assumed that the first inputted packet transfer block has a number 0. This packet transfer block of the number 0 is selected by the selector 451, and then supplied to the input A of the selector 455 and supplied as input data to a circuit, not shown. At this point, since the delay element 403 holds no packet transfer block, the selector 455 directly selects the input A. The output (packet transfer block of the number 0) of the selector 455 is supplied to and held by the delay element 403. The above-described operation is outlined in FIG. 48.

When a packet transfer block of a number 1 is supplied to the selector 451, the selector 451 selects this packet transfer block and supplies this packet transfer block to the selector 455. Since the input B of the selector 455 is supplied with the packet transfer block of the number 0 held by the delay element 403, the selector 455 calculates an exclusive OR of the packet transfer block of the number 1 supplied from the selector 451 and the packet transfer block of the number 0 supplied from the delay element 403, and supplies this exclusive OR to the delay element 403 so that the delay element 403 holds the exclusive OR.

Similarly, as shown in FIG. 48, when a packet transfer block of a number 2 is supplied to the selector 451, the selector 455 calculates and outputs an exclusive OR of the packet transfer blocks of the numbers 0, 1 and 2. When a packet transfer block of a number 3 is inputted, the selector 455 calculates and outputs an exclusive OR of the packet transfer blocks of the numbers 0 to 3. In the case of 4:1 RAID, the calculated exclusive OR becomes the parity to be found.

Similarly, when packet transfer blocks of new numbers are sequentially inputted, parity data are sequentially generated and outputted in real time, as shown in FIG. 48.

The input data selected and outputted from the selector 451 is inputted from the RAID controller 282 to the FIFO 405-1 through the 32-bit bus, and then supplied therefrom to the DMA controller 281 through the 64-bit bus. The parity data outputted from the selector 455 is supplied from the RAID controller 282 to the FIFO 404-1 through the 32-bit bus, and then supplied therefrom to the DMA controller 281 through the 64-bit bus.

To the DMA controller 281, the DMA command as shown in FIG. 41 is inputted from the controller 262. The DMA controller 281 reads out the pixel data stored in the FIFO 405-1 or the parity data stored in the FIFO 404-1 in accordance with the DMA command, and supplies the read out data to the buffer controller 211 through the DMA bus 251. The buffer controller 211 carries out processing for writing the data, supplied thereto through the DMA bus 251, into the data buffer 212. Thus, the pixel data and the parity data are stored in the data buffer 212, for example, in the state as shown in FIG. 42.

The SCSI controller 202 is supplied with the command from the controller 262 through the control bus 252, and outputs a control signal to the buffer controller 211 in accordance with this command. The SCSI controller 202 thus reproduces the pixel data and the parity data stored in the data buffer 212 and takes these data therein. Then, the SCSI controller 202 writes the data from the data buffer 212, taken through the buffer controller 211, onto a predetermined track of a corresponding predetermined hard disk 201. Thus, one frame of pixel data is divided into four subblocks and the respective subblocks are recorded on the different hard disks 201, for example, in the state as shown in FIG. 33. The parity data corresponding to that frame of pixel data are also recorded on the different hard disks 201.

Operation in the case where an error of data reproduced from the hard disk 201 is to be corrected to output the data will now be described with reference to FIG. 49. The controller 262 outputs a command to the SCSI controller 202 through the control bus 252, and reproduces parity data corresponding to pixel data of a predetermined frame recorded on the hard disk 201. This reproduced data is written into the data buffer 212 from the SCSI controller 202 through the buffer controller 211. The controller 262 commands DMA transfer of the data thus written in the data buffer 212 to the RAID controller 282, with respect to the DMA controller 281 through the control bus 252. In accordance with this command, the DMA controller 281 reads out the data written in the data buffer 212 through the buffer controller 211, and receives transfer through the DMA bus 251. Then, the DMA controller 281 supplies and stores this data to the FIFOs 406A-1 and 406B-1 through the 64-bit bus. The data written in the FIFOs 406A-1 and 406B-1 are supplied to the RAID controller 282 through the 32-bit bus.

The RAID controller 282 receives, at the input B of the selector 451, the data thus supplied from the FIFOs 406A-1 and 406B-1.

When, for example, a packet transfer block of a number 0 is inputted to the selector 451, this packet transfer block is selected by the selector 451 and is supplied to the delay element 401-4 and the inputs A of the selectors 454 and 455, as shown in FIG. 49. Since the selector 455 is controlled to select the input B at this point, as shown in FIG. 49, the data supplied to the input A thereof is not supplied to the delay element 403. On the other hand, since the selector 454 is controlled to select the input A, the selector 454 selects the packet transfer block of the number 0, and supplies and holds this packet transfer block to the subsequent delay element 402.

Next, when a packet transfer block of a number 1 is inputted to and selected by the selector 451, this packet transfer block is supplied to the delay element 401-4, and the packet transfer block of the number 0 which has been held by the delay element 401-4 is transferred and held to the subsequent delay element 401-3.

The selector 454 calculates an exclusive OR of the packet transfer block of the number 1 from the selector 451, supplied from the input A, and the packet transfer block of the number 0 held by the delay element 402, and supplies and stores the calculated exclusive OR to the delay element 402.

Then, a packet transfer block of a number 3 is to be inputted. However, if an error is generated in the packet transfer block of the number 3, the DMA controller 281 selects parity data instead of this packet transfer block of the number 3 so as to read out and supply this parity data from the data buffer 212 to the RAID controller 282. This parity data is supplied to the delay element 401-4 from the selector 451 and is supplied to the input A of the selector 454. At this point, the selector 454 calculates an exclusive OR of the data from the input A and the data from the input B. Since the parity data is supplied to the input A while the exclusive OR of the packet transfer block of the number 0 and the packet transfer block of the number 1 is held by the delay element 402, the selector 454 calculates an exclusive OR of the packet transfer block of the number 0, the packet transfer block of the number 1 and the parity data, and outputs this exclusive OR to the delay element 402.

In addition, when the packet transfer block of the number 3 is inputted from the selector 451, this packet transfer block is supplied to the delay element 401-4, and the parity data which has been held by the delay element 401-4 is supplied to the subsequent delay element 401-3. The packet transfer block of the number 1 which has been held by the delay element 401-3 is supplied and held to the subsequent delay element 401-2. The packet transfer block of the number 0 which has been held by the delay element 401-2 is supplied and held to the subsequent delay element 401-1.

The selector 454 calculates an exclusive OR of the packet transfer block of the number 3 supplied from the selector 451 and the data of the calculated exclusive OR of the packet transfer block of the number 0 held by the delay element 402, the packet transfer block of the number 1 and the parity data. The result of calculation is data such that an error of packet transfer block of a number 2 is corrected, and this data is held by the delay element 402.

Next, when a packet transfer block of a number 4 is inputted to the selector 451, this packet transfer block is selected and held by the delay element 401-4. The packet transfer block of the number 3 which has been held by the delay element 401-4 is supplied to the subsequent delay element 401-3. The parity data which has been held by the delay element 401-3 is supplied and held to the subsequent delay element 401-2. The packet transfer block of the number 1 which has been held by the delay element 401-2 is supplied and held to the subsequent delay element 401-1. The packet transfer block of the number 0 which has been held by the delay element 401-1 is supplied to the input A of the selector 453, then selected by the selector 453, and outputted to the video processor 283.

When a packet transfer block of a number 5 is inputted to the selector 451, processing similar to the above-described case is carried out, and the packet transfer block of the number 1 which has been held by the delay element 401-1 is selected ad outputted by the selector 453.

At the timing for inputting a packet transfer block of a number 6 to the selector 451, if an error is detected in this packet transfer block of the number 6, parity data is supplied to the selector 451 instead of the packet transfer block of the number 6. As a result, this parity data is supplied to and held by the delay element 401-4, and is supplied to and held by the delay element 403 through the selector 455. The combination of the selector 454 and the delay element 403 and the combination of the selector 455 and the delay element 403 are alternately used for every one frame (every four packet transfer blocks). Therefore, in the case where the packet transfer blocks of the numbers 0 to 3 are supplied to the delay element 402 through the selector 454, data of packet transfer blocks of numbers 4 to 8 of the next one frame are supplied to the delay element 403 through the selector 455. Then, when a packet transfer block of a new number is inputted from the selector 451, the selector 455, similarly to the case of the selector 454, calculates a new exclusive OR with the packet transfer block which has been held by the delay element 403 or with the calculation result of exclusive OR up to that point, and supplies and holds the result of calculation to the delay element 403.

Thus, at the timing when the packet transfer blocks of the number 4, 5 and 6 (parity data) are inputted from the selector 451, the selector 455 calculates an exclusive OR of the parity data inputted from the selector 451 and the calculation result of exclusive OR of the packet transfer blocks of the number 4 and 5 which have been held by the delay element 403, and supplies and holds the calculated exclusive OR to the delay element 403. On other hand, the delay element 402 holds the data such that an error of the previous field is corrected (the packet transfer block of the number 2).

At the timing when the packet transfer block of the number 6 is inputted to the selector 451, the delay element 401-1 outputs the parity data which is inputted thereto instead of the packet transfer block of the number 2 including an error. If this parity data is selected and outputted by the selector 453, the parity data is outputted ultimately. Thus, at this timing, the selector 453 is switched to select the data from the input B instead of the data from the input A. The input B of the selector 453 is supplied with the output of the selector 452, the selector 452 selects and outputs the corrected packet transfer block of the number 2 which is held by the delay element 402 and supplied to the input A. As a result, the parity data is not outputted and the corrected packet transfer of the number 2 is outputted from the selector 453.

Similarly, as shown in FIG. 49, at the timing when a packet transfer block of a number 10 is inputted to the selector 451, the parity data which is inputted instead of the packet transfer block of the number 6 including an error is supplied from the delay element 401-1 to the input A of the selector 453. At this point, since the selector 453 is switched to the input B while the selector 452 selects the error-corrected packet transfer block of the number 6 which is held by the delay element 403 and supplied to the input B, this error-corrected packet transfer block is outputted from the selector 453.

Thus, when reproduced data are sequentially inputted from the DMA controller 281, errors are sequentially corrected in real time, and the corrected data are supplied to the video processor 283.

Operation at the time of recording in the disk recorder 2 shown in FIG. 7 will now be outlined as follows. It is now assumed that video data supplied from the a editing device 1 to the disk recorder 2 is video data of the NTSC system.

On receiving a recording command from the host personal computer 3 through the SCSI, the controller 262 of the disk recorder 2 searches a free area where the video data supplied from the editing device 1 can be recorded, with reference to the allocation map 303 on the RAM 263. This free area search is carried out with respect to each of four subblocks divided from one frame of video data and with respect to each of parity data generated from pixel data of the subblocks. At this point, since the number of sectors of the parity data and the number of sectors of the four subblocks are not accurately known, the free area search is carried out on the track basis, not on the sector basis.

The controller 262 determines a recording position for recording the parity data and the data of the four subblocks onto the hard disk 201 on the basis of the status of the searched free area. This recording position is designated by the disk ID of the hard disk 201 and the start logical sector number of a sector to start recording. Specifically, as shown in FIG. 15, with respect to the parity data, the logical sector number 0 (sector of the outermost track) of the hard disk 201-1 with the disk ID 1 is the record starting position. With respect to the first subblock data, the logical sector number 599600 (sector of the innermost track) of the hard disk 201-2 with the disk ID 2 is the record starting position. With respect to the second subblock data, the logical sector number 0 (sector of the outermost track) of the hard disk 201-3 with the disk ID 3 is the record starting position. With respect to the third subblock data, the logical sector number 599600 (sector of the innermost track) of the hard disk 201-4 with the disk ID 4 is the record starting position. With respect to the fourth subblock data, the logical sector number 599600 (sector of the outermost track) of the hard disk 201-5 with the disk ID 5 is the record starting position.

The controller 262 then finds the physical address including the cylinder address, medium number and sector number from the start logical sector number determined as the data recording position, with reference to the physical address table 302.

In addition, the controller 262 determines a zone in which the cylinder address found with reference to the physical address table 302 is included, from among 12 zones, with reference to the ZBR table 301, and determines the number of sectors used in on track in accordance with the zone.

Moreover, the controller 262 generates the block map 304 based on the disk ID, the logical sector number and the number of sectors of the parity data and the disk ID, the logical sector number and the number of sectors of the first to fourth subblocks, found by the foregoing control.

In this manner, the block map corresponding to the video data designated to the first frame (frame of the number 1) is prepared.

The controller 262 then generates a sequence program to be supplied to the DMA controller 281 and the RAID controller 282, with reference to the block map 304. This sequence program includes an operand including the address showing the housing position of the parity data and the video data on the data buffer 212, the number of loops of packet transfer of the parity data and the video data, and a command designating the RAID ratio, as shown in FIG. 41.

The controller 262 transfers the command part of the sequence program to the FIFO 407 through the control bus 252. The RAID controller 282 detects the ratio (RAID ratio) of the video data to the parity data and the number of transfer loops (transfer loop period), with reference to the command supplied through the FIFO 407. That is, by receiving this command, the RAID controller 282 detects the parity ratio at which the parity is to be generated and the number of times for repeating that processing.

The RAID controller 282 calculates the parity data from four packet transfer blocks (subblocks) when the RAID ratio is 4:1, and calculates the parity data from two packet transfer blocks (subblocks) when the RAID ratio is 2:1.

The calculated parity data is supplied every word to the FIFO 404, and the pixel data is supplied every word to the FIFO 405.

Meanwhile, the controller 262 supplies the DMA command (FIG. 41) indicating the position on the data buffer 212 where the subblocks of the supplied video data are to be stored, to the FIFO 501 in the DMA controller 281. The DMA controller 281 carries out DMA transfer of the parity data stored in the FIFO 404 and the pixel data stored in the FIFO 405, by every one packet transfer block (=128 words), to the position on the data buffer 212 designated by the address described in the operand of the DMA command stored by the FIFO 501. This transfer is repeated for the number of loops described in the DMA command.

Figure 50:
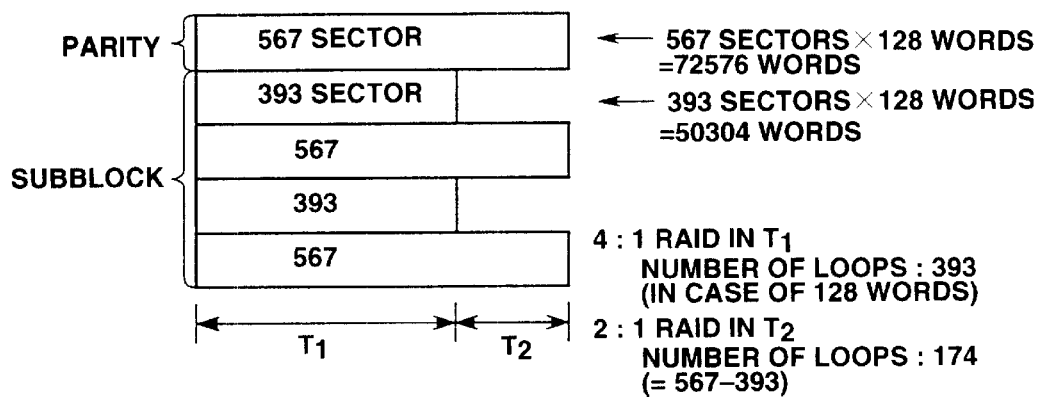
FIG. 50 shows an example of the structure of parity data and subblocks in the NTSC system.

FIG. 50 schematically shows the size of four subblocks and one parity data of the frame indicated by the number 1 in FIG. 15. As shown in FIG. 50, the size of the first subblock S1-1 is 393 sectors and the size of the second subblock S1-2 is 567 sectors. The size of the third subblock S1-3 is 393 sectors and the size of the fourth subblock S1-4 is 567 sectors. The size of the parity data is set to 567 sectors, corresponding to the maximum size of 567 sectors of the first to fourth subblocks.

On the assumption that data of 128 words is to be recorded in one sector, the data quantity of the first subblock is 50304 words (393 sectors×128 words) and the data quantity of the second subblock is 72576 words (567 sectors×128 words). The data quantity of the fourth subblock and that of the parity data are equal to the data quantity of the second subblock. The data quantity of the third subblock is equal to the data quantity of the first subblock.

As described with reference to FIGS. 43 and 44, the pixel data of the four subblocks are obtained by collecting a predetermined number of 128-word data (packet transfer blocks) dispersed at predetermined positions on one picture, not by dividing continuous pixels forming one frame of picture to 1/4.

In the example of FIG. 50, 4:1 RAID is carried out in a range T1 of 393 sectors from the left, and 2:1 RAID is carried out in a range T2 on the right side of the range T1. By setting the number of transfer times (the number of loops) in the range T1 to 393 and the number of loops in the range T2 to 174 (=567−393), picture data of one frame can be transferred to the data buffer 212.

In this example, since 4:1 RAID and 2:1 RAID are necessary, a DMA command for carrying out 4:1 RAID transfer in the range T1 and a DMA command for carrying out 2:1 RAID transfer in the range T2 are required.

As described above, since the RAID controller 282 sequentially generates the parity data with respect to the inputted pixel data, when the packet transfer blocks of the four subblocks are sequentially inputted, the packet transfer blocks are sequentially outputted to the data buffer 212, and the parity data corresponding to the packet transfer blocks are sequentially generated and outputted to the data buffer 212 at a rate of once a RAID ratio.

In the range T1, transfer corresponding to the DMA command designating 4:1 RAID is carried out. In this case, the video data (pixel data of 50304 words) of 393 packet transfer blocks of the first to fourth subblocks are DMA-transferred to and written at the second to fifth addresses of the data buffer 212 corresponding to the hard disks 201-2 to 201-5 of the disk IDs 2 to 5. The pairty data (parity data of 50304 words) of 393 packet transfer blocks are stored by 393 loop transfers at the first address of the data buffer 212 corresponding to hard disk 201-1 of the disk ID 1.

Next, in accordance with the DMA command for 2:1 RAID, the DMA controller 281 writes the pixel data of 174 sectors corresponding to the range T2 of the second subblock to the seventh address (address next to the area where the pixel data 393 sectors of the second subblock of the range T1 is recorded) of the hard disk 201-3 of the disk ID 3, by 174 loop transfers. Similarly, the DMA controller 281 transfers and writes the data to the eighth address (address next to the area where the video data of 393 sectors of the fourth subblocks of the range T1 is recorded) of the hard disk 201-5 of the disk ID 5, by 174 loop transfers. Also, the DMA controller 281 writes the parity data (parity data of 22272 words) of 174 packet transfer blocks to the sixth address (address next to the area where the parity data of 393 sectors of the range T1 is recorded) corresponding to the hard disk 201-1 of the disk ID 1.

In the foregoing manner, the video data of the frame of the number 1 of FIG. 15 is transferred to and stored in the data buffer 212. Similarly, the video data of the numbers 2, 3, . . . are sequentially transferred to and buffered by the data buffer 212.

In the example of FIG. 50, the parity data is recorded on tracks in the zone 1 having 567 sectors per track, which is on the outermost circumference of the ZBR table shown in FIG. 9, and tracks in the zone 12 having 393 sectors per track, which is on the innermost circumference. Specifically, the parity data of 567 sectors is recorded on the tracks in the outermost zone 1 of the hard disk 201-1. The first subblock data of 393 sectors, of the subblocks, is recorded on the track in the innermost zone 12 of the hard disk 201-2. The second subblock data of 567 sectors is recorded on the track in the outermost zone 1 of the hard disk 201-3. The third subblock data of 393 sectors is recorded on the track in the innermost zone 12 of the hard disk 201-4. The fourth subblock data of 567 sectors is recorded on the track in the outermost zone 1 of the hard disk 201-5.

In this manner, the outermost track and the innermost track are used in a pair. Therefore, in the case where the pair of the zone 1 and the zone 12 is full and cannot be used, the zone 2 having 544 sectors per track on the outer side following the zone 1 and the zone 11 having 416 sectors per track on the inner side following the zone 12 are used in a pair.

Figure 51:
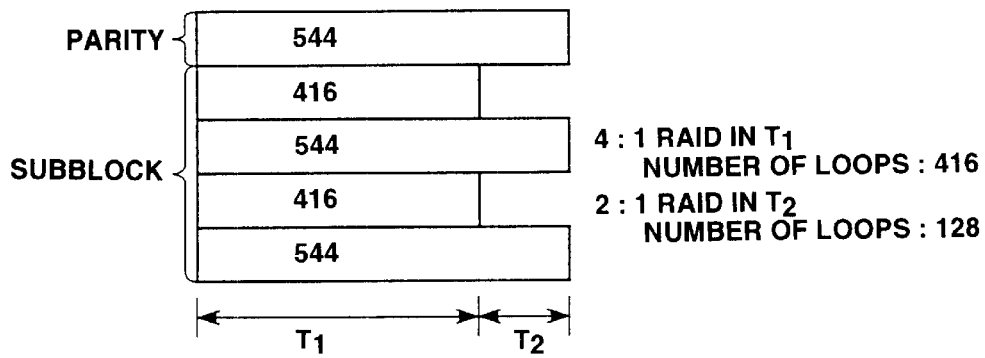
FIG. 51 shows an example of the structure of parity data and subblocks in the NTSC system.
Figure 52:
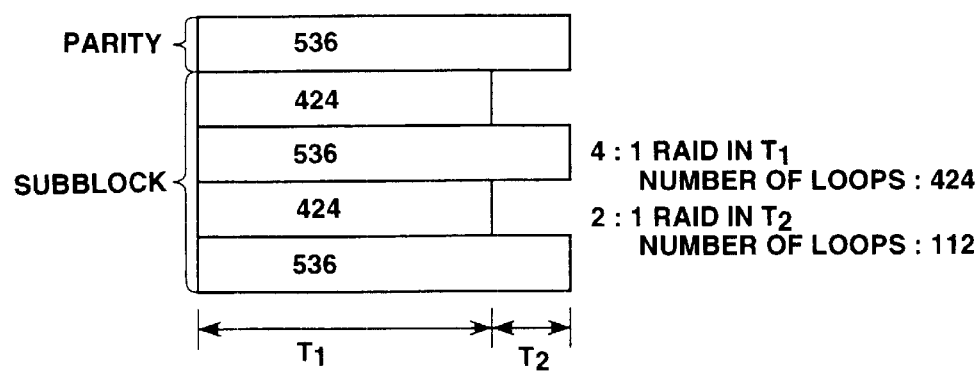
FIG. 52 shows an example of the structure of parity data and subblocks in the NTSC system.
Figure 53:
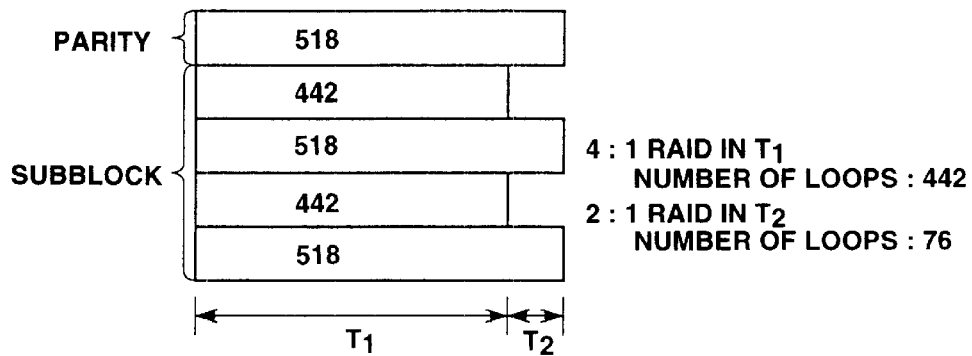
FIG. 53 shows an example of the structure of parity data and subblocks in the NTSC system.
Figure 54:
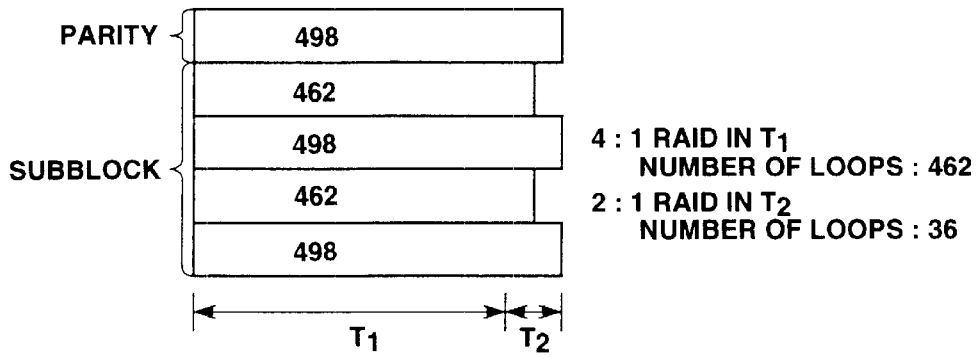
FIG. 54 shows an example of the structure of parity data and subblocks in the NTSC system.
Figure 55:
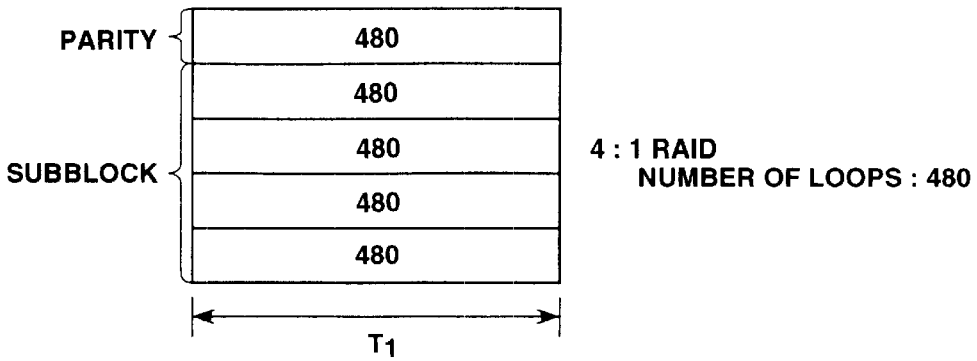
FIG. 55 shows an example of the structure of parity data and subblocks in the NTSC system.

FIG. 51 shows an example of the structure of parity data and subblock data in this case. In this example, parity data of 544 sectors is recorded on a track in the second zone 2 from the outer circumference of the hard disk 201-2. The first subblock data of 416 sectors of the subblocks is recorded on a track in the second zone from the inner circumference of the hard disk 201-3 having 416 sectors per track. The second subblock data of 544 sectors is recorded on a track in the zone 2 of the hard disk 201-4. The third subblock data of 416 sectors is recorded on a track in the zone 11 of the hard disk 201-5. The fourth subblock data of 544 sectors is recorded on a track in the zone 2 of the hard disk 201-6. In this case, 4:1 RAID is carried out in a range T1 of 416 sectors from the left in FIG. 51, and 2:1 RAID is carried out in a range T2 of 128 sectors subsequent to the range T1.

Similarly, FIGS. 52 to 55 express an example in which the zone 3 and the zone 10 are used in a pair, an example in which the zone 4 and the zone 9 are used in a pair, an example in which the zone 5 and the zone 8 are used in a pair, and an example in which the zone 6 and the zone 7 are used in a pair, respectively.

By thus using the outer zone and the inner zone in a pair, as to one hard disk 201, the size of respective subblocks can be so set that the value of the gap θgap of the respective subblocks becomes substantially equal, and the time required for reading and writing the respective subblocks becomes substantially constant.

The structures of FIGS. 50 to 55 are those in the case of the NTSC system. When the video data of the PAL system is used, the size of the parity data and the subblocks can be set as shown in FIGS. 56 to 61. In the case of the PAL system, the number of pixels of one frame is 1440×612, which is greater than in the case of the NTSC system, and the number of sectors per track in each zone is prescribed, as shown in FIG. 10. FIGS. 56 to 61 show the case where the zone 1 and the zone 12 of FIG. 10 are used in a pair, the case where the zone 2 and the zone 11 are used in a pair, the case where the zone 3 and the zone 10 are used a pair, the case where the zone 4 and the zone 9 are used in a pair, the case where the zone 5 and the zone 8 are used in a pair, and the case where the zone 6 and the zone 7 are used in a pair, respectively.

Figure 56:
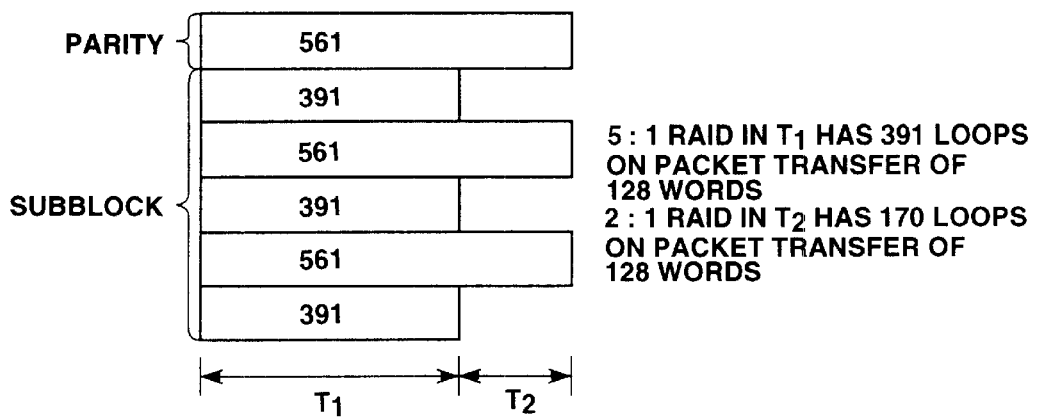
FIG. 56 shows an example of the structure of parity data and subblocks in the PAL system.
Figure 57:
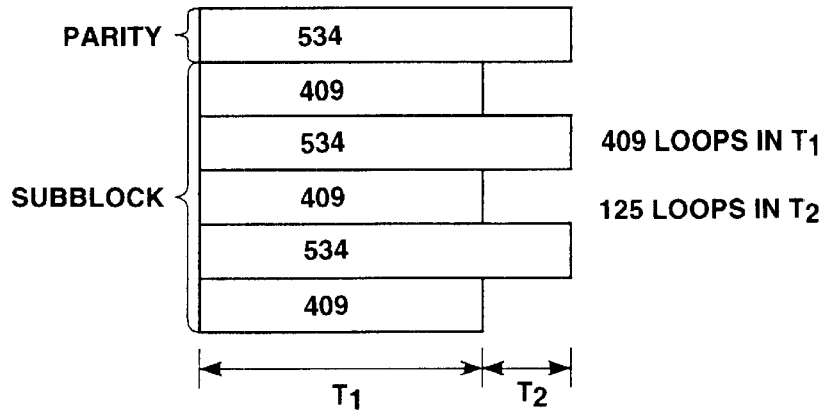
FIG. 57 shows an example of the structure of parity data and subblocks in the PAL system.
Figure 58:
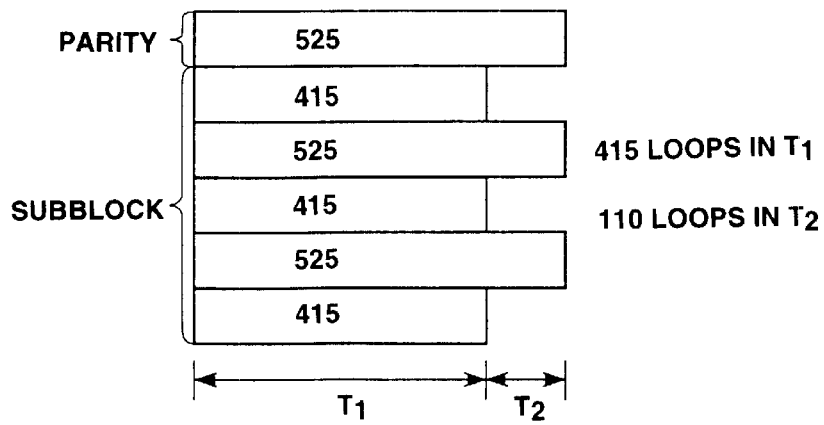
FIG. 58 shows an example of the structure of parity data and subblocks in the PAL system.
Figure 59:
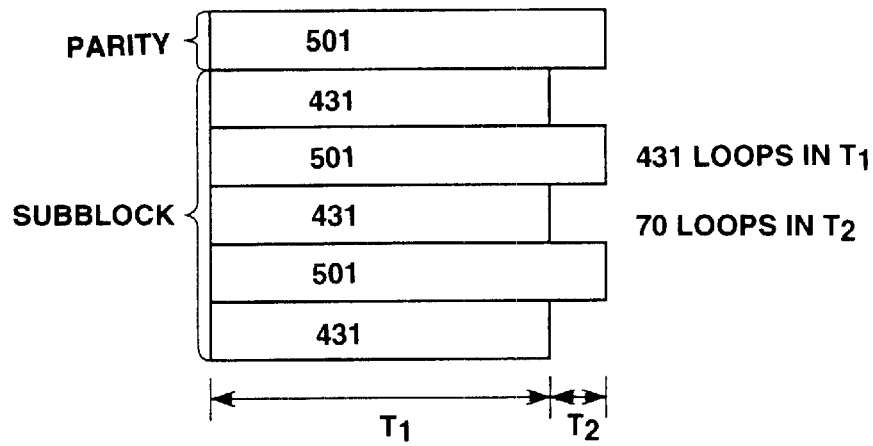
FIG. 59 shows an example of the structure of parity data and subblocks in the PAL system.
Figure 60:
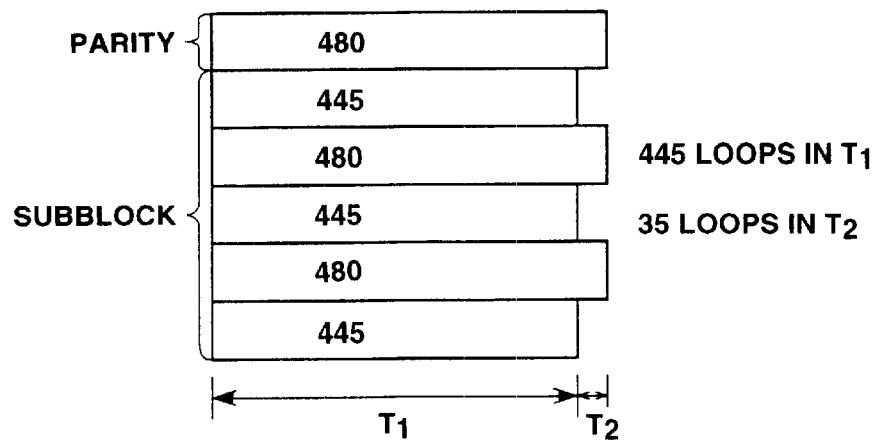
FIG. 60 shows an example of the structure of parity data and subblocks in the PAL system.
Figure 61:
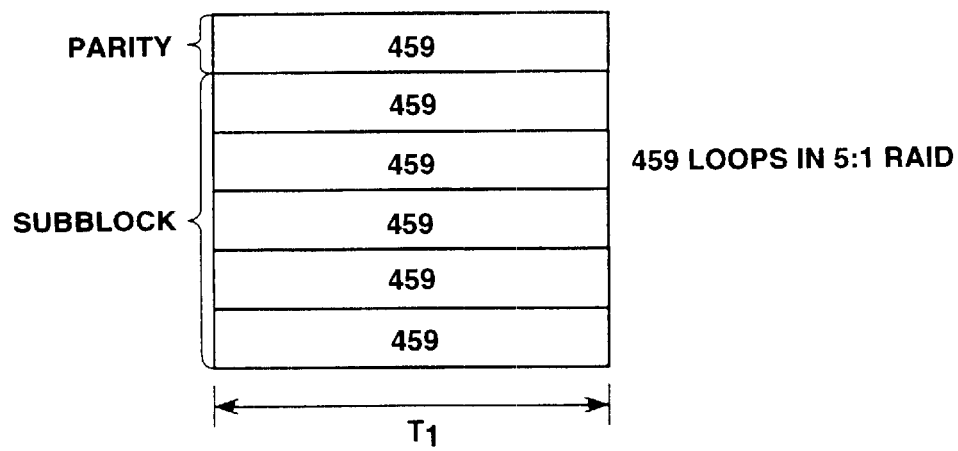
FIG. 61 shows an example of the structure of parity data and subblocks in the PAL system.

In the example of setting of FIG. 56, the parity of 561 sectors is recorded on a track in the outermost zone 1 of the first hard disk 201. The first subblock data of 391 sectors of the subblocks is recorded on a track in the outermost zone 12 of the second hard disk. The second subblock data of 561 sectors is recorded on a track in the zone 1 of the third hard disk. The third subblock data of 391 sectors is recorded on a track in the zone 12 of the fourth hard disk. The fourth subblock data of 561 sectors is recorded on a track in the zone 1 of the fifth hard disk. The fifth subblock data of 391 sectors is recorded on a track in the innermost zone 12 of the sixth hard disk. The data in a range T1 of 391 sectors from the left in FIG. 56 is transferred by 5:1 RAID, and the data of 170 sectors on the right side of the range T1 is transferred by 2:1 RAID. In this case, too, the size of one packet transfer block is set to 128 words. Therefore, 391 transfer loops are carried out in the range T1 and 170 transfer loops are carried out in the range T2.

In the examples shown in FIGS. 57 to 61, the operation is similar to that of FIG. 56 except that the number of transfer loops differs.

As described at step S12-8 in the flowchart of FIG. 26, when parity data and subblock data of one frame are stored in the data buffer 212, the parity data and subblock data of one frame are not transferred immediately to the hard disk 201. For example, when parity data and subblock data of 10 frames are stored in the data buffer 212, the order of data transfer is scheduled by the controller 262 in accordance with the SCAN algorithm.

On the assumption that the number of hard disks 201 is six and that data are recorded as shown in FIG. 62, data buffered at the third address indicating the position for holding data to be transferred to the hard disk 201 of the disk ID 3 include the second subblock data S1-2 of the frame number 1, the first subblock data S2-1 of the frame number 2, the pairty data P3 of the frame number 3, the fourth subblock data S5-4 of the frame number 5, the third subblock data S6-3 of the frame number 6, the second subblock data S7-2 of the frame number 7, the first subblock data S8-1 of the frame number 8, and the parity data P9 of the frame number 9.

The subblock data S1-2 is arranged on the outer circumference and the subblock data S2-1 is arranged on the inner circumference. The parity data P3 is arranged on the outer circumference and the subblock data S5-4 is arranged on the outer circumference. The subblock data S6-3 is arranged on the inner circumference and the subblock data S7-2 is arranged on the outer circumference. The subblock data S8-1 is arranged on the inner circumference and the parity data is arranged on the outer circumference. Therefore, if the data are recorded in the order of S1-2, S2-1, P3, S5-4, S6-3, S7-2, S8-1, and P9, the head of the hard disk of the disk ID 3 moves between the outer circumference and the inner circumference of the hard disk, thus delaying access.

Thus, with reference to the block map 304 (FIG. 15) prepared for each of the video data of the frame numbers 1 to 10, the controller 262 carries out scheduling to transfer these plural data to the hard disk 201 in the order from the data to be arranged on the outermost circumference. That is, with reference to the block map 304 of FIG. 15, the data are rearranged in the order of S1-2, P3, S5-4, S7-2, P9, S8-1, S6-3, S2-1, from the data to be recorded on the outermost circumference. The controller 262 thus schedules the order of data arrangement, so as to restrain the quantity of head movement for recording these plural data to the minimum level and improve the access speed.

For reproducing the data thus recorded on the hard disks 201, inverse operation of the recording operation is carried out. This operation is briefly described as follows. That is, when reproduction of one or more frames is commanded from the host personal computer 3, the controller 262 reads the start logical sector of the frame number on which reproduction is commanded, with reference to the block map 304, and finds the physical address corresponding to the logical sector with reference to the physical address table 302. Then, the controller 262 requests access to the found physical address with respect to the buffer controller 211 through the control bus 252. In response to this request, the buffer controller 211 controls the SCSI controller 202 so as to reproduce data from the address on the hard disk 201 prescribed by the physical address. The reproduced data is supplied from the SCSI controller 202 to the buffer controller 211 and is written into the data buffer 212.

In this case, too, the controller 262 stands by until reproduction requests for 10 frames are collected, and when reproduction requests for 10 frames are accepted, the controller 262 schedules the order from the outer circumference which enables limitation of the head movement quantity to the minimum level, as described above. In accordance with this schedule, reproduction of 10 frames of picture data is requested to the buffer controller 212.

The controller 262 also generates the sequence program for DMA transfer of the data stored in the data buffer 212 to the RAID controller 282, with reference to the block map 304. This sequence program is supplied to the FIFO 501 of the DMA controller 281 through the control bus 252. In this sequence program (DMA command), the address on the data buffer 212 is prescribed in its operand and the number of loops is prescribed in its command, as described above. In response to this command, the DMA controller 281 reads out the data written in the data buffer 212, then receives the data through the DMA bus 251, and transfers the data to the RAID controller 282.

The RAID controller 282 sequentially corrects the inputted data in real time in the above-described manner.

The error-corrected video data outputted from the RAID controller 282 is supplied to the video processor 283, and the clock thereof is changed to a clock of low frequency. Then, the data outputted from the video processor 283 is supplied from the input/output controller 284 to the matrix switcher section 21 of the editing device 1 through the SDI.

The matrix switcher section 21 causes the output processor 32-2 to convert the video data inputted from a predetermined channel of the SDI to a video signal of the SDI format and to output and display the converted video signal to the main monitor 4. In this manner, the user can view the picture recorded on the hard disk 201.

When a predetermined command is inputted from the host personal computer 3, video data taken in the matrix switcher section 21 of the editing device 1 from the disk recorder 2 is inputted to the video processing section 22. In the video processing section 22, the demultiplexer circuit 41-1 takes in a key signal included in the inputted video packet of the SDI format, and outputs this key signal to the key signal processing circuit 51-1. The demultiplexer circuit 41-2 outputs a video signal component, taken out from the inputted video packet of the SDI format, to the video signal processing circuit 51-2.

When the user controls the host personal computer 3 to input a predetermined command, the control block 45 of the video processing section 22 receives the command from the host personal computer 3 through the control bus 25, and controls the wipe signal generating circuit 52-1 in response to the command. The wipe signal generating circuit 52-1 generates a wipe signal corresponding to the command from the control block 45, and supplies this wipe signal to the key signal processing circuit 51-1 and the video signal processing circuit 51-2. The key signal processing circuit 51-1 and the video signal processing circuit 51-2 process the key signal and the video signal, respectively, in response to the wipe signal inputted from the wipe signal generating circuit 52-1, and output the processed key signal and video signal to the mix circuit 71-2.

Similar to the demultiplexer circuit 41-1 and the demultiplexer circuit 41-2, the demultiplexer circuit 41-3 and the demultiplexer circuit 41-4 extract a key signal and a video signal of another channel and output the key signal and the video signal to the key signal processing circuit 51-3 and the video signal processing circuit 51-4, respectively. The wipe signal generating circuit 52-2 generates a wipe signal in response to the command from the control block 45, and outputs the wipe signal to the key signal processing circuit 51-3 and the video signal processing circuit 51-4. The key signal processing circuit 51-3 and the video signal processing circuit 51-4 process the key signal and the video signal, respectively, in response to the wipe signal inputted from the wipe signal generating circuit 52-2, and output the processed key signal and video signal to the frame memory 61-1 and the frame memory 61-2, respectively.

The three-dimensional address generating circuit 63 receives the command from the host personal computer 3 through the control block 45, and outputs a three-dimensional address coordinate corresponding to this command to the frame memory 61-1 and the frame memory 61-2. As a result, the key signal and the video signal transformed to the three-dimensional coordinate are read out from the frame memory 61-1 and the frame memory 61-2, respectively, and are supplied to the interpolator 62-1 and the interpolator 62-2, respectively. The interpolator 62-1 and the interpolator 62-2 carry out interpolation processing corresponding to the three-dimensional address from the three-dimensional address generating circuit 63, with respect to the key signal and the video signal inputted thereto, respectively, and output the interpolated key signal and video signal to the mix circuit 71-1.

The mix circuit 71-2 is also supplied with a background video signal which is extracted by the demultiplexer circuit 41-5 from a predetermined input of the matrix switcher section 21. The mix circuit 71-1 suitably mixes the video signals having a special effect outputted from the interpolators 62-1, 62-2 and the background video signal outputted from the demultiplexer circuit 41-5, and outputs the mixed video signal to the mix circuit 71-2. The mix circuit 71-2 suitably mixes the output of the mix circuit 71-1 with the output of the key signal processing circuit 51-1 and the output of the video signal processing circuit 51-2 to which a transition effect is added.

The output of the mix circuit 71-2 and the output of the mix circuit 71-1 are supplied to the matrix switcher section 21.

In the matrix switcher section 21, when a predetermined command is inputted from the host personal computer 3, the video signal processed by the video processing section 22 is suitably selected and then supplied to any one of the output processors 32-3 to 32-12. From the output processor, the video signal is further supplied to the disk recorder 2 from any one of the combiners 33-1 to 33-10 and then written onto the hard disk 201.

On the other hand, in the case where an audio signal is inputted to the matrix switcher section 21, the control block 34 suitably selects the audio signal and supplies this audio signal to the audio processing section 23. In the audio processing section 23, the separators 81-1 to 81-3 separate an embedded audio signal from the inputted SDI signal and supply the embedded audio signal to the mixer block 83. In the mixer block 83, the control block 86 suitably adjusts the variable resistors 91-1 to 91-6 to a predetermined value in response to the command from the host personal computer 3. As a result, the audio signal separated by the separators 81-1 to 81-3 is adjusted to a predetermined level, and then supplied to and added by the adder 92-1 or the adder 92-2.

The audio signal outputted from the adder 92-1 or the adder 92-2 is inputted to the embedded circuit 85, then compressed on the time axis, transformed to an embedded audio signal, and supplied to a predetermined one of the combiners 33-1 to 33-10 of the matrix switcher section 21. The combiners 33-1 to 33-10 superimpose the inputted audio signal onto a vertical interval of the video signal inputted from the output processors 32-3 to 33-12, and supply the superimposed signal to the disk recorder 2 so as to record this signal onto the hard disk 201.

The audio signal outputted from the adder 92-1 or 92-2 of the mixer block 83 is outputted from the speaker 6 through the amplifier 5.

Although not described, processing of audio data in the disk recorder 2 is similar to that of the video data.

The video data processed by the editing device 1 is suitably supplied to the host personal computer 3 from the output processor 32-1.

In this disk recorder 2, since the above-described FARAD algorithm is used, high-speed random access can be carried out. Therefore, it is possible to simultaneously reproduce multi-channels of video data from the hard disk 201 and simultaneously process the video data while ensuring real time property in the video block 271. Thus, it is also possible to synthesize plural channels of video data reproduced simultaneously from the hard disk 201 to produce a synthetic picture of a single channel.

Figure 63:
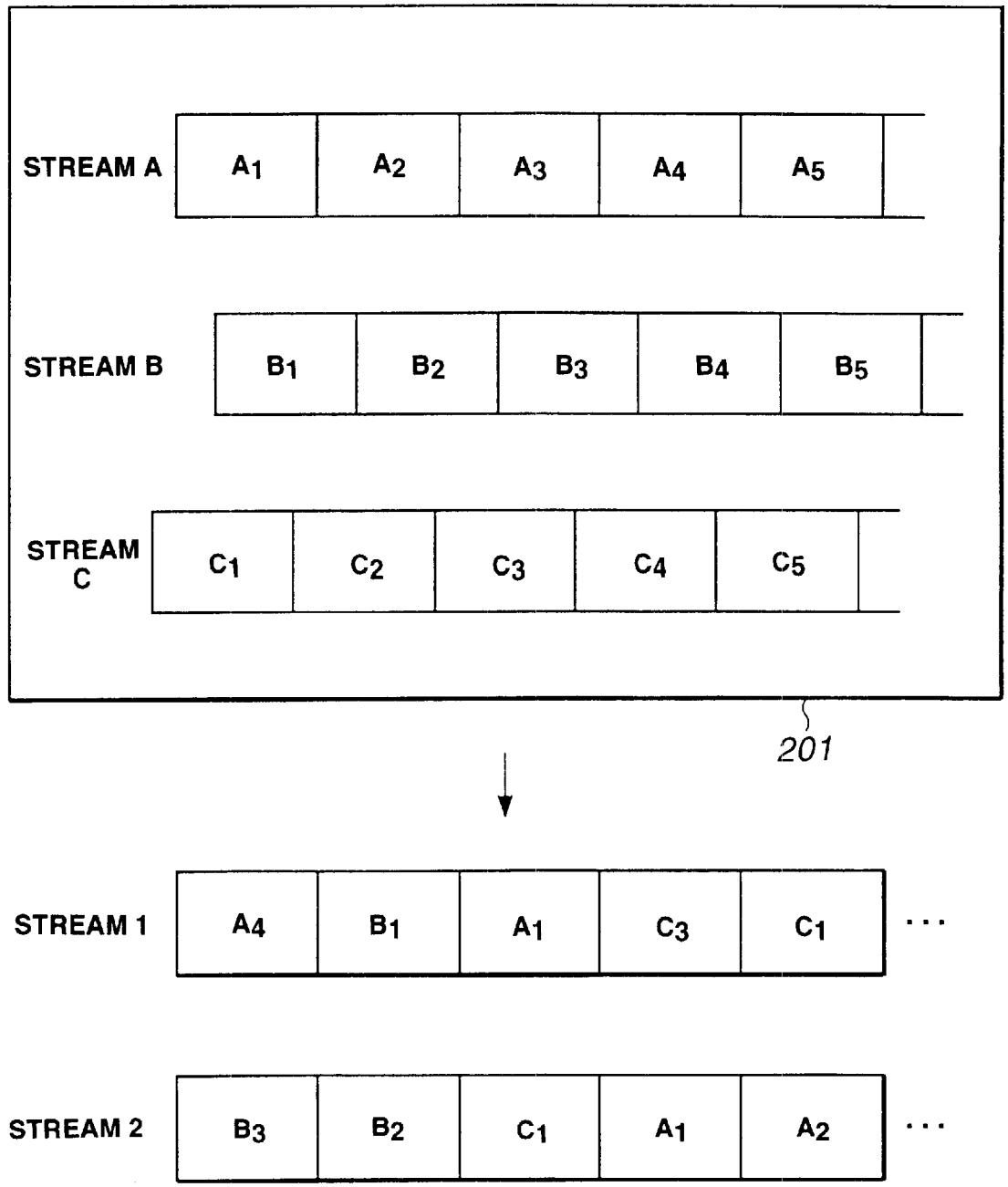
FIG. 63 illustrates the structure of a stream.
Figure 64:
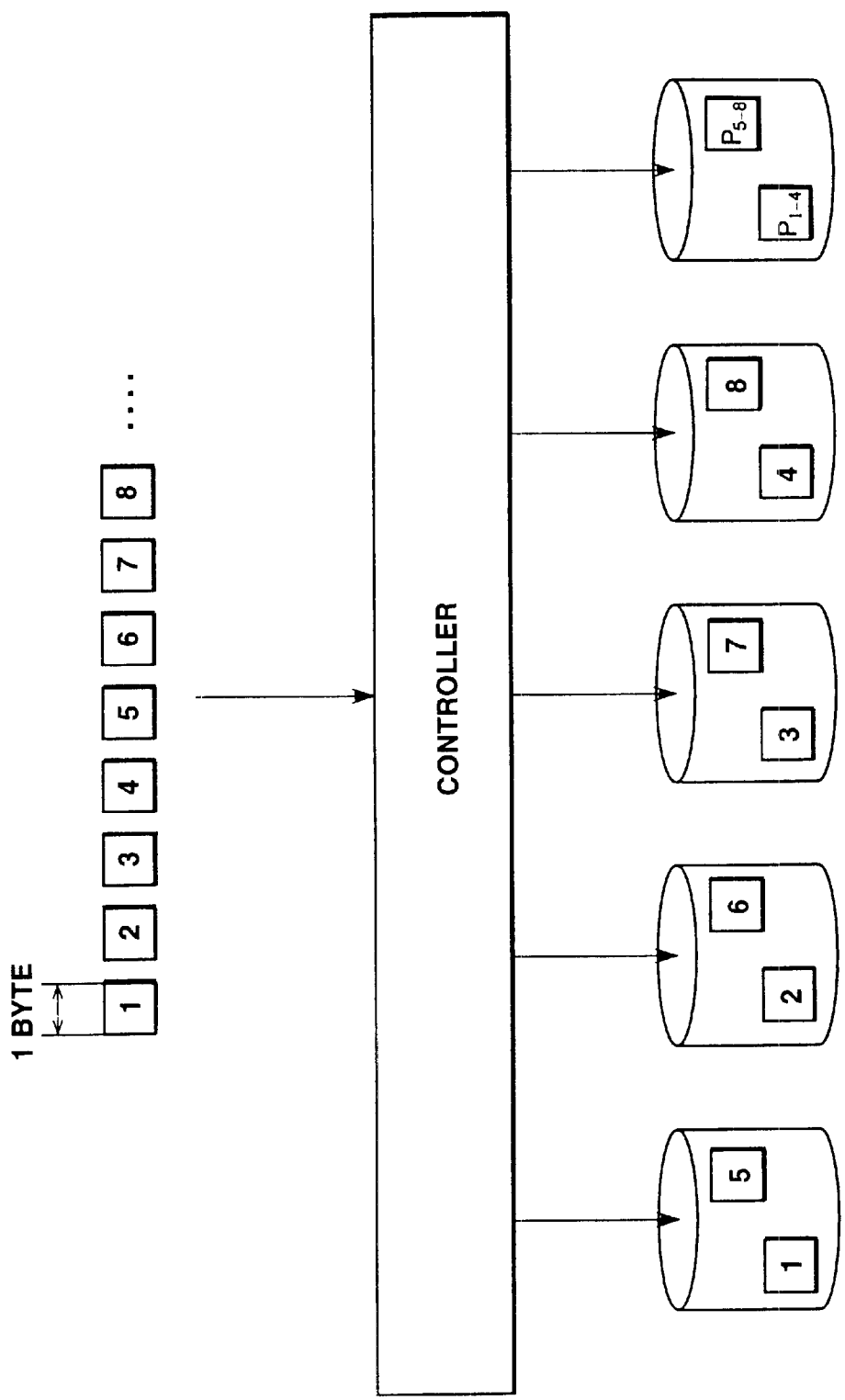
FIG. 64 illustrates conventional RAID.
Figure 65:
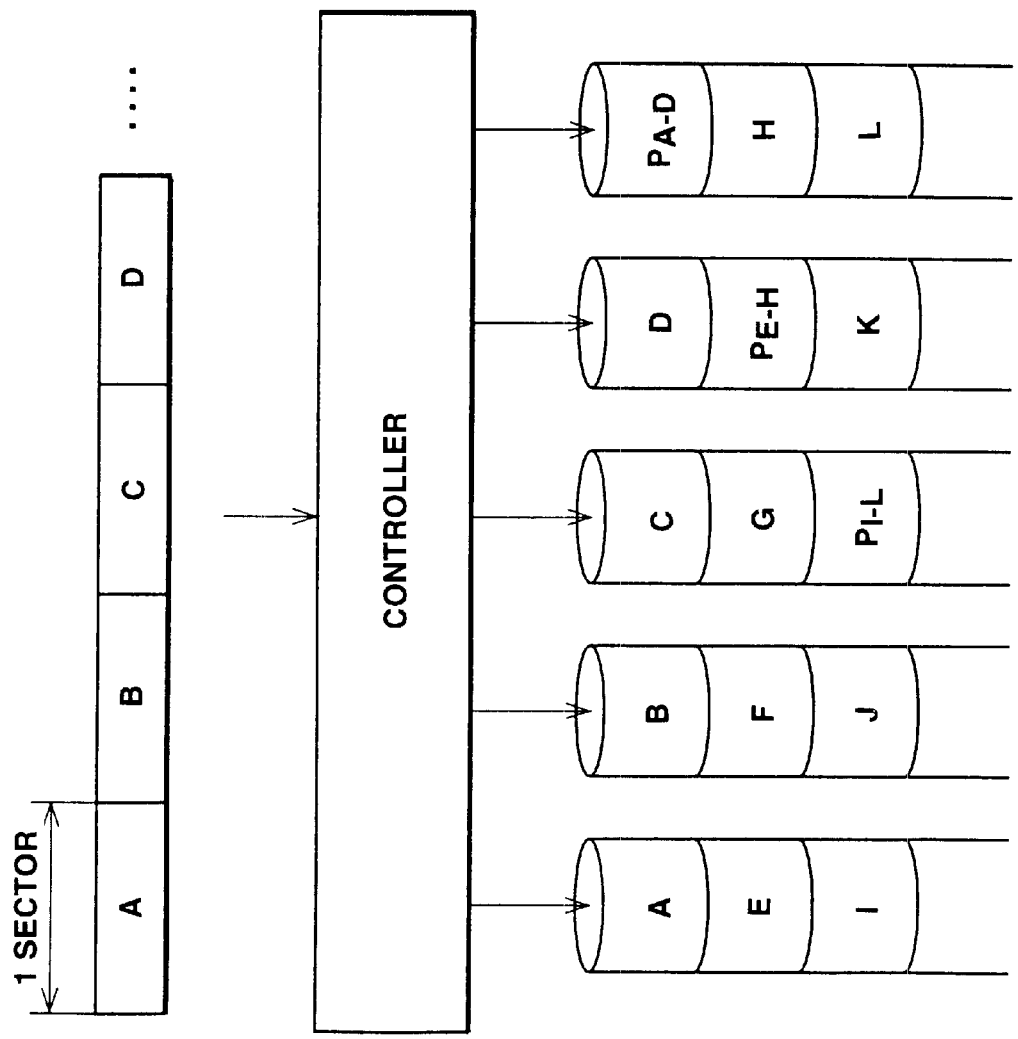
FIG. 65 illustrates conventional RAID.

Referring to FIG. 63, the concept in editing multi-channels of video data on the frame basis will now be described. As shown in FIG. 63, a stream A, a stream B and a stream C are recorded as multi-channels of source video data on the hard disk 201. The stream A includes temporary continuous frames A1 to A5. The stream B includes temporary continuous frames B1 to B5. The stream C includes temporary continuous frames C1 to C5. These frames A1 to A5, frames B1 to B5, or frames C1 to C5 are sequentially recorded in the order indicated by subscript numerals.

It is now assumed that, in the state where the streams A to C are thus stored on the hard disk 201, the editing operator operates the host computer 3 to generate an edit list to reproduce the respective frames, for example, in the order of the frame A4 of the stream A, the frame B1 of the stream B, the frame A1 of the stream Am and the frames C3, C1 of the stream C. The host computer 3 controls the disk recorder 2 to reproduce the respective frames designated in this order, in real time. A stream of frames A4, B1, A1, C3, C1 is not actually recorded on the hard disk 201, and the order of frames to be reproduced is designated by data such as the edit list from the side of the host personal computer 3.

When the edit list data corresponding to the stream 1 is supplied from the host personal computer 3 to the controller 262 of the CPU block 261 of the disk recorder 2, the controller 262 recognizes the address where each frame is stored, in accordance with the block map 304 stored in the RAM 263.

In addition, the controller 262 controls the access order of the frames designated to realize the minimum seek distance based on the SCAN algorithm, in accordance with address of each frame obtained from the block map 304. In this operation, though a plurality of subblocks constituting each frame of the plural channels of video data are stored at random positions on each disk, each subblock is stored in accordance with the FARAD algorithm so as to realize the minimum latency time of the head. Therefore, the plural subblocks constituting each frame of the plural channels of video data can be read out while real time property is ensured.

Also, in reading out the plural subblocks, the parity data associated by the RAID algorithm is simultaneously read out. Therefore, the controller 262 controls the RAID controller to correct an error of the read out plural subblocks by using the parity data.

Next, since the respective subblocks are split by the RAID algorithm, the controller 262 restores original frame data from the read out plural subblock data.

Finally, since the restored frame data are in the read-out order designated by the SCAN algorithm, the frame data are rearranged in the frame order (A4, B1, A1, C3, C1) designated by the host computer 3, and then outputted as the stream 1.

Similarly, by generating edit list data including the frames B3, B2, C1, A1, A2 as a second video channel by the host computer 3 and then supplying the edit list from the host computer 3 to the disk recorder, a stream 2 in accordance with the edit list can be reproduced from the disk recorder 2.

Thus, according to the editing system of the present invention, the stream 1 based on the edit list of the first video channel and the stream 2 based on the edit list of the second video channel can be simultaneously reproduced from the disk recorder 2 while real time property is ensured. In addition, according to the editing system of the present invention, real-time signal processing can be carried out on the reproduced plural channels of video data.

The blocks and the number of channels in the bus and SDI in the above-described embodiment are only examples, and can be modified if necessary. The number of subblocks in dividing one frame of data and the number of words of a packet transfer block in dividing each subblock can also be changed suitably. In addition, the RAID ratio can be set to an arbitrary value.

According to the editing system and the editing method as described above, a plurality of channels of video data are simultaneously reproduced from the disk on the basis of editing information, and the reproduced plural channels of video data are edited on the basis of the editing information so as to generate at least one channel of video data. Therefore, quick editing can be carried out.

What is claimed is:

1. An editing system comprising:
   a data recording/reproducing device for recording/reproducing a plurality of channels of source video data; the data recording/reproducing device including:
      recording/reproducing means for recording one frame of pixel data of the plurality of channels of source video data onto a plurality of randomly accessible recording media and reproducing a plurality of channels of video streams constituted by desired frames of the plurality of channels of video data stored on the plurality of recording media, and
      control means for controlling the recording/reproducing means on the basis of a predetermined algorithm for dividing the one frame of pixel data into a plurality of subblocks and transferring the divided subblocks of data to a plurality of different recording media so that the subblocks of data are recorded onto the respective recording media and for recording each subblock data at a position such that a rotational delay time of a head becomes minimum in accessing a desired subblock on the recording medium of each transfer destination, said control means determining a size of each of said plurality of subblocks in accordance with a radial position on a recording medium designated to be recorded with a corresponding subblock; and an editing device for editing the source video data recorded in the recording device; the editing device including:

video data processing means for processing, in real time, the plurality of channels of video streams reproduced from the data recording/reproducing device in accordance with an editing indication from the computer so as to generate edited video data; and a computer for controlling the editing device and the data recording/reproducing device.

2. The editing system as claimed in claim 1, wherein the plurality of channels of video streams include at least a first channel of video data, first key data corresponding to the first channel of video data, and second video data; the editing device further including:

image transform means for carrying out spatial image transform with respect to the first video data and the first key data, and synthesis means for synthesizing the transformed first video data and the second video data on the basis of the transformed first key data while ensuring real time property.

3. The editing system as claimed in claim 1, wherein the control means generates a block map for managing recording areas of the recording media before starting recording of the plurality of channels of source video data.

4. The editing system as claimed in claim 3, wherein the block map is data for theoretically formatting the recording areas of the plurality of recording media.

5. The editing system as claimed in claim 3, wherein the block map is data for reserving the recording areas of the plurality of recording media before recording the plurality of channels of video data.

6. The editing system as claimed in claim 3, wherein the control means determines a recording medium for recording the subblock, a recording position of the subblock, and the size of the subblock, with reference to the block map.

7. The editing system as claimed in claim 3, wherein the control means has a zone bit recording table for making correspondence between radial positions on the recording media and the sizes of the subblocks, and determines the sizes of the subblocks with reference to the zone bit recording table.

8. The editing system as claimed in claim 6, wherein the block map includes recording medium identification data indicating a recording medium for recording the subblock, logical sector data indicating a position where the subblock is recorded on the recording medium indicated by the recording medium identification data, and sector size data used in recording the subblock on the recording medium indicated by the recording medium identification data.

9. The editing system as claimed in claim 6, wherein the control means generates the block map so that a plurality of subblocks generated from one frame of the source video data are recorded at corresponding recording positions on corresponding recording media, respectively, before starting recording of the plurality of channels of source video data.

10. The editing system as claimed in claim 6, wherein the control means controls the recording/reproducing means to generate parity data for correcting an error of data of a plurality of subblocks generated from one frame of the source video data, from the data of the plurality of subblocks.

11. The editing system as claimed in claim 10, wherein the control means generates the block map so that a plurality of subblock data generated from one frame of the source video data and parity data generated from the plurality of subblock data are recorded at corresponding recording positions on corresponding recording media, respectively, before starting recording of the plurality of channels of source video data.

12. The editing system as claimed in claim 11, wherein the control means determines recording media for storing a plurality of subblocks generated from one frame of the source video data, recording positions of the subblocks on the recording media, and sizes of the subblocks, with reference to the block map, and determines a recording medium for recording parity data generated from the plurality of subblock data and a recording position of the parity data on the recording medium, with reference to the block map.

13. The editing system as claimed in claim 12, wherein the recording media are randomly accessible disks, and the control means generates the block map so that an outer circumferential area and an inner circumferential area of the disk are alternately used for each frame so as to uniformly use the outer circumferential area and the inner circumferential area.

14. The editing system as claimed in claim 12, wherein the control means generates the block map so that the parity data is recorded constantly on the outer circumference of the disk.

15. The editing system as claimed in claim 12, wherein the control means generates the block map so as to vary, for each frame, the recording media for storing a plurality of subblocks generated from one frame of the source video data and parity data generated from the plurality of subblock data.

16. The editing system as claimed in claim 15, wherein the control means discriminates sizes of subblocks and recording media and recording positions for recording the subblocks in recording the plurality of channels of source video data, with reference to the block map, thereby controlling the recording/reproducing means.

17. The editing system as claimed in claim 15, wherein the control means generates a block map so that the parity data is recorded on an outer circumference of a recording medium of an odd ordinal number, a subblock of an odd ordinal number of the plurality of subblocks is recorded in an inner area of a recording medium of an even ordinal number, and a subblock of an even ordinal number of the plurality of subblocks is recorded in an outer area of a recording medium of an odd ordinal number, in the case of recording an n-th frame of source video data, and generates a block map so that the parity data is recorded on an outer circumference of a recording medium of an even ordinal number, a subblock of an odd ordinal number of the plurality of subblocks is recorded in an inner area of a recording medium of an odd ordinal number, and a subblock of an even ordinal number of the plurality of subblocks is recorded in an outer area of a recording medium of an even ordinal number, in the case of recording an (n+1)th frame of source video data.

18. The editing system as claimed in claim 15, wherein the data recording/reproducing device further including:

a plurality of data processing sections for generating a plurality of subblock data from one frame of pixel data of the source video data and generating parity data corresponding to the plurality of subblocks, and a plurality of buffer means for buffering data to be recorded onto the plurality of recording media, the control means dividing the parity data and the plurality of subblocks by each predetermined transfer unit so as to transfer the divided parity data and subblocks to the plurality of buffer means from the data processing sections.

19. The editing system as claimed in claim 18, wherein the control means sequentially repeats transfer of the parity data and the plurality of subblocks, for each transfer unit, until data are buffered in each of the buffer means up to the size of the parity data and the size of each subblock.

20. The editing system as claimed in claim 19, wherein on the assumption that the pixel data constituted by one video frame is divided into s units of subblocks, the control means generates one parity data from the pixel data of s units of subblocks on the basis of the first algorithm and sequentially repeats transfer of the s units of subblock data and the parity data for each transfer unit, during a first processing period for processing the data of one video frame, and generates one parity data from the pixel data of s/2 units of subblocks (where s/2 is an integer value with decimal fractions rounded down) and sequentially repeats transfer of the s/2 units of subblock data and the parity data for each transfer unit, during a second processing period for processing the data of one video frame.

21. The editing system as claimed in claim 3, wherein in order to realize a minimum rotational delay time of a head on a track on which an adjacent subblock adjacent to a subblock is recorded in accessing the adjacent subblock from the subblock, the control means calculates an optimum gap value expressing an angle made by a record starting position and a record end position of the subblock and an optimum skew angle expressing an angle made with respect to a record starting position of the adjacent subblock.

22. The editing system as claimed in claim 21, wherein the control means prepares the block map based on the optimum gap value and the optimum skew value, and carries out recording/reproduction control of the plurality of subblocks with reference to the block map.

23. The editing system as claimed in claim 22, wherein the control means generates the block map so that the gap value and the skew value become substantially constant.

24. The editing system as claimed in claim 1, wherein the control means generates a block map for theoretically formatting recording areas of the recording media so that each of the subblock data is recorded at a position to realize a minimum rotational delay time of a head, before recording the subblock data onto the recording media, and controls the recording/reproducing means to record the plurality of channels of video data onto the recording media on the subblock basis as a unit, on the basis of the block map.

25. An editing system comprising:

a data recording/reproducing device for recording/reproducing a plurality of channels of source video data; the data recording/reproducing device including:
recording/reproducing means for recording one frame of pixel data of the plurality of channels of source video data onto a plurality of randomly accessible recording media and reproducing desired source video data from the plurality of recording media, and
control means for controlling the recording/reproducing means by using a first algorithm for dividing the one frame of pixel data into a plurality of subblocks and dispersing the data of the subblocks to a plurality of different recording media, a second algorithm for, in access to a subblock of several frames with respect to each recording medium, scheduling an access order to the subblock of several frames so that a seek distance of a head becomes minimum, and a third algorithm for determining a recording position of each subblock to be recorded on the recording medium so that a rotational delay time of the head becomes minimum in accessing a desired subblock on the recording medium, said control means determining a size of each of said plurality of subblocks in accordance with a radial position on a recording medium designated to be recorded with a corresponding subblock; and a computer for controlling the data recording/reproducing device; the computer including:
control means for controlling the data recording/reproducing device so as to read out, in real time, a plurality of channels of video streams constituted by desired frames of the plurality of channels of source video data recorded at random positions on the plurality of recording media, from the respective recording media in accordance with operation by an editing operator.

26. The editing system as claimed in claim 25, further including an editing device for carrying out real-time signal processing of a plurality of channels of video streams reproduced from the data recording/reproducing device so as to generate edited video data in accordance with an editing indication from the computer.

27. The editing system as claimed in claim 26, wherein the plurality of channels of video streams include at least a first channel of video data, first key data corresponding to the first channel of video data, and second video data; the editing device further including:

image transform means for carrying out spatial image transform with respect to the first video data and the first key data, and synthesis means for synthesizing the transformed first video data and the second video data on the basis of the transformed first key data while ensuring real time property.

28. The editing system as claimed in claim 25, wherein the control means generates a block map for managing recording areas of the recording media before starting recording of the plurality of channels of source video data.

29. The editing system as claimed in claim 28, wherein the block map is data for theoretically formatting the recording areas of the plurality of recording media.

30. The editing system as claimed in claim 28, wherein the block map is data for reserving the recording areas of the plurality of recording media before recording the plurality of channels of video data.

31. The editing system as claimed in claim 28, wherein the control means determines a recording medium for recording the subblock, a recording position of the subblock, and the size of the subblock, with reference to the block map.

32. The editing system as claimed in claim 28, wherein the control means has a zone bit recording table for making correspondence between radial positions on the recording media and the size of the subblocks, and determines the sizes of the subblocks with reference to the zone bit recording table.

33. The editing system as claimed in claim 28, wherein the block map includes recording medium identification data indicating a recording medium for recording the subblock, logical sector data indicating a position where the subblock is recorded on the recording medium indicated by the recording medium identification data, and sector size data used in recording the subblock on the recording medium indicated by the recording medium identification data.

34. The editing system as claimed in claim 28, wherein the control means generates the block map so that a plurality of subblocks generated from one frame of the source video data are recorded at corresponding recording positions on corresponding recording media, respectively, before starting recording of the plurality of channels of source video data.

35. The editing system as claimed in claim 28, wherein the control means generates parity data for correcting an error of data of a plurality of subblocks generated from one frame of the source video data, from the data of the plurality of subblocks in accordance with the first algorithm.

36. The editing system as claimed in claim 35, wherein the control means generates the block map so that a plurality of subblock data generated from one frame of the source video data and parity data generated from the plurality of subblock data are recorded at corresponding recording positions on corresponding recording media, respectively, before starting recording of the plurality of channels of source video data.

37. The editing system as claimed in claim 36, wherein the control means determines recording media for storing a plurality of subblocks generated from one frame of the source video data, recording positions of the subblocks on the recording media, and sizes of the subblocks, with reference to the block map, and determines a recording medium for recording parity data generated from the plurality of subblock data and a recording position of the parity data on the recording medium, with reference to the block map.

38. The editing system as claimed in claim 36, wherein the recording media are randomly accessible disks, and the control means generates the block map so that an outer circumferential area and an inner circumferential area of the disk are alternately used for each frame so as to uniformly use the outer circumferential area and the inner circumferential area.

39. The editing system as claimed in claim 36, wherein the control means generates the block map so that the parity data is recorded constantly on the outer circumference of the disk.

40. The editing system as claimed in claim 36, wherein the control means generates the block map so as to vary, for each frame, the recording media for storing a plurality of subblocks generated from one frame of the source video data and parity data generated from the plurality of subblock data.

41. The editing system as claimed in claim 40, wherein the control means discriminates sizes of subblocks and recording media and recording positions for recording the subblocks in recording the plurality of channels of source video data, with reference to the block map, thereby controlling the recording/reproducing means.

42. The editing system as claimed in claim 41, wherein the control means generates a block map so that the parity data is recorded on an outer circumference of a recording medium of an odd ordinal number, a subblock of an odd ordinal number of the plurality of subblocks is recorded in an inner area of a recording medium of an even ordinal number, and a subblock of an even ordinal number of the plurality of subblocks is recorded in an outer area of a recording medium of an odd ordinal number, in the case of recording an n-th frame of source video data, and generates a block map so that the parity data is recorded on an outer circumference of a recording medium of an even ordinal number, a subblock of an odd ordinal number of the plurality of subblocks is recorded in an inner area of a recording medium of an odd ordinal number, and a subblock of an even ordinal number of the plurality of subblocks is recorded in an outer area of a recording medium of an even ordinal number, in the case of recording an (n+1)th frame of source video data.

43. The editing system as claimed in claim 42, wherein the data recording/reproducing device further including:

a plurality of data processing sections for carrying out processing of the source video data related to the first algorithm for every plural channels, and a plurality of buffer means for buffering data to be recorded onto the plurality of recording media, the control means dividing the parity data and the plurality of subblocks by each predetermined transfer unit so as to transfer the divided parity data and subblocks to the plurality of buffer means from the data processing sections.

44. The editing system as claimed in claim 43, wherein the control means sequentially repeats transfer of the parity data and the plurality of subblocks, for each transfer unit, until data are buffered in each of the buffer means up to the size of the parity data and the size of each subblock.

45. The editing system as claimed in claim 44, wherein on the assumption that the pixel data constituted by one video frame is divided into s units of subblocks, the control means generates one parity data from the pixel data of s units of subblocks on the basis of the first algorithm and sequentially repeats transfer of the s units of subblock data and the parity data for each transfer unit, during a first processing period for processing the data of one video frame, and generates one parity data from the pixel data of s/2 units of subblocks (where s/2 is an integer value with decimal fractions rounded down) and sequentially repeats transfer of the s/2 units of subblock data and the parity data for each transfer unit, during a second processing period for processing the data of one video frame.

46. The editing system as claimed in claim 40, wherein the first algorithm is a RAID algorithm, the second algorithm is a SCAN algorithm, and the third algorithm is a FARAD algorithm.

47. The editing system as claimed in claim 40, wherein the third algorithm is an algorithm for setting the size of the subblock to be greater as the position where the subblock is recorded is on the outer circumference of the disk, and controlling the number of transfer times of the s units of subblock data and the parity data in the first period and the number of transfer times of the s/2 units of subblock data and the parity data in the second period so that the parity data and the plurality of subblock data to be recorded on the disk have sizes corresponding to recording positions of the respective data.

48. The editing system as claimed in claim 40 wherein in order to realize a minimum rotational delay time of a head on a track on which an adjacent subblock adjacent to a subblock is recorded in accessing the adjacent subblock from the subblock, the control means calculates, on the basis of the third algorithm, an optimum gap value expressing an angle made by a record starting position and a record end position of the subblock and an optimum skew angle expressing an angle made with respect to a record starting position of the adjacent subblock.

49. The editing system as claimed in claim 48, wherein the control means prepares the block map based on the optimum gap value and the optimum skew value, and carries out recording/reproduction control of the plurality of subblocks with reference to the block map.

50. The editing system as claimed in claim 48, wherein the control means generates the block map so that the gap value and the skew value become substantially constant.

51. An editing system for editing a plurality of channels of source video data on the basis of editing information inputted by an operator, the editing system comprising:
   recording means for dividing each frame of pixel data of the plurality of channels of source video data into a plurality of subblocks, and recording the plurality of channels of source video data on the basis of a predetermined recording algorithm for recording the respective subblocks so that the subblocks are dispersed onto a plurality of different disks and so that, in each disk, a rotational delay time of a head becomes minimum in accessing a desired subblock, the recording means determining a size of each of said plurality of subblocks in accordance with a radial position on a recording medium designated to be recorded with a corresponding subblock;
   reproducing means for simultaneously reproducing the plurality of channels of video data by accessing the plurality of subblocks recorded by the recording means on the basis of the predetermined recording algorithm used in recording the source video data; and
   editing means for editing the plurality of channels of video data reproduced by the reproducing means on the basis of the editing information inputted by input means so as to generate at least one channel of video data.

52. An editing system for editing a plurality of channels of source video data on the basis of editing information inputted by an operator, the editing system comprising:
   recording means for dividing each frame of pixel data of the plurality of channels of source video data into a plurality of subblocks, and recording the plurality of channels of source video data on the basis of a predetermined recording algorithm for recording the respective subblocks so that the subblocks are dispersed onto a plurality of different disks and so that, in each disk, a rotational delay time of a head becomes minimum in accessing a desired subblock, the recording means determining a size of each of said plurality of subblocks in accordance with a radial position on a recording medium designated to be recorded with a corresponding subblock;
   edited stream generating means for generating an edited stream on the frame basis constituted by desired frames of the plurality of channels of source video data recorded by the recording means; and
   reproducing means for outputting a video stream corresponding to the edited stream generated by the edited stream generating means, by accessing the plurality of subblocks recorded by the recording means on the basis of the predetermined recording algorithm used in recording the source video data.

53. An editing system comprising:
   a data recording/reproducing device for recording/reproducing a plurality of channels of source video data; the data recording/reproducing device including:
   recording means for dividing one frame of data of the source video data into a plurality of subblocks and recording every plurality of subblocks onto a plurality of different disks,
   reproducing means for reproducing the plurality of subblock data from the plurality of different disks so as to generate one frame of the source video data from the plurality of reproduced subblock data,
   means for preparing a block map for managing which disk of the plurality of disks is to be used and how a recording area on the disk is to be used in recording the source video data, before starting recording of the source video data, and control means for controlling the recording/reproducing means on the basis of the block map in recording the plurality of subblocks onto the plurality of disks and for determining a size of each of said plurality of subblocks in accordance with a radial position on a recording medium designated to be recorded with a corresponding subblock, and an editing device for editing the source video data recorded in the recording device; the editing device including: editing means for controlling the data recording device so as to read out, in real time, desired frames of the source video data recorded at random positions on the plurality of recording media, from the plurality of recording media.

54. An editing system comprising:
   a data recording/reproducing device for recording/reproducing a plurality of channels of source video data; the data recording/reproducing device including:
   recording/reproducing means for recording one frame of pixel data of the plurality of channels of source video data onto a plurality of randomly accessible recording media, and reproducing a plurality of channels of video streams constituted by desired frames of the plurality of the channels of video data stored on the plurality of recording media, and
   control means for controlling the recording/reproducing means on the basis of a block map for theoretically managing recording areas on the recording media on the subblock basis so that, in recording a plurality of subblocks generated by dividing the one frame of pixel data onto the respective recording media, each subblock is recorded at a position such that a rotational delay time of a head becomes minimum, the control means determining a size of each of said plurality of subblocks in accordance with a radial position on a recording medium designated to be recorded with a corresponding subblock an editing device for editing the source video data recorded in the recording device; the editing device including:
   video data processing means for processing, in real time, the plurality of channels of video streams reproduced from the data recording/reproducing device in accordance with an editing indication from the computer so as to generate edited video data; and
   a computer for controlling the editing device and the data recording/reproducing device.

55. An editing system for editing a plurality of channels of source video data recorded on a plurality of recording media, the editing system comprising:
   a zone bit recording table for storing data indicating correspondences between radial positions on the recording media and the sizes of the subblocks;

block map generating means for generating a block map for theoretically formatting recording areas on the recording media so that, in accessing a plurality of subblocks divided from one frame of the source video data, each subblock data is recorded at a position such that a rotational delay time of a head becomes minimum;

recording means for recording the plurality of channels of video data onto the recording media on the subblock basis, on the basis of the block map generated by the block map generating means;

edit list generating means for generating an edit list on the frame basis constituted by desired frames existing at random positions on the recording media on which the plurality of channels of source video data are recorded; and reproducing means for reproducing a plurality of subblocks corresponding to a frame designated by the edit list from the plurality of recording media on the basis of the block map so that a video stream corresponding to the edit list is generated.

56. An editing method for editing a plurality of channels of source video data recorded on a plurality of recording media, the editing method comprising the steps of:

dividing the one frame of pixel data of the source video data into a plurality of subblocks and transferring the divided subblocks of data to a plurality of different recording media so that the subblocks of data are recorded onto the respective recording media, while recording each subblock data at a position such that a rotational delay time of a head becomes minimum in accessing a desired subblock on the recording medium of each transfer destination;

determining a size of each of said plurality of subblocks in accordance with a radial position on a recording medium designated to be recorded with a corresponding subblock;

generating an edit list on the frame basis constituted by desired frames existing at random positions on the recording media on which the plurality of channels of source video data are recorded; and repeating processing to reproduce a plurality of subblocks corresponding to a frame designated by the edit list and restore the one frame from the plurality of reproduced subblocks, for each frame designated as the edit list, so as to generate an edited video stream corresponding to the edit list.

57. An editing method for editing a plurality of channels of source video data recorded on a plurality of recording media, the editing method comprising the steps of:

generating a block map for theoretically formatting recording areas on the recording media so that, in accessing a plurality of subblocks divided from one frame of the source video data, each subblock data is recorded at a position such that a rotational delay time of a head becomes minimum;

determining a size of each of said plurality of subblocks in accordance with a radial position on a recording medium designated to be recorded with a corresponding subblock;

recording the plurality of channels of video data onto the recording media on the subblock basis, on the basis of the block map;

generating an edit list on the frame basis constituted by desired frames existing at random positions on the recording media on which the plurality of channels of source video data are recorded; and reproducing a plurality of subblocks corresponding to a frame designated by the edit list from the plurality of recording media on the basis of the block map so that a video stream corresponding to the edit list is generated.

* * * * *